United States Patent
Panuganty et al.

(10) Patent No.: US 12,099,500 B2
(45) Date of Patent: *Sep. 24, 2024

(54) PROCESSING A LOGICAL QUERY

(71) Applicant: VERINT AMERICAS INC., Alpharetta, GA (US)

(72) Inventors: Ramesh Panuganty, Fremont, CA (US); Chandrasekhar Varada, Cupertino, CA (US); Srikanth Ryali, Cupertino, CA (US); Gopikrishna Putti, Fremont, CA (US)

(73) Assignee: VERINT AMERICAS INC., Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/750,060

(22) Filed: May 20, 2022

(65) Prior Publication Data

US 2022/0284013 A1  Sep. 8, 2022

Related U.S. Application Data

(60) Division of application No. 16/399,554, filed on Apr. 30, 2019, now Pat. No. 11,341,126, which is a
(Continued)

(51) Int. Cl.
*G06F 16/24* (2019.01)
*G06F 16/215* (2019.01)
(Continued)

(52) U.S. Cl.
CPC .......... *G06F 16/243* (2019.01); *G06F 16/215* (2019.01); *G06F 16/24578* (2019.01)

(58) Field of Classification Search
CPC .................................................... G06F 16/243
See application file for complete search history.

(56) References Cited

U.S. PATENT DOCUMENTS

| 5,664,172 A | 9/1997 | Antoshenkov et al. |
| 8,577,911 B1 | 11/2013 | Stepinski et al. |

(Continued)

OTHER PUBLICATIONS

"Non-Final Office Action", U.S. Appl. No. 17/006,812, filed Mar. 1, 2022, 13 pages.

(Continued)

*Primary Examiner* — Mohammad S Rostami
(74) *Attorney, Agent, or Firm* — Meunier Carlin & Curfman LLC

(57) ABSTRACT

Some implementations generate logical queries from a canonical query, where the logical queries each reflect a modified scope of the canonical query. Implementations receive, via a personalized analytics system, a canonical query that is associated with a user. The canonical query can be analyzed to determine an intent of the canonical query. In turn, one or more implementations generate, based on the intent an anecdotal information associated with the user, a logical query that reflects a modified scope of the canonical query. In implementations multiple logical queries are generated and are processed to remove a duplicate logical query. A logical query can be used to extract data from a database associated with the personalized analytics system based on a modified scope.

20 Claims, 34 Drawing Sheets

Related U.S. Application Data continuation-in-part of application No. 16/232,934, filed on Dec. 26, 2018, now Pat. No. 11,651,043.

(60) Provisional application No. 62/702,728, filed on Jul. 24, 2018.

(51) Int. Cl.
*G06F 16/242* (2019.01)
*G06F 16/2457* (2019.01)

(56) References Cited

U.S. PATENT DOCUMENTS

| | | | |
|---|---|---|---|
| 9,201,905 | B1 | 12/2015 | Kelsey et al. |
| 10,546,001 | B1* | 1/2020 | Nguyen ............... G06F 40/186 |
| 10,878,473 | B1* | 12/2020 | Thekkanal ......... G06Q 30/0641 |
| 11,132,504 | B1 | 9/2021 | Mont-Reynaud et al. |
| 11,282,020 | B2 | 3/2022 | Panuganty |
| 11,341,126 | B2 | 5/2022 | Panuganty et al. |
| 11,468,105 | B1 | 10/2022 | Patnaik et al. |
| 11,651,043 | B2 | 5/2023 | Panuganty |
| 11,816,436 | B2 | 11/2023 | Panuganty et al. |
| 11,841,854 | B2 | 12/2023 | Panuganty et al. |
| 11,853,107 | B2 | 12/2023 | Panuganty et al. |
| 2003/0018799 | A1 | 1/2003 | Eyal |
| 2005/0071323 | A1 | 3/2005 | Gabriel et al. |
| 2005/0071328 | A1 | 3/2005 | Lawrence |
| 2005/0097087 | A1 | 5/2005 | Punaganti Venkata et al. |
| 2005/0203878 | A1 | 9/2005 | Brill et al. |
| 2005/0240580 | A1 | 10/2005 | Zamir et al. |
| 2008/0243785 | A1 | 10/2008 | Stading |
| 2008/0319971 | A1 | 12/2008 | Patterson |
| 2009/0019002 | A1 | 1/2009 | Boulis |
| 2009/0119299 | A1* | 5/2009 | Rhodes ............... G06F 16/9535 |
| | | | 707/999.009 |
| 2009/0265324 | A1 | 10/2009 | Mordvinov et al. |
| 2010/0125562 | A1 | 5/2010 | Nair et al. |
| 2010/0125563 | A1 | 5/2010 | Nair et al. |
| 2010/0191740 | A1 | 7/2010 | Lu et al. |
| 2010/0198812 | A1 | 8/2010 | Athsani et al. |
| 2011/0022590 | A1 | 1/2011 | Yu |
| 2011/0145234 | A1 | 6/2011 | Hu |
| 2011/0302172 | A1 | 12/2011 | Chandrasekar et al. |
| 2013/0343720 | A1 | 12/2013 | Abecassis |
| 2014/0108445 | A1 | 4/2014 | Oztekin |
| 2014/0136504 | A1 | 5/2014 | Shum et al. |
| 2014/0143817 | A1 | 5/2014 | Yeh |
| 2014/0149401 | A1 | 5/2014 | Liu et al. |
| 2014/0156641 | A1 | 6/2014 | Tripoli et al. |
| 2014/0164352 | A1 | 6/2014 | Denninghoff |
| 2014/0195026 | A1 | 7/2014 | Wieder |
| 2014/0344265 | A1 | 11/2014 | Boucher et al. |
| 2015/0086174 | A1 | 3/2015 | Abecassis et al. |
| 2015/0127565 | A1 | 5/2015 | Chevalier et al. |
| 2015/0178392 | A1 | 6/2015 | Jockisch et al. |
| 2015/0227624 | A1* | 8/2015 | Busch ............... G06F 16/24578 |
| | | | 707/728 |
| 2015/0286747 | A1 | 10/2015 | Anastasakos et al. |
| 2015/0296228 | A1 | 10/2015 | Chen et al. |
| 2015/0339754 | A1 | 11/2015 | Bloem et al. |
| 2015/0379077 | A1* | 12/2015 | Grosse ............... G06F 16/24542 |
| | | | 707/718 |
| 2016/0012111 | A1 | 1/2016 | Pattabhiraman et al. |
| 2016/0044115 | A1 | 2/2016 | Hill et al. |
| 2016/0078131 | A1 | 3/2016 | Venugopal et al. |
| 2016/0103837 | A1 | 4/2016 | Lee et al. |
| 2016/0147887 | A1 | 5/2016 | Breno et al. |
| 2016/0171050 | A1 | 6/2016 | Das |
| 2016/0188667 | A1 | 6/2016 | Maughan et al. |
| 2016/0196336 | A1 | 7/2016 | Allen et al. |
| 2017/0039638 | A1 | 2/2017 | Lane |
| 2017/0060868 | A1 | 3/2017 | Rais Ghasem et al. |
| 2017/0090858 | A1 | 3/2017 | Paris |
| 2017/0091202 | A1 | 3/2017 | Yiu et al. |
| 2017/0098012 | A1* | 4/2017 | Zhu ..................... G06F 16/9535 |
| 2017/0147555 | A1* | 5/2017 | Yannam .............. G06F 16/2428 |
| 2017/0161373 | A1 | 6/2017 | Goya et al. |
| 2017/0193107 | A1 | 7/2017 | Imbruce et al. |
| 2017/0242653 | A1 | 8/2017 | Lang et al. |
| 2017/0308264 | A1 | 10/2017 | Osotio et al. |
| 2018/0006837 | A1* | 1/2018 | Cartwright ............. H04N 7/147 |
| 2018/0025089 | A1 | 1/2018 | Chin et al. |
| 2018/0032610 | A1 | 2/2018 | Cameron et al. |
| 2018/0032620 | A1 | 2/2018 | Kasravi et al. |
| 2018/0060339 | A1* | 3/2018 | Chen ................ G06F 16/24556 |
| 2018/0150533 | A1 | 5/2018 | Mathur |
| 2018/0024698 | A1 | 8/2018 | Kasravi et al. |
| 2018/0246938 | A1* | 8/2018 | Kasravi ............... G06F 16/2457 |
| 2018/0246983 | A1 | 8/2018 | Rathod |
| 2018/0260630 | A1 | 9/2018 | Cao et al. |
| 2018/0268022 | A1 | 9/2018 | Rose |
| 2018/0268080 | A1 | 9/2018 | Christian et al. |
| 2018/0268253 | A1 | 9/2018 | Hoffman et al. |
| 2018/0276273 | A1 | 9/2018 | Mittal et al. |
| 2018/0300510 | A1 | 10/2018 | Lam et al. |
| 2018/0349362 | A1 | 12/2018 | Sharp et al. |
| 2018/0349499 | A1 | 12/2018 | Pawar et al. |
| 2019/0005044 | A1* | 1/2019 | Bell ..................... G06F 16/285 |
| 2019/0018692 | A1 | 1/2019 | Indyk et al. |
| 2019/0034793 | A1 | 1/2019 | Kataria et al. |
| 2019/0042079 | A1 | 2/2019 | Choi |
| 2019/0079978 | A1* | 3/2019 | Ali ....................... G06F 16/243 |
| 2019/0102681 | A1 | 4/2019 | Roberts et al. |
| 2019/0109809 | A1 | 4/2019 | Wang et al. |
| 2019/0124049 | A1 | 4/2019 | Bradley et al. |
| 2019/0126002 | A1 | 5/2019 | Brimmer |
| 2019/0138660 | A1 | 5/2019 | White et al. |
| 2019/0163783 | A1 | 5/2019 | Abrashkevich et al. |
| 2019/0171728 | A1* | 6/2019 | Wakankar .......... G06F 16/90324 |
| 2019/0258671 | A1 | 8/2019 | Bou et al. |
| 2019/0259040 | A1 | 8/2019 | Athannassov |
| 2019/0289417 | A1 | 9/2019 | Tomlin et al. |
| 2019/0295126 | A1* | 9/2019 | Madden ................. G06N 20/00 |
| 2019/0347063 | A1 | 11/2019 | Liu et al. |
| 2019/0384762 | A1 | 12/2019 | Hill et al. |
| 2019/0385219 | A1 | 12/2019 | Ouyang |
| 2020/0034357 | A1 | 1/2020 | Panuganty et al. |
| 2020/0034764 | A1 | 1/2020 | Panuganty |
| 2020/0065342 | A1 | 2/2020 | Panuganty |
| 2020/0117737 | A1 | 4/2020 | Gopalakrishnan et al. |
| 2020/0210647 | A1 | 7/2020 | Panuganty et al. |
| 2020/0401593 | A1 | 12/2020 | Panuganty et al. |
| 2021/0248136 | A1 | 8/2021 | Panuganty et al. |

OTHER PUBLICATIONS

"Non-Final Office Action", U.S. Appl. No. 16/791,469, filed Mar. 30, 2022, 19 pages.

"Non-Final Office Action", U.S. Appl. No. 16/232,934, filed May 11, 2022, 30 pages.

"Notice of Allowance", U.S. Appl. No. 16/399,554, filed Apr. 15, 2022, 8 pages.

U.S. Appl. No. 16/791,469 , "Final Office Action", U.S. Appl. No. 16/791,469, filed Sep. 7, 2022, 20 pages.

U.S. Appl. No. 17/006,812 , "Final Office Action", U.S. Appl. No. 17/006,812, filed Sep. 21, 2022, 16 pages.

U.S. Appl. No. 17/169,943 , "Non-Final Office Action", U.S. Appl. No. 17/169,943, filed Sep. 2, 2022, 17 pages.

"Final Office Action", U.S. Appl. No. 16/399,554, filed Jan. 18, 2022, 22 pages.

"Final Office Action", U.S. Appl. No. 16/425,686, filed Sep. 9, 2021, 22 pages.

"Final Office Action", U.S. Appl. No. 16/232,934, filed Oct. 25, 2021, 29 pages.

"Non-Final Office Action", U.S. Appl. No. 16/399,554, filed Aug. 5, 2021, 15 pages.

"Non-Final Office Action", U.S. Appl. No. 16/425,686, filed Mar. 3, 2021, 19 pages.

"Non-Final Office Action", U.S. Appl. No. 16/232,934, filed Dec. 24, 2020, 19 pages.

"Non-Final Office Action", U.S. Appl. No. 16/232,934, filed Jul. 1, 2021, 25 pages.

(56) References Cited

OTHER PUBLICATIONS

"Notice of Allowance", U.S. Appl. No. 16/425,686, filed Jan. 28, 2022, 8 pages.
"Restriction Requirement", U.S. Appl. No. 16/399,554, filed Mar. 26, 2021, 5 pages.
"Supplemental Notice of Allowability", U.S. Appl. No. 16/425,686, filed Feb. 16, 2022, 2 pages.
U.S. Appl. No. 16/232,934 , "Notice of Allowance", U.S. Appl. No. 16/232,934, filed Feb. 28, 2023, 8 pages.
U.S. Appl. No. 16/791,469 , "Non-Final Office Action", U.S. Appl. No. 16/791,469, filed Feb. 28, 2023, 13 pages.
U.S. Appl. No. 17/006,812 , "Non-Final Office Action", U.S. Appl. No. 17/006,812, filed Feb. 15, 2023, 19 pages.
U.S. Appl. No. 17/169,943 , "Final Office Action", U.S. Appl. No. 17/169,943, filed May 9, 2023, 20 pages.
U.S. Appl. No. 16/791,469 , "Notice of Allowance", U.S. Appl. No. 16/791,469, filed Aug. 4, 2023, 8 pages.
U.S. Appl. No. 17/006,812 , "Notice of Allowance", U.S. Appl. No. 17/006,812, filed Oct. 19, 2023, 8 pages.
U.S. Appl. No. 17/169,943 , "Notice of Allowance", U.S. Appl. No. 17/169,943, filed Oct. 6, 2023, 8 pages.

\* cited by examiner

PROCESSING A LOGICAL QUERY

RELATED APPLICATIONS

This application is a divisional of and claims priority to U.S. patent application Ser. No. 16/399,554 entitled "Modifying a Scope of a Canonical Query" which is a continuation-in-part and claims priority to U.S. patent application Ser. No. 16/232,934 entitled "Leveraging Analytics Across Disparate Computing Devices" and filed Dec. 26, 2018, which claims priority under the benefit of 35 U.S.C. § 119 to U.S. Provisional Application No. 62/702,728, filed on Jul. 24, 2018, the disclosures of which are incorporated by reference herein in their entirety.

BACKGROUND

The analysis of data provides users with information about corresponding topics. For example, a sales chart graphs sales numbers over time for a particular product to convey the product's performance. Using large volumes of data can help generate better representations of the performance. However, locating and using these large volumes of data can be overwhelming to the user. For instance, using large volumes of data can negatively complicate what computations used in the analysis in that the computations become more complex relative to smaller volumes of data. As another example, having large volumes of data can obfuscate the ability to identify and/or extract desirable information. In some situations, the user is not sufficiently educated how to extract data in a meaningful way, such as by lacking knowledge on the programming language used to interface with a database storing the information, in the algorithms used to analyze the large volume of data, in how to identify insights from the large volumes of data, and so forth. Further, the analysis output can sometimes lose contextual information. For instance, a graph of the sales results may only focus on a portion of the information gathered from the large volume of data, thus failing to provide a context that helps the user understand what the graph indicates. Accordingly, the analysis of large volumes of data can make the extraction of information difficult.

BRIEF DESCRIPTION OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
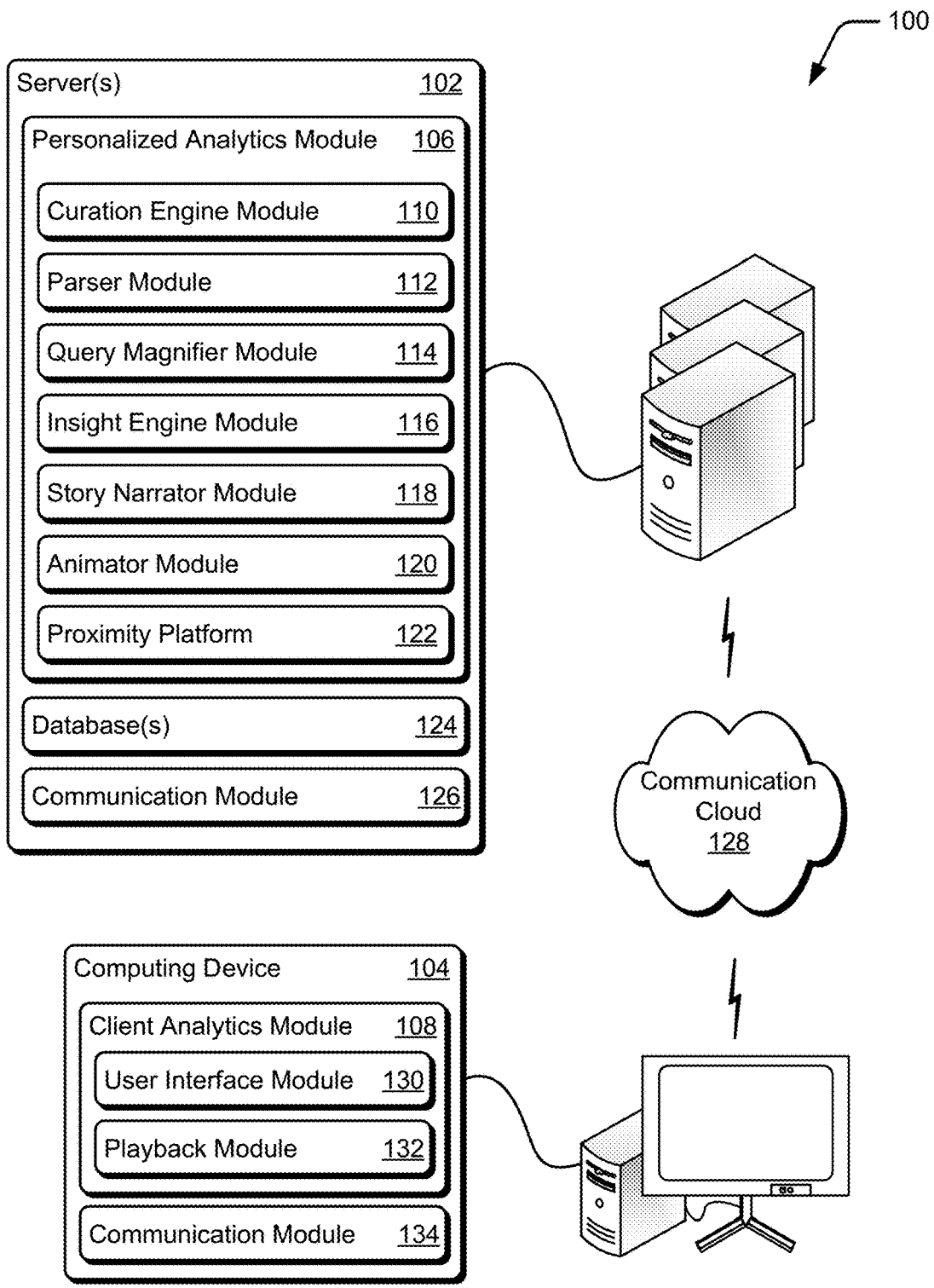
FIG. 1 is an overview of a representative environment in which automated generation of narrated analytics playlists can be utilized in accordance with one or more implementations.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

The interconnectivity of computing devices helps organizations share information acquired at one computing device with other computing devices in the organization. This advantageously enables users to make informed decisions through the use of current and shared data that would otherwise be difficult for one person to accumulate and maintain. However, processing large quantities of data across an organization poses certain challenges. For example, having multiple sources of data oftentimes corresponds to the data being acquired in multiple formats, such as each source providing the respective data in a respective format that is from data originating from other sources. To illustrate a first data source may correspond to geospatial data, a second data source may correspond to unstructured text data, a third data source may correspond to social media data, a fourth data source may correspond to log files, etc. In some scenarios, the different data formats are incompatible, thus necessitating either a conversion of the data into a common data format and/or employing additional data processing techniques. Processing data from different sources can be cumbersome and time-consuming to a user such that by the time the data is processed in its entirety, the data is out-of-date and/or invalid. To illustrate, consider computer-based data sources that capture millions of events per second (e.g., constantly changing business information, data exchanges between devices, real-time data logs, etc.). The volume of this data coupled with a user manually converting the various data formats becomes a formidable problem. As another example, consider non-traditional databases that can be accessed, such as databases configured to address large amounts of structured and unstructured data. These types of non-traditional databases can accommodate large amounts of data that are less predictable in structure/formatting (e.g., inconsistent data structures), thus complicating how data is accessed and processed.

Computer-based data sources further compound this issue by capturing not only a data point and/or event, but additional characteristics about the data point, such as number-based characteristics, string-based characteristics, date-based characteristics, time-based characteristics, location-based characteristics, etc. In various scenarios, the characteristics are expressed in different formats from one another. Accordingly, the volume of data accumulated by an organization from varying computer-based data sources, the speed at which the computer-based data is accumulated, as well as the differing formats in which the data can be stored, makes extracting accurate, current, and reliable insights from the data manually by a user insurmountable and difficult.

Techniques described herein provide automated generation of a narrated analytics playlist. Various implementations curate data from multiple data sources, where curating the data includes identifying attributes and relational data models. One or more implementations base the curating upon anecdotal data associated with a user. In response to receiving a trigger event to perform a query analysis, one or more implementations identify keywords to use in the query analysis, and extract information from the curated data based, at least in part on the one or more keywords. The extracted information is then analyzed to identify insights. In turn, one or more implementations generate a narrated analytics playlist using the insights. Some implementations utilize machine-learning algorithms to curate, extract and/or process data to generate insights. Various implementations abstract the data used to teach the machine-learning algorithms and share the abstracted data to other devices.

Some implementations generate logical queries from a canonical query, where the logical queries each reflect a modified scope of the canonical query. Implementations receive, via a personalized analytics system, a canonical query that is associated with a user. The canonical query can be analyzed to determine an intent of the canonical query. In turn, one or more implementations generate, based on the intent an anecdotal information associated with the user, a logical query that reflects a modified scope of the canonical query. The logical query can be used to extract data from a database associated with the personalized analytics system based on the modified scope.

Consider now an example environment in which various aspects as described herein can be employed.

Example Environment

FIG. 1 illustrates an example environment 100 that includes an example system that can be used to generate narrated analytics playlists in accordance with one or more implementations. Environment 100 includes server(s) 102 and computing device 104 that, in concert, provide personalized analytics directed towards a particular user profile and/or workspace, such as a narrated analytics playlist. While computing device 104 is illustrated here as a desktop computing device, any other suitable type of computing device can be utilized, such as a mobile phone, a tablet, a laptop, a smart watch, and so forth. Here, the terminology "personalized analytics" is used to denote output information that is generated from a combination of input data and user information. For example, the personalized analytics can include various types of output information (e.g., text, charts, graphs, tables, narrated text, narrated audio, animated video, podcasts, playlists with audio, slides, and so forth) that are based upon user anecdotal data, user preferences, user calendar information, user-defined schedules, etc.

Servers 102 include personalized analytics module 106 that acquires data, processes the data to curate the acquired data, generates queries for various types of analytics, generates video playlists, generates a natural language narration for the playlists, determines what analytics to include within the playlist, and so forth. Computing device 104 includes client analytics module 108 to access personalized analytics module 106 and/or various features provided by the personalized analytics module 106. Generally, the term module is used to denote any combination of software, hardware, and/or firmware that can be configured to provide the corresponding functionality such that personalized analytics module 106 and/or client analytics module 108 can be implemented using any of these combinations. In various implementations, client analytics module 108 corresponds to a client application that renders a user interface on a corresponding display device of computing device 104, and communicates over a network to a server application, such as personalized analytics module 106. Alternately or additionally, client analytics module 108 represents a stand-alone application that includes the functionality of personalized analytics module 106 onto a same device. In one or more implementations, servers 102 represents server(s) that distribute various aspects of the personalized analytics module across the multiple devices and/or provide cloud-based services to multiple client devices. Utilizing cloud-based services to deploy narrated analytic playlists and/or the generation of narrated analytic playlists provides a user with on-demand self-service access to the personalized analytics system, broad network access to the personalized analytics system, resource pooling across the cloud, rapid elasticity and/or adaptiveness to a user's changing operating environment, and measured service.

Here, the phrase "cloud-based services" is used to generally to denote any suitable type of cloud-based service and/or deployment mechanism across a network, such as cloud-based services that follow, by way of example and not of limitation, a Software as a Service (SaaS) model, a Platform as a Service (PaaS) model, an Infrastructure as a Service (IaaS) model, and so forth. Accordingly, the various implementations described herein can be deployed and/or implemented using any one or combination of these models to provide various aspects of narrated analytic playlists. As an example, various implementations can deploy narrated analytics playlists and/or the generation of narrated analytic playlists using a private cloud that is specific to an organization, a community cloud that is shared across several organizations, a public cloud that is available to the general public, a hybrid cloud that is a composition of different cloud models to enable data and application portability, and so forth. In some scenarios, the differing cloud-based services utilize different types of stack architectures that employ multiple interconnected layers (e.g., application layers, networking layers, workload layers, hardware layers, software layers, management layers, virtualization layers, etc.). Various implementations can integrate aspects of the personalized analytics system into any one and/or combination of layers utilized by the cloud-based services. To illustrate, one or more of the various components and/or modules further described herein can be communicatively coupled to a workload layer of a cloud computing environment to distribute the corresponding processing, such as transaction processing, software development, data analytics processing, mapping processing, navigation processing, etc.

Personalized analytics module 106 includes curation engine module 110, parser module 112, query magnifier module 114, insight engine module 116, story narrator module 118, animator module 120, and proximity platform 122 that work in concert to provide personalized analytics in accordance with one or more implementations. Some combinations of these modules communicate with one another to exchange information, such as by defining data structures according to a set of rules to provide a mechanism for cross-entity data sharing, as well as predictable and repeatable processing by the different entities, to achieve expected results. For example, the set of rules can outline what type of information the data included in the data structure describes, an amount of data stored within the data structure, a format in which the data is stored within the data structure and so forth. By following these rules, a first entity can create and store a data structure such that a second entity can successfully access and interpret the data included in the data structure. A data structure can include any suitable type of structure in which data can be stored, defined, and/or retrieved, such as an array, a string, a container, a list, a stack, a queue, a tree, a graph, a heap, a bit field, a bitmap, an object, a matrix, a linked-list, function parameters, a file, and so forth. Alternately or additionally, other rules can be employed that define a behavior of the personalized analytics module, such as rules that determine a prioritization of the data sources used to acquire curated data, rules that determine data manipulation based on a desired operation, condition-based rules, validation-based rules, mapping rules that can be used to translate a first data structure to a second data structure, and so forth.

Curation engine module 110 acquires information about data, such as various attributes associated with the data, and generates metadata to retain and describe the acquired attributes and/or information. Any suitable type of data can be analyzed by curation engine module 110, such as user calendars, organization databases, user workspaces, podcast interactions, video interactions, user interface interactions, queries, enterprise data, enterprise applications, existing reports, user activities, user preferences, user dislikes, and so forth. Accordingly, servers 102 includes databases 124 to generally represent any suitable source of data and/or information. Alternately or additionally, databases 124 represent storage for data generated by the personalized analytics module, such as curated data. Some implementations trigger the curation and/or acquisition of the information based upon a user query, a scheduled query, an automated query, a calendar item identified during a scheduled query, an identified idle period, and so forth. To illustrate, a user query pertains to an explicit input query entered at an interface of the personalized analytics system, such as through a text box. A scheduled query pertains to a scheduled and/or delayed query that triggers queries based on a schedule, either as a one-time query, a periodic-query, and so forth. An automated query pertains to a query that is triggered by the personalized analytics module identifying an event and/or without an explicit input associated with a query, such as a query triggered on a scan of a calendar event, keyword identification from communication content (e.g., email, text messages, instant messages, etc.), and so forth. Accordingly, data curation can be triggered in multiple different ways. The curation of data can alternately or additionally include generating drill path content. Here, drill path content corresponds to additional and/or secondary information associated with the primary topic of the data being curated, such as time-based information, location-based information, product-based information, etc. Accordingly, a drill-up path corresponds to a higher-level perspective of the primary topic associated with the data, such as comparison charts with associated sibling topics, to provide contextual information about the primary topic. A drill-down path corresponds to a lower-level/additional detailed information about the primary topic, such as specific points in time, location, demographics, etc.

As part of the curation process, some implementations identify additional and/or similar vocabulary associated with curated information, such as alternate wording that corresponds to the primary topic being curated. The alternate wording can then be used to acquire additional information that is then included and/or referenced in the metadata. In various scenarios, curation engine module 110 curates data by applying machine learning algorithms, data mining algorithms, and/or Principal Component Analysis (PCA) algorithms to identify data relationships between the acquired and/or curated data. For example, the curation engine module 110 can utilize machine-learning algorithms and/or portions of machine-learning algorithms to label sets of data, compare sets of data for similarities, group sets of data based on the similarities, and so forth. To illustrate, some implementations utilize similarity comparison algorithms to compare similarity scores between various subsets of data. However, it is to be appreciated that alternate or additional algorithms can be utilized as well, such as those further described herein with respect to at least the insight engine module 1114.

In various implementations, the curation engine module 110 employs an iterative process to curate the data. Overtime, as more data is curated and analyzed, the iterative process updates corresponding metadata, data models, drill-down activities, and so forth, generated by the curation engine module 110, such as improved relevancy metric of the associated data, improving relational data, etc. In turn, these updates make data extraction, data access, and/or data analysis associated with the curated data more efficient relative to earlier versions of the curated data, thus improving the system's overall operation (e.g., faster access, more accurate data extraction, faster data analysis, etc.). Accordingly, various implementations of the curation engine module 110 update the curated data and/or the corresponding metadata to reflect various findings from iterative analyses. In some implementations, the curation engine module 110 generates relational data models based on the curated data, and then stores the curated data in a database, such as in databases 124, according to the relational data models. Alternately or additionally, the curation engine module 110 utilizes machine-learning algorithms to identify what data sets are accessed and/or utilized more relative to other data sets, and prioritizes the data sets based upon the respective usage. In turn, the curation engine module 110 uses this prioritization to govern how the data sets are updated, such as by updating the higher priority data sets more frequently relative to other data sets, updating the higher priority data sets ahead of other data sets, updating the curated data based upon a prioritization of the databases and/or data sources, etc. This can improve how a corresponding computing device performs by updating the curated data that is utilized more, rather than adding a latency by updating less used and/or obscure data.

Parser module 112 receives an input query, and analyzes the input query to identify keywords and/or context information associated with the query. In various implementations, the parser module analyzes an input string associated with the input query to generate a canonical query (e.g., a query that includes identifying information, such as tags, keyword identification information, etc.). For example, the parser module can tag and tokenize the input string as further described herein.

Query magnifier module 114 receives the canonical query, and augments the query with supplemental information, alternate wording, and/or additional query subject matter. For instance, in some implementations, the query magnifier module generates multiple versions of the input query that reflect variations of a particular keyword, include user preferences, add related subject matter, additional context parameters, and so forth, to use to extract information from the curated data. To illustrate, consider a scenario in which a user manually submits an input query string to the personalized analytics system. In turn, the query magnifier module generates variations of the query, such as queries with alternate keywords, queries with related topics, queries with time constraints, etc., that can be utilized to extract information from the curated data. This can include using anecdotal data associated with a user profile to generate the variations of the query.

Insight engine module 116 uses the various queries generated by the query magnifier module to extract curated information. The insight engine module then analyzes the extracted data to identify insights relevant to a particular user profile, organization profile, and/so forth. This can include utilizing machine-learning algorithms to make predictions from the extracted data, identify trends, identify patterns, generate insights from the trends and/or patterns, and so forth. Here, an insight pertains to factual information identified from the data (e.g., plain inferences of the data for a particular need) and/or inferred information identified from the data (e.g., outliers, anomalies, trends, indicators, market segmentations, etc.). As one example, consider a scenario in which the answer to an input query of "what did orange juice sales do this month" is "sales for orange juice went down". An example insight generated by the personalized analytics system extrapolates on that input query by providing factual information that can provide more context about the result, such as "apple juice sales doubled over the same time period" or "the highest orange juice sales occurred in Alaska". Various implementations of the insight engine module apply machine-learning algorithms and/or models to determine the insights and/or combine the results of multiple data extractions into insights that are used as a basis for generating a narrated analytics playlist. This can include using and adjusting hyper-parameters associated with the machine-learning algorithms, such as that further described herein with respect to at least FIG. 15.

Story narrator module 118 receives an output from the insight engine module 116, and determines how to describe and/or articulate the output. As one example, in response to receiving an insight from the insight engine that corresponds to chartable data, story narrator module 118 determines to include a chart and a descriptive narrative of the chart within the narrated analytics playlist. In various scenarios, the descriptive narrative not only describes the information include in the chart, but alternately or additionally provides contextual information that helps drive an interpretation of the chart information. As one skilled in the art will appreciate, various implementations utilize a story generator algorithm to generate the descriptive narrative. Accordingly, as further described herein, such as with respect to at least FIGS. 11 and 16, story narrator module 118 identifies how to augment the insights identified by the insight engine module with additional information, such as visual information (e.g., charts, graphs, etc.), descriptive information, markup language information, metadata additions to the narrated analytics playlist, audible information, etc., such as by generating a script that outlines and/or includes this information.

Animator module 120 generates a narrated analytics playlist based on one or more scripts received from the story narrator module. Animator module 120 bundles visual and audible information into a playlist, such as by generating synthesized speech from descriptive narrative information generated by the story narrator module, identifying images to add to the playlist, etc. The animator module can generate any suitable type of a narrated analytics playlist with any suitable type of data, such as a slide presentation, a video clip, audible data, visual data, metadata, markup text, and so forth.

Figure 20A:
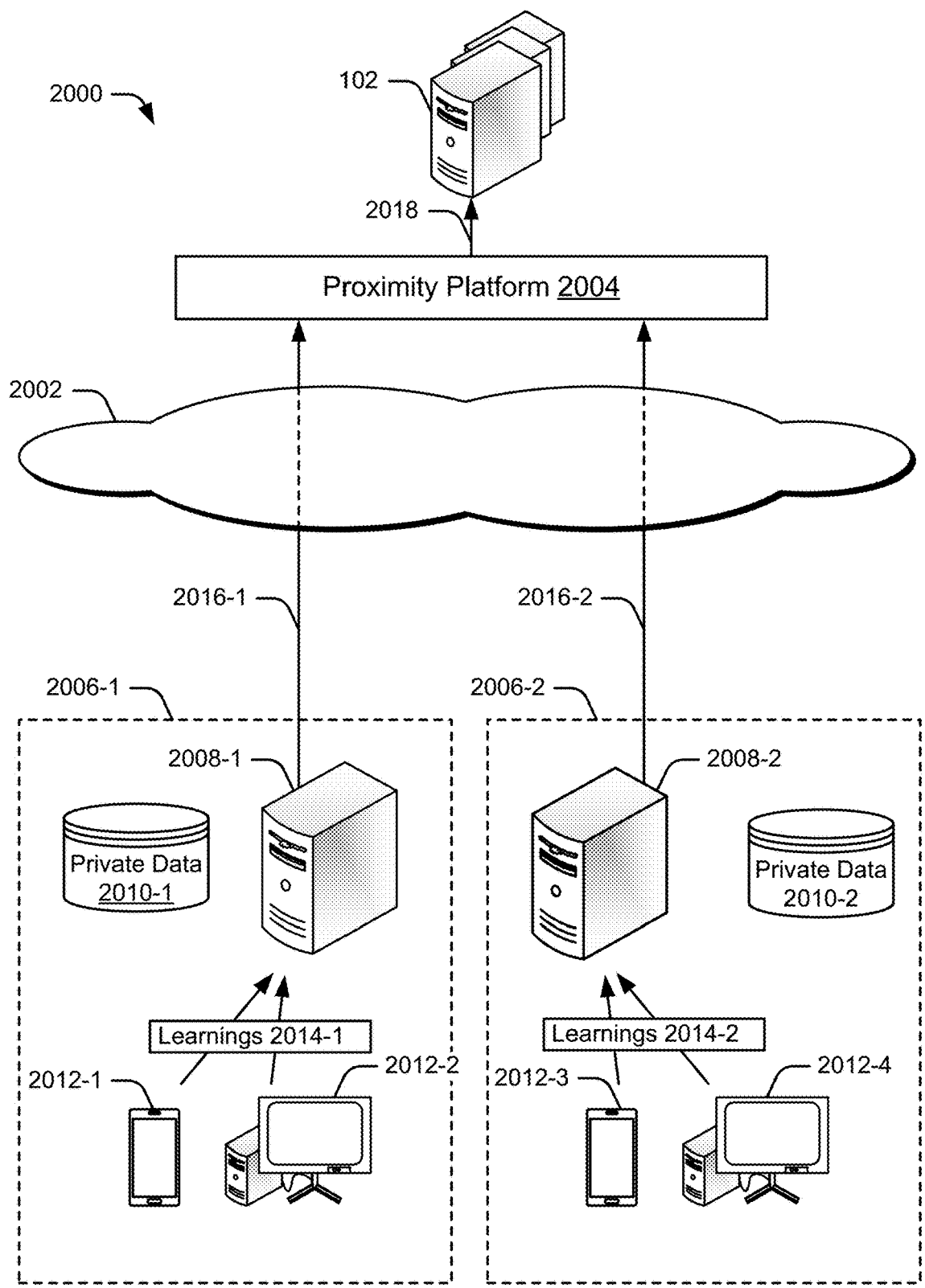
FIGS. 20A and 20B illustrate an example of a proximity platform in accordance with one or more implementations.
Figure 20B:
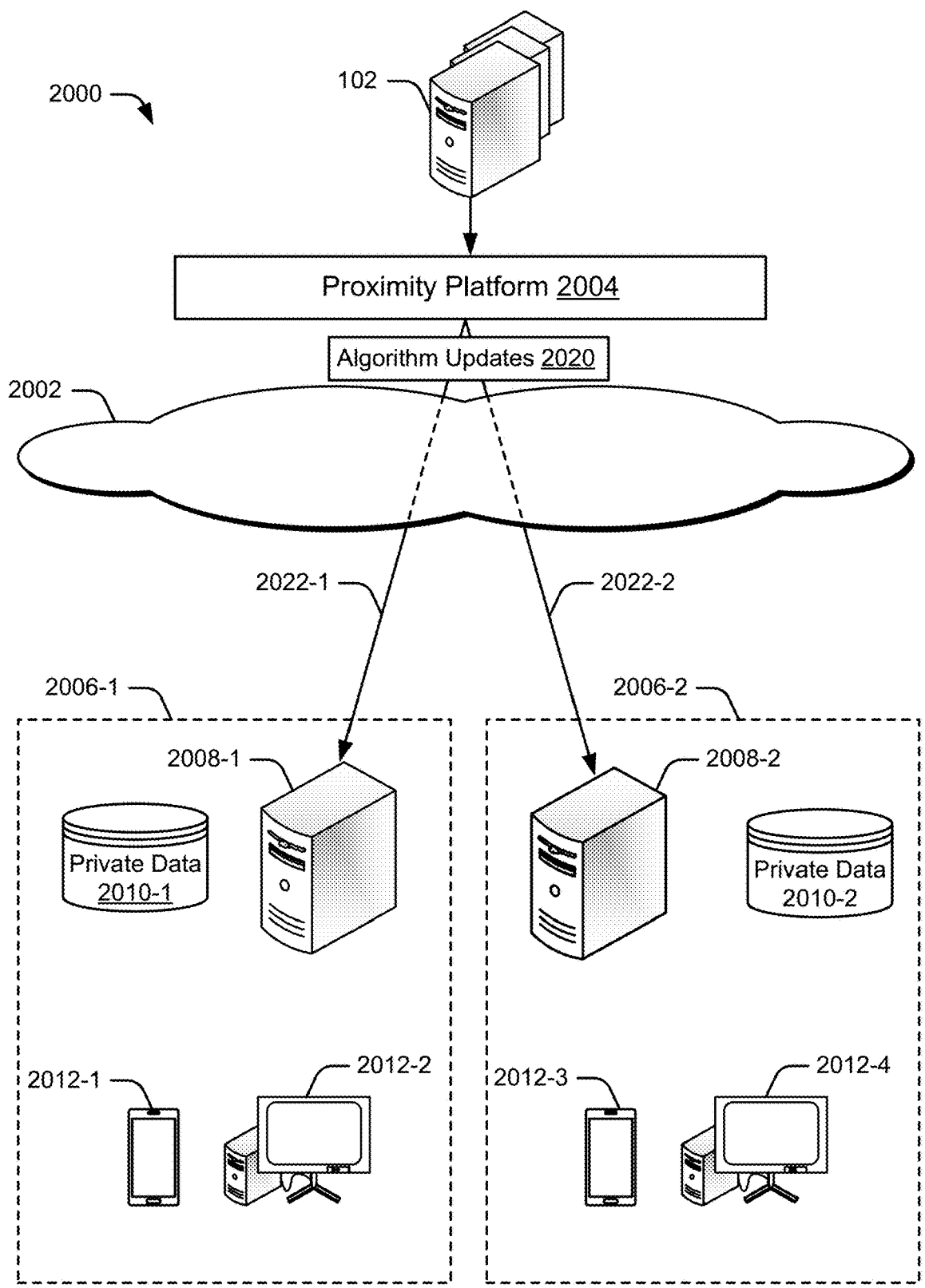

Proximity platform 122 provides data abstraction to enable personalized analytics module 106 to apply learned information from various sources to other sources without exposing the source-specific data that contributed to the learning, such as by using techniques described with respect to at least FIGS. 20A and 20B. As an example, consider a scenario in which personalized analytics module 106 supports multiple computing devices, each of which is associated with a respective customer organization. Accordingly, each respective user profile has private data curation, private relational data models, and so forth, which is used to enhance and/or educate various machine-learning algorithms. Various implementations of proximity platform 122 extract the respective machine learning information, model updates and the model parameters and/or anecdotal data from each respective user profile without accessing the private curated data and relational data models. As one example, proximity platform 122 extracts the hyper-parameters used by the various machine-learning algorithms employed by personalized analytics module 106 of FIG. 1 for a first client device, and apply the hyper-parameters to a second client device using transfer learning methods. Alternately or additionally, proximity platform 122 extracts anecdotal information from the first client device, and utilizes the anecdotal information at the second client device. As further described herein at least with respect to FIGS. 20A and 20B, this allows the proximity platform 122 to incorporate machine-learning information and/or anecdotal data into the personalized analytics system, such as by way of extracting and sharing hyper-parameters, thus modifying the system behavior based upon the learned information and improving how results are generated and/or delivered to other computing devices accessing the system without exposing the curated data of the first client device.

Servers 102 also include communication module 126 to communicate with external devices. Here, communication module 126 generally represents any suitable combination of hardware, software, and/or firmware that are configurable to facilitate the exchange of information, such as images, addresses, audio, video, commands, queries, messaging, narrated analytics playlists, and so forth. Some implementations of communication module 126 include one or more protocol stacks associated with a network over which data is exchanged, firmware that drives hardware to generate signals and/or process messages used in maintaining a wireless and/or wired communication session, etc. Alternately or additionally, some implementations of communication module 126 include computer networking ports, such as a Transmission Control Protocol (TCP) port, a User Datagram Protocol (UDP) port, a File Transfer Protocol (FTP) port, a Hypertext Transfer Protocol (HTTP) port, an Internet Message Access Protocol (IMAP) port, and so forth. Various implementations of communication module 126 include physical communication ports, such as a serial port, a parallel port, a Universal Serial Bus (USB) port, a keyboard port, a display port, an audio port, etc. In various implementations, servers 102 use communication module 126 to connect with other devices over communication cloud 128, such as computing device 104.

Communication cloud 128 generally represents any suitable type of communication network that facilitates a bi-directional link between various computing devices. Accordingly, communication cloud 128 can include multiple interconnected communication networks that comprise a plurality of interconnected elements, such as a wireless local area network (WLAN) with Ethernet access, a wireless telecommunication network interconnected with the Internet, a wireless (Wi-Fi) access point connected to the Internet, an Internet of Things (IoT) network, and so forth. In this example, communication cloud 128 connects servers 102 with computing device 104.

Computing device 104 includes client analytics module 108 that generally represents user access some or all of the functionality provided by personalized analytics module 106. In some implementations, client analytics module 108 represents a stand-alone client application that interfaces into personalized analytics module 106. Alternately or additionally, client analytics module 108 represents a browser that remotely logs onto a website hosted by servers 102. Further, while client analytics module 108 and personalized analytics module 106 are illustrated as residing on separate devices, some implementations combine some or all the respective module functionality into a single computing device as further described herein. In various implementations, computing device 104 uses client analytics module 108 to access cloud-based services provided by servers 102 to obtain narrated analytics playlists as further described herein. In this example, client analytics module 108 includes user interface module 130 to provide user access into features provided by personalized analytics system, such as playback of a narrated analytics playlist, inputting a search query, providing user feedback, requesting reports, accessing a dashboard and/or corresponding reports, scheduling data curation, scheduling data analysis, adding databases for data curation, and so forth. Client analytics module 108 also includes playback module 132. While illustrated here as being separate from user interface module 130, alternate or additional implementations integrate playback module 132 with user interface module 130 without departing from the scope of the claimed subject matter.

Playback module 132 receives a narrated analytics playlist, and outputs the content for consumption. This can include playing out audio, rendering video and/or images, displaying text-based content, and so forth. As one example, a user can interact with a particular narrated analytics playlist via controls displayed by playback module 132, such as pausing playback, skipping content in the playlist, requesting drill-up content and/or drill-down content, inputting a search query during playback of content, etc. In various implementations, the playback module includes feedback controls, such as controls corresponding to giving explicit positive feedback and/or explicit negative feedback of the content being played out at a particular point in time.

Computing device 104 also includes communication module 134 to facilitate communications over communication cloud 128. As one example, computing device 104 can use communication module 134 to communicate with personalized analytics module 106. Accordingly, similar to that described with respect to communication module 126, communication module 134 generally represents any suitable combination of hardware, software, and/or firmware that is configurable to facilitate data exchanges with other devices.

Figure 2:
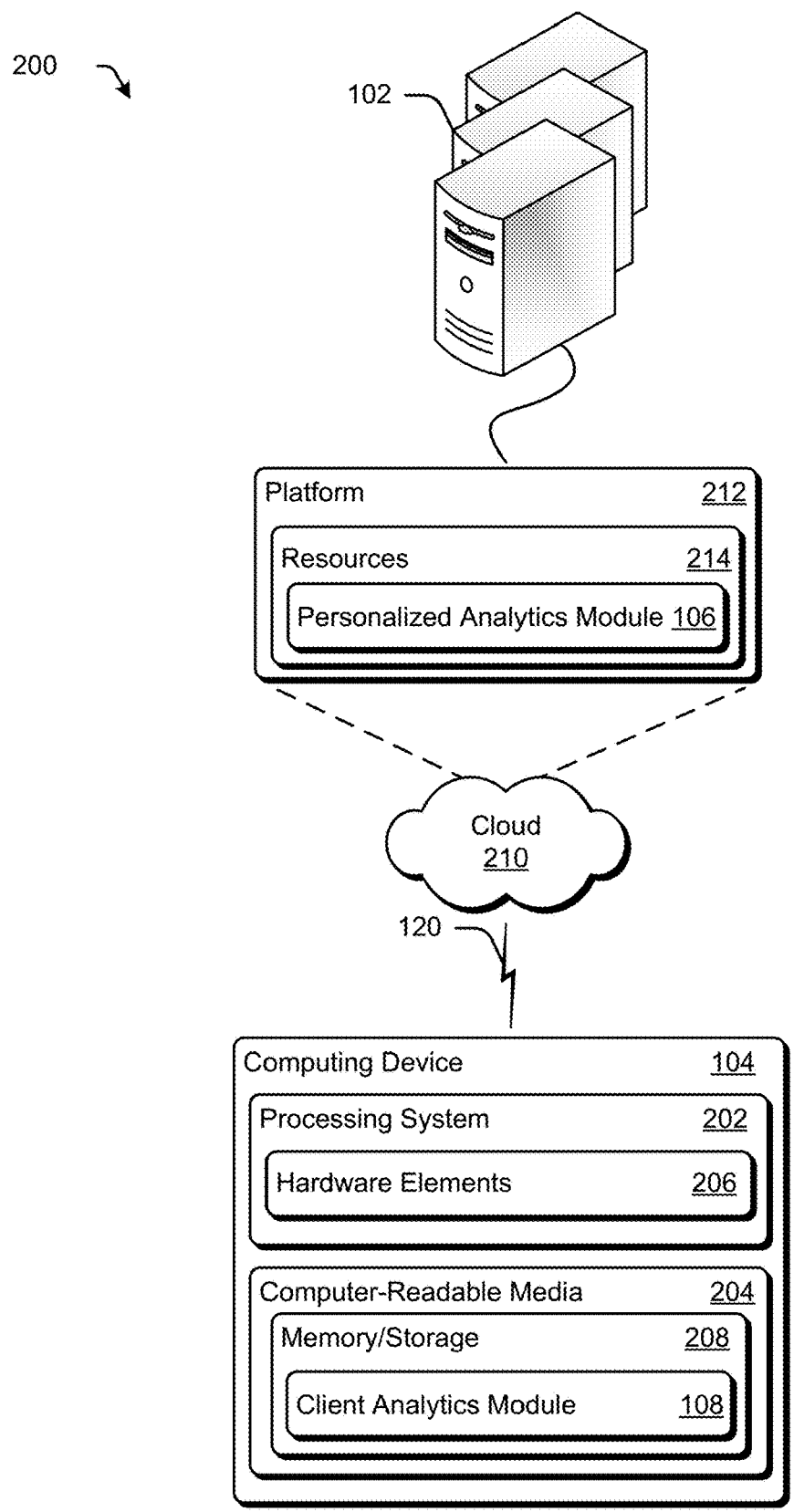
FIG. 2 illustrates an example environment in which cloud-based services can be used to provide features corresponding to the automated generation of narrated analytics playlists in accordance with one or more implementations.

Consider now FIG. 2 that illustrates an example environment 200 in accordance with one or more implementations. In various implementations, the example described with respect to FIG. 2 can be considered a continuation of the example described with respect to FIG. 1.

Environment 200 includes servers 102, computing device 104, and communication cloud 128 of FIG. 1, where computing device 104 includes a processing system 202, and one or more computer-readable media 204. Processing system 202 is representative of functionality to perform one or more operations using hardware. Accordingly, the processing system 202 is illustrated as including hardware elements 206 that may be configured as processors, functional blocks, and so forth. This may include implementation in hardware as an application specific integrated circuit or other logic device formed using one or more semiconductors. The hardware elements 206 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 204 is illustrated as including memory/storage 208. The memory/storage 208 represents memory/storage capacity associated with one or more computer-readable media. The memory/storage 208 may include volatile media (such as random-access memory (RAM)) and/or nonvolatile media (such as read only memory (ROM), Flash memory, optical disks, magnetic disks, and so forth). The memory/storage 208 may include fixed media (e.g., RAM, ROM, a fixed hard drive, and so on) as well as removable media (e.g., Flash memory, a removable hard drive, an optical disc, and so forth). The computer-readable media 204 may be configured in a variety of other ways as further described below. Here, client analytics module 108 of FIG. 1 is illustrated as residing within memory/storage 208, but alternate or additional implementations implement client analytics module 108 using combinations of firmware, hardware, and/or software without departing from the scope of the claimed subject matter, such as hardware elements 206.

Example environment 200 enables multiple devices to be interconnected through servers 102, where servers 102 can be local to the multiple devices, remote from the multiple devices, or any combination thereof. In one or more implementations, servers 102 are configured as a cloud of one or more server computers that are connected to the multiple devices through a network, the Internet, or other data communication link. This interconnected architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In various implementations, the interconnected architecture allows the personalized analytics system to increase a quality of a service by implementing workload management optimizations or recommendations based on observed data, performing dynamic operations on different servers (e.g., curating data on a first server and analyzing curated data on a second server), basing the dynamic operations on a flow of requests through the system to offload work to idle servers, etc. Alternately or additionally, the interconnected architecture allows the personalized analytics system to scale and/or manage resources to optimally tailor experiences to all client devices receiving cloud-based services. Here, "optimally tailor experiences" denotes the personalized analytics system balancing how the cloud-based services are provided to each client device based on meeting the needs of each client device using the resources available through the cloud. In at least one embodiment, a class of target devices is created and experiences are tailored to the generic class of devices. A class of devices may be defined by physical features, types of usage, or other common characteristics of the devices. In various implementations, scaling and/or managing the resources includes measuring the available resources of the personalized analytics system to make a determination on how to distribute the resources. For example, a number of high-volume data transactions occurring at a given point in time can add higher volumes of input into the personalized analytics system, which can affect the performance of any single server included in the personalized analytics system. By measuring performance indicators, such as storage usage, network bandwidth, memory usage, and so forth, the personalized analytics system can determine to add resources to support data curation, relational data modeling, insight analysis and/or generation, query augmentation, parameter extraction and distribution, playlist generation, etc. Various implementations utilize a workload layer of the cloud-based services to provide functionality of the personalized analytics system, such as mapping operations, transaction processing operations, data curation operations, query magnifications and/or augmentations, story augmentation, anecdotal information collection, insight analysis and/or generation, machine-learning parameter extraction and/or distribution, etc.

The cloud 210 includes and/or is representative of a platform 212 for resources 214. The platform 212 abstracts underlying functionality of hardware (e.g., servers) and software resources of the cloud 210. Resources 214 may include applications and/or data that can be utilized while computer processing is executed on servers that are remote from the computing device 104. For example, resources 214 can include personalized analytics module 106 of FIG. 1.

The platform 212 may abstract resources and functions to connect computing device 104 with other computing devices. The platform 212 may also serve to abstract scaling of resources to provide a corresponding level of scale to encountered demand for the resources 214 that are implemented via the platform 212. Accordingly, in an interconnected device embodiment, implementation of functionality described herein may be distributed throughout the system. For example, the functionality may be implemented in part on the computing device 104 as well as via the platform 212 that abstracts the functionality of the cloud 210.

Having described example operating environments in which various aspects of narrated analytics playlists can be implemented, consider now a discussion of generating narrated analytics playlists in accordance with one or more implementations.

Narrated Analytics Playlists

Data mining examines data to identify various types of information, such as anomalies, patterns, trends, etc. The process of mining data can involve accessing one or more data sources in a particular manner to extract the desired information. To illustrate, a database can be programmatically accessed to return an average value, a weighted sum, a maximum value in a numeric sequence, sorted data, etc. As the complexity of the requested information increases, so, too, does the access to the database. Accordingly, data mining can be difficult for users who are not knowledgeable on how to locate and/or extract the desired information. For instance, a business person who desires sales trend information for a particular product may not understand the schema and/or interfaces employed by a database storing the corresponding data.

As another complication, the information extracted by data mining can sometimes lose context data that helps the user understand the information. For instance, in generating a sales trend chart from data, the sales chart may indicate a downward sales trend for a particular region, and lose context data that indicates the downward sales trend for that particular region is a minimal relative to other regions. Thus, the loss of context data can adversely impact how the information generated by data mining is interpreted. The ability to extract information, as well as interpret the extracted data, is further compounded when large volumes of data from varying sources are used, thus making manual processing cumbersome and/or insurmountable to various users.

As further described herein, computer-based resources compile large quantities of data in varying formats and at accelerated rates that a human is incapable of compiling manually. This makes processing the computer-based data by a user infeasible, since a user processing the data would be time-consuming and/or impossible to complete. Further, if a user simply processed a portion of the computer-based data, this creates potentially out-of-date, inaccurate, and/or misleading results since not all data points are considered. Accordingly, the volume of computer-based data accumulated by an organization from varying data sources, the speed at which data is accumulated by these data sources, as well as the differing formats in which the data can be stored, makes extracting accurate, current, and reliable insights from the data by a user insurmountable and difficult.

Techniques described herein provide automated generation of narrated analytics playlists. Various implementations curate data from various data sources, where curating the data includes identifying attributes and relational data models. One or more implementations base the curating upon anecdotal data associated with a user profile. In response to receiving a trigger event to perform a query analysis, one or more implementations identify keywords to use in the query analysis, and extract information from the curated data based, at least in part on the one or more keywords. The extracted information is then analyzed to identify one or more insights. In turn, one or more implementations generate a narrated analytics playlist using the one or more insights.

Figure 3:
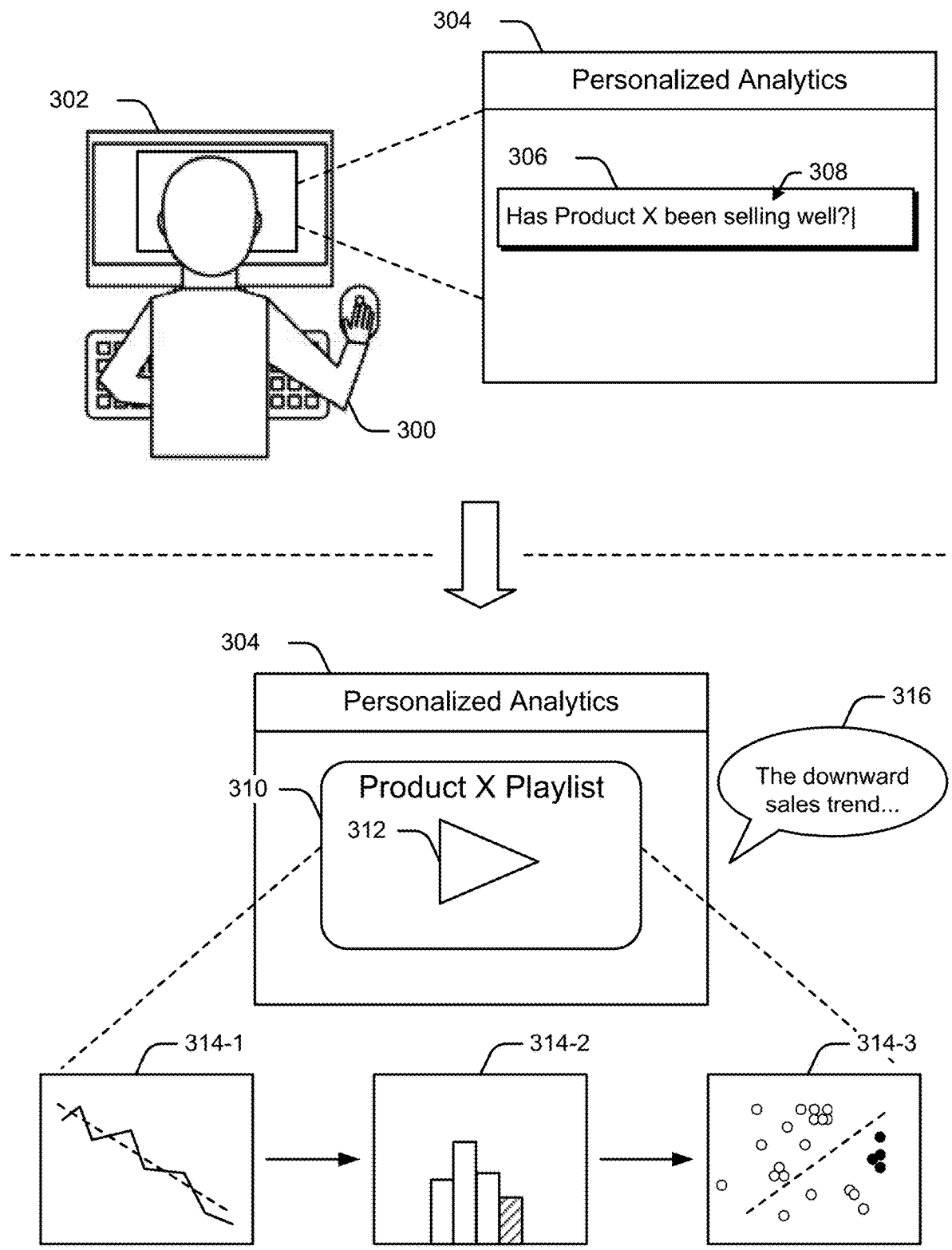
FIG. 3 illustrates an example of generating a narrated analytics playlist in accordance with one or more implementations.

To demonstrate, consider now FIG. 3 that illustrates an example of generating a narrated analytics playlist in accordance with one or more implementations. In various scenarios, the example described with respect to FIG. 3 can be considered a continuation of one or more examples described with respect to FIGS. 1 and 2. FIG. 3 illustrates an example progression of events over an arbitrary time period. Here, the progression begins in the upper portion of FIG. 3 and then moves to the lower portion of FIG. 3. It is to be appreciated that the progression of events described with respect to FIG. 3 is for discussion purposes, and that any other ordering, omission, and/or addition to the events can occur without departing from the scope of the claimed subject matter.

The upper portion of FIG. 3 includes user 300 that accesses a personalized analytics system using computing device 302. While computing device 302 is illustrated here as a desktop computer, other types of computing devices include a mobile phone, a tablet, a laptop, a smart watch, a home assistant device, and so forth. In various implementations, user 300 log onto the personalized analytics system using a specific identification and password that distinguishes a particular workspace associated with user 300 from other workspaces, such as through an account associated with a particular user profile and/or workspace. To illustrate, the user can create single or multiple workspaces, where each workspace has a specific identification and password that can be used to identify the respective workspace and/or interactions with the respective workspace. In turn, logging onto the system with the specific identification and password accesses the corresponding workspace. It is to be appreciated that user 300 can access the personalized analytics system in any suitable manner, such as through a web browser that accesses a remote server, through a client application that communicates with a server application over a network, a stand-alone application, etc.

As user 300 interacts with the personalized analytics system, some implementations collect anecdotal data about the user and/or the user's various interactions, such as user location information, user preferences, user preferred queries, last known user interaction, user preferred product information, user preferred insight information, and so forth. In turn, the collected anecdotal data can be stored and/or associated with the particular workspace and/or user profile. When the particular workspace becomes the active workspace, the personalized analytics system uses the corresponding anecdotal data to generate insights and/or narrated analytics playlists directed to the particular user profile and/or particular workspace. This can include using the anecdotal data to determine how to represent the insights when incorporating the insights into a narrated analytics playlist, a language style to use, types of content to include in the playlist (e.g., preferred content associated with the user profile, content relevant to an associated organization profile, content relevant to an associated job, etc.).

Some implementations share anecdotal data across multiple workspaces, such as workspaces identified as being associated with a same user and/or same user profile. For instance, the personalized analytics system can collect anecdotal data for the same user profile across multiple workspaces, and use the anecdotal data in each respective workspace of the user profile. Collecting and/or generating the anecdotal data can be achieved in any suitable manner. As one example, various implementations collect user interactions with the personalized analytics system, and then process the user interactions using predictor functions, machine-learned algorithms, etc., to determine the user's affinities. To illustrate, the personalized analytics system can gather data points corresponding to user interactions with various types of charts displayed by the system, and feed the data points to a machine-learning algorithm to determine that the user has an affinity towards pie charts, dislikes bar charts, and so forth. Any suitable type of machine-learning algorithm can be utilized, such as collaborative filtering algorithms, object ranking algorithms, label ranking, instance ranking, and so forth. Some of the machine learning modules utilized employ supervised learning techniques that train a machine-learning algorithm with background knowledge, and then feed the observed data points into the machine-learning algorithm as a way to identify these affinities. The training, as well as iterative updating of the machine-learning algorithms as new data is processed, improve the efficiency of the algorithms to converge on a result faster over time. Thus, utilizing machine-learning algorithms improves the execution times of a corresponding computing device and/or personalized analytics system. Portions of the machine-learning algorithm can be distributed within the personalized analytics system to improve the system response time, such as through the use of a workload layer of a cloud-based service. Alternately or additionally, portions of the algorithm can be run locally on a user device to improve response time by minimizing data transfer between the user device and a cloud-based service. It is to be appreciated that the examples described here are for illustrative purposes, and other types of machine-learning algorithms and/or distribution methods can be utilized without departing from the scope of the claimed subject matter, such as preference elicitation models, multiple-criteria decision analysis models, statistic-based predictive models, and so forth.

In FIG. 3, the personalized analytics system displays, by way of computing device 302, user interface 304 that includes an interactive control in the form of search box 306. In turn, user 300 enters an input search query 308 that triggers a query analysis as further described herein. While the example described with respect to FIG. 3 generally illustrates a search box, other types of interfaces can be utilized to access and input search queries to the personalized analytics system, such as a search box at a stand-alone application and/or web-application, a search box via a web browser interface, a microphone communicatively coupled to computing device 302 and/or a home assistant device to receive audible input, a camera communicatively coupled to computing device 302 and/or a home assistant device to receive video input, etc. Various implementations of the personalized analytics provide time information associated with how long the query analysis process will take (e.g., how long until a result is returned by the personalized analytics system). This can occur automatically and/or in response to the personalized analytics system receiving input that requests the time information.

Moving to the lower portion of FIG. 3, and in response to receiving input search query 308, user interface 304 displays a narrated analytics playlist 310 generated by the personalized analytics system. In one or more implementations, the narrated analytics playlist 310 is output via playback module 132 of FIG. 1. Narrated analytics playlist 310 includes various insights identified by the personalized analytics system that are based off of input search query 308 and/or anecdotal data associated with a user profile and/or workspace associated with user 300.

User interface 304 includes playback control 312 that can be actuated to initiate playback of narrated analytics playlist 310. Here, narrated analytics playlist 310 includes a series of images in a video format, further illustrated here as image 314-1, image 314-2, and image 314-3, respectively, to show the progression of images and/or audio. Accordingly, narrated analytics playlist 310 includes audible output 316 that corresponds to a narrated description of the content rendered in images 314-1 through 314-3. Each respective image of the playlist (e.g., images 314-1 through 314-3) corresponds to an insight identified by the personalized analytics system. Various implementations include supplemental information and/or insights within the narrated analytics playlist, such as drill-up information, drill-down information, location-based information, time-based information, product-based information, etc. Alternately or additionally, the playback module renders controls that can be actuated to initiate the generation of the supplemental information using data included in the narrated analytics playlist. In other words, the personalized analytics system provides user 300 with not only the requested information associated with input search query 308, but additionally identifies supplemental information and/or provides the user with an ability to generate the supplemental information, such as supplemental insights.

Figure 4:
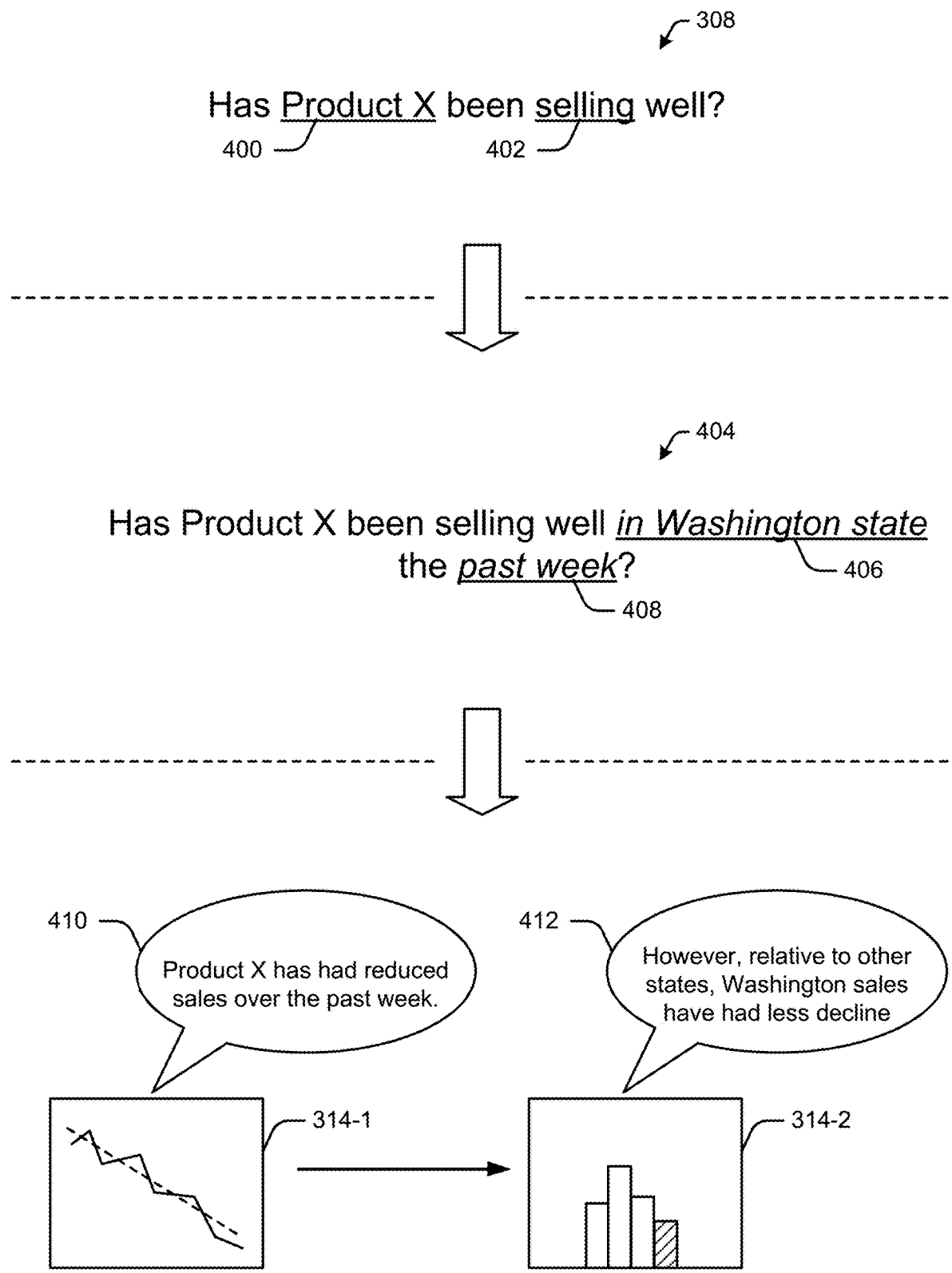
FIG. 4 illustrates an example of augmenting a query with contextual parameters in accordance with one or more implementations.

Various implementations augment queries with additional parameters scope in or add boundaries on how curated data is extracted and/or analyzed. This simplifies the complexity of inputs queries, since the personalized analytics system can process broad input queries by adding contextual parameters that help bound the request. To demonstrate, consider now FIG. 4 that illustrates adding contextual parameters to a query in accordance with one or more implementations. In various scenarios, the example described with respect to FIG. 4 can be considered a continuation of one or more examples described with respect to FIGS. 1-3. FIG. 4 illustrates an example progression of events over an arbitrary time period. Here, the progression begins in the upper portion of FIG. 4, moves to the middle portion of FIG. 4, and then progresses to the lower portion of FIG. 4. It is to be appreciated that the progression of events described with respect to FIG. 4 is for discussion purposes, and that any other ordering, omission, and/or addition to the events can occur without departing from the scope of the claimed subject matter.

The upper portion of FIG. 4 includes input search query 308 from FIG. 3. While input search query 308 includes a text-based question (e.g., has Product X been selling well?), it is to be appreciated that this is for discussion purposes and that any other combination of words, images, and/or audio can be utilized as a search query without departing from the scope of the claimed subject matter. Various implementations analyze the combination of words included in input search query 308, and determine to add contextual parameters to the query. For example, during the analysis, the personalized analytics system identifies contextual words included in the search query that correspond to topics of interest to focus an analysis on, such as through the use of natural language processing algorithms. In FIG. 4, the personalized analytics system identifies contextual word 400 (e.g., "Product X") and contextual word 402 (e.g., "selling") as topics to base a query analysis off of. While input search query 308 includes these topical words that can help direct a query analysis, the query string lacks contextual information and/or boundaries that help reduce the scope of the query, such as a time span for the sales data, a region over which to gather sales information, and so forth. Accordingly, various implementations identify contextual parameters to include in a query, such as through the use of a query magnifier module as described with respect to at least FIGS. 11 and 14.

Moving to the middle portion of FIG. 4, the personalized analytics system generates a modified query 404 that has been augmented to include contextual parameter 406 and contextual parameter 408. Here, contextual parameter 406 corresponds to location and/or region data, while contextual parameter 408 provides a time range over which to analyze data. The contextual parameters can be identified in any suitable manner, such as through the use of anecdotal data associated with a user profile and/or workspace associated with user 300. For instance, the anecdotal data of the active workspace and/or active user profile can include location information associated with user 300, sales regions assigned to user 300, a time metric of when the last sales report for Product X was generated, etc. In turn, the personalized analytics system determines contextual parameters that help bound the query used to extract curated data for analysis. While the example described with respect to FIG. 4 adds location and time contextual parameters, it is to be appreciated that other types of parameters can be included as well, such as a search history, organization information, a drill-down or drill-up path, traits corresponding to a particular product, subject domain insights, user interaction with related products, and so forth.

Moving to the lower portion of FIG. 4, playlist image 314-1 and playlist image 314-2 correspond to insights generated from the query analysis based on modified query 404. For example, image 314-1 corresponds to a sales trend over a time span corresponding to contextual parameter 408 and/or a region corresponding to contextual parameter 406. Image 314-2 corresponds to an insight associated with a comparison chart of sales in other regions relative to the one identified in contextual parameter 406, such as regions that lie on a same boundary. Adding contextual parameters to a query analysis allows the personalized analytics system to generate a result for the requested topic (e.g., image 314-1) and/or supplemental information (e.g., image 314-2) without needing to receive a second, potentially more defined, input query. To illustrate, an insight engine module, such as those discussed with respect to at least FIGS. 1, 11, and 15, uses the augmented query to extract curated data and analyze the data to generate insights and/or supplemental information as further described herein.

In FIG. 4, narration 410 describes various details about image 314-1 to provide contextual information about what the image illustrates, such as a narrative description of the charted sales over the corresponding week. Similarly, narration 412 provides a narrative description of image 314-2, such as a description that indicates the bar chart compares the sales trend for Washington State to sales trends in boundary states, and the observation that Washington State sales declined less than other states. In other words, the personalized analytics system identifies an insight corresponding to comparative sales to other states by augmenting input search query 308 using anecdotal data and without additional user input and/or user direction. While the example with respect to FIG. 4 includes a comparative sales chart based on location, it is to be appreciated that other types of insights can be identified using various machine learning algorithms, data mining algorithms, PCA algorithms, etc.

With respect to FIGS. 3 and 4, user 300 manually enters a search query into the personalized analytics system using an interactive control displayed via a user interface, where the search query is alternately referred to as a user query. In response to the user actuating the control, the personalized analytics system receives a notification of the user query trigger event, and subsequently triggers a query analysis. However, other types of events trigger events can trigger a query analysis. To further demonstrate, consider now FIGS. 5A-5C that collectively illustrate various trigger events in accordance with one or more implementations. In some scenarios, the examples described with respect to FIGS. 5A-5C can be considered a continuation of one or more examples described with respect to FIGS. 1-4.

Figure 5A:
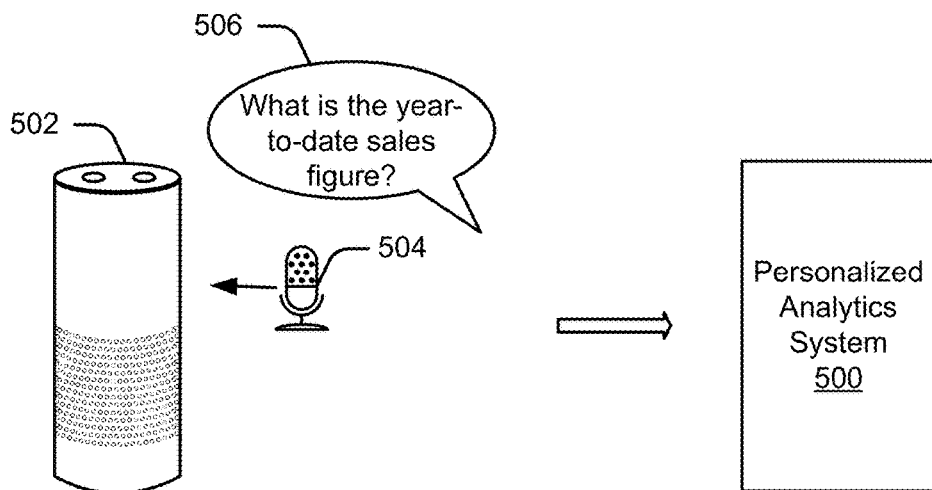
FIGS. 5A-5C illustrate various example trigger events in accordance with one or more implementations.
Figure 5A:
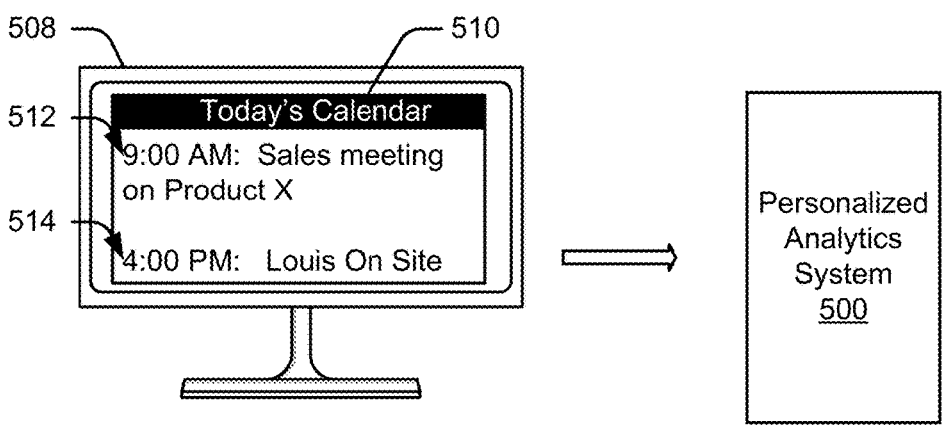

The upper portion of FIG. 5A includes a personalized analytics system 500 that, in various scenarios, is representative of the personalized analytics system described in FIG. 1, such as servers 102 and/or computing device 104. For simplicity's sake, FIGS. 5A-5C generally illustrate the personalized analytics system 500 as a black box to denote that multiple different configurations of the system can be utilized, examples of which are provided herein. The upper portion of FIG. 5A also includes home assistant device 502 that is communicatively coupled to, and/or is part of, the personalized analytics system. For example, in some scenarios, home assistant device 502 corresponds to computing device 104 of FIG. 1. Home assistant device 502 includes a microphone 504 to receive audible input trigger events associated with triggering a query analysis. Here, audible input 506 includes a query corresponding to "what is the year-to-date sales figure". In response to receiving audible input 506, the home assistant device forwards information associated with audible input 506 to the personalized analytics system 500 to trigger a query analysis, such an audio clip of audible input 506, a text conversion of the audible input, a trigger event message, etc. To illustrate, various implementations include speech-to-text algorithms that process audible input 506, and generate text-based representations of words identified via the speech-to-text algorithms. In turn, the personalized analytics system 500 receives the text-based representation and performs a search analysis, examples of which are provided herein. In other implementations, an audio clip is forwarded to the personalized analytics system 500 for processing as further described herein. Accordingly, various implementations trigger a query analysis using an audible input. While the upper portion of FIG. 5A illustrates audible support via a home assistant device, other types of devices support audible input/output as well, such as a mobile phone, a tablet, a personal computer, a smart watch, etc.

In various implementations, audible support of the personalized analytics system 500 can alternately or additionally include outputting audible prompts. To demonstrate, some implementations of home assistant device 502 output an audible prompt, such as "would you like an analysis of your helpdesk ticket queue now?" Any suitable event can trigger the output of an audible prompt, such as a threshold value being triggered (e.g., the ticket queue exceeding a predefined number of entries), a user-defined schedule, and so forth. In response to outputting the audible prompt, various implementations receive audible inputs and/or responses, such as a one-word audible reply (e.g., "Yes", "No") that triggers a query analysis based on content included in the prompt. Accordingly, various implementations include speech-to-text conversion algorithms and/or keyword extraction algorithms.

Various implementations trigger a query analysis based upon a scan of a calendar of appointments and/or a schedule. To further demonstrate, consider now the lower portion of FIG. 5A that includes personalized analytics system 500 and display device 508 that is communicatively coupled to, and/or is part of, the personalized analytics system. For example, in some scenarios, display device 508 corresponds to a display device associated with computing device 104 of FIG. 1. For simplicity's sake, the lower portion of FIG. 5A simply includes a display device, but as one skilled in the art will appreciate, various implementations drive the display of content on display device 508 via a computing device that is communicatively coupled to the display. Further, while display device 508 renders calendar information 510, it is to be appreciated that various implementations are able to scan calendar information without rendering and/or displaying the calendar information on a respective display.

In various scenarios, the personalized analytics system 500 scans calendar information 510 to identify topics and/or events of interest, such as appointments, meetings, and/or contextual words included in the appointments and/or meetings. In response to locating a topic and/or event, various implementations trigger a query analysis based upon various characteristics associated with the identified topic and/or event. For instance, calendar information 510 includes two separate events that can be used to trigger respective query analyses. Event 512 includes the contextual words "sales" and "Product X". Accordingly, in response to identifying these contextual words included in a calendar event, the personalized analytics system triggers a query analysis based upon the identified contextual words. This can include performing augmented queries based upon user information, anecdotal data, alternate wording, etc. In response to scanning event 514, the personalized analytics system identifies the word "Louis" as a contextual word based on anecdotal data that identifies Louis as a customer. In turn, the personalized analytics system automatically triggers a query analysis directed to Louis and/or any business information associated with Louis. In other words, the personalized analytics system triggers an automated query based upon the scan of the calendar information, rather than triggering the query based on explicit user input. The scan of calendar information can be initiated in any suitable manner, such as an automated scan performed by the system at system startup, in response to detecting a user logging into the system, periodically, based on a user-defined schedule, etc. Alternately or additionally, a user can manually initiate a calendar scan, such as through the actuation of a software control button. While described in the context of extracting contextual words from calendar information, alternate or additional sources can be scanned for contextual words as well, such as an Enterprise Resource Planner (ERP), Customer Relationship Management (CRM) software, Marketing Automation Platform (MAP) software, Product Information Management (PIM) software, and so forth.

Various implementations enable a user to define a schedule for triggering user-defined query analyses. To illustrate, consider now the upper portion of FIG. 5B that includes personalized analytics system 500 and display device 516. Similar to that described with respect to display device 508 FIG. 5A, display device 516 renders an example scheduler user interface for discussion purposes, but alternate implementations can trigger query analyses without the scheduler user interface being rendered. In this example, the scheduler displays two user-defined triggers schedules, where the user has defined various contextual and/or keywords to base a query analysis on and a schedule for when to perform the analysis. Here, trigger schedule 518 corresponds to a weekly analysis based on Product X, while trigger schedule 520 corresponds to a monthly analysis on Competitor Y sales. Accordingly, the personalized analytics system triggers a weekly query analysis based upon the contextual word "Product X" and a monthly query analysis based upon the contextual words "Competitor Y" and "sales". The query analysis can include augmented queries as further described herein. While not illustrated here, some implementations provide gradient results, where the personalized analytics system receives input that defines and/or adjusts an amount and/or type of information returned to a user for the query analysis, such as verbose narration, minimal narration, desired charts, desired graphs, disallowed charts, disallowed information, etc. Accordingly, various implementations trigger a query analysis using schedules and/or return gradient content based upon user-defined settings.

Figure 5B:
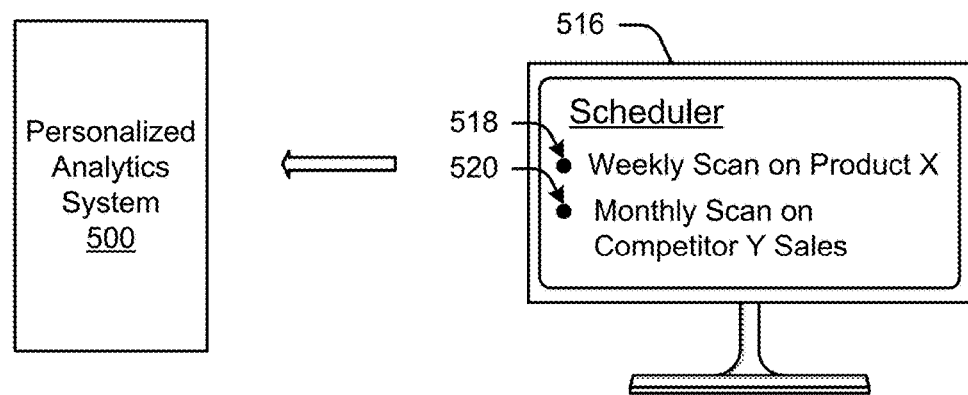
Figure 5B:
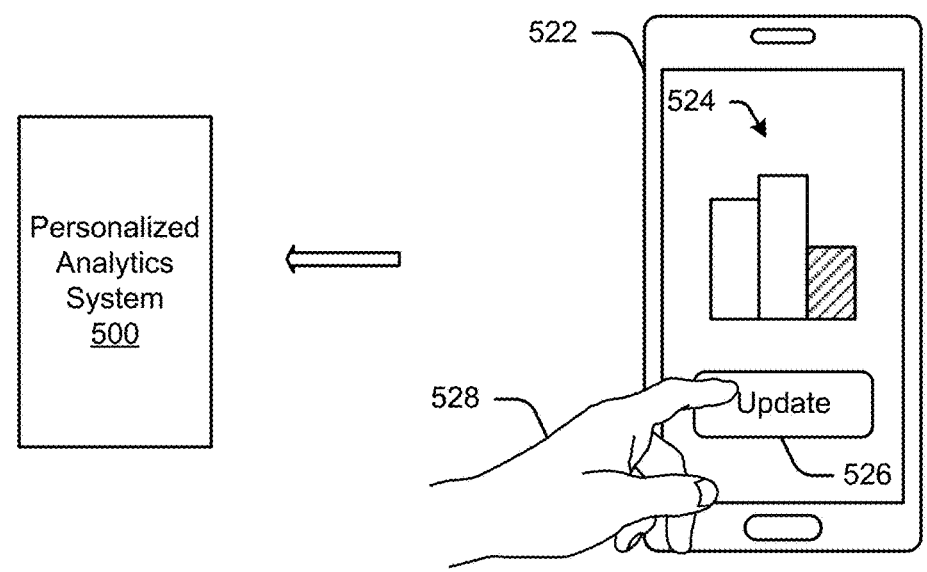

Now consider the lower portion of FIG. 5B that demonstrates another example of triggering a query analysis in accordance with one or more implementations. Here, the lower portion of FIG. 5B includes personalized analytics system 500 and mobile device 522. As in the case of home assistant device 502, display device 508, and/or display device 516, mobile device 522 can be communicatively coupled to, and/or be a part of, the personalized analytics system 500. Here, mobile device 522 displays content 524 that corresponds to information and/or an insight generated by the personalized analytics system 500. Thus, mobile device 522 is in process of outputting content corresponding to a narrated analytics playlist generated by personalized analytics system 500. In various implementations, the personalized analytics system 500 provides the ability to manually trigger a query analysis during playback of content. This is further illustrated in the lower portion of FIG. 5B, where the user interface of mobile device 522 renders control 526. In turn, user 528 actuates control 526 to trigger a query analysis associated with updating the content being currently consumed (e.g., content 524). Accordingly, the inclusion of control 526 allows for manual input that explicitly triggers the query analysis via a single user-interaction (e.g., a one-click activation).

Mobile device 522 renders control 526 during the playback of content 524, but it is to be appreciated that alternate or additional implementations provide controls and/or manual activation of a query analysis in other ways. For example, in some implementations, mobile device 522 displays a dashboard that includes multiple types of content, such as different charts and/or graphs corresponding to a same product, different charts and/or graphs where each chart or graph corresponds to a respective product, an organization chart, and so forth. Various implementations associate a control with one or all of the different types of content that can be actuated to trigger a query analysis as further described herein.

Figure 5C:
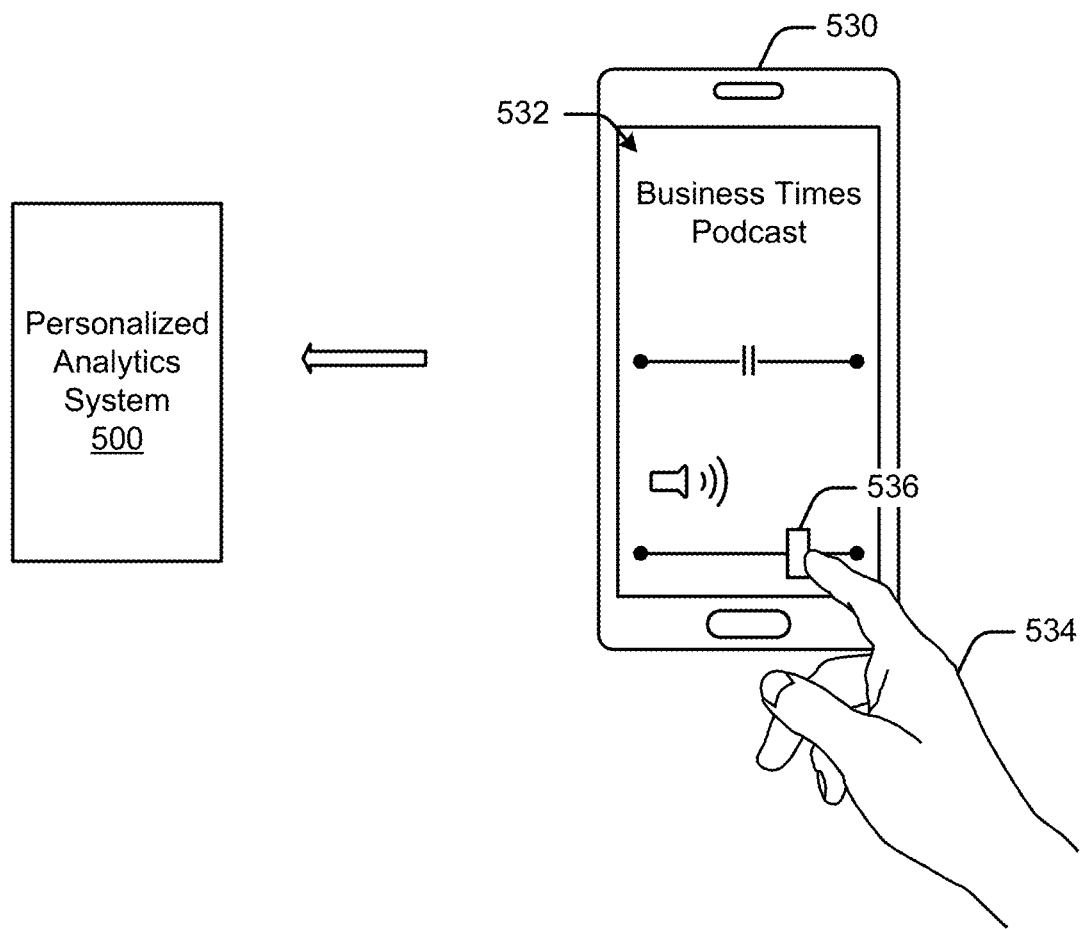

Now consider now FIG. 5C that illustrates an example of implicitly triggering a query analysis in accordance with one or more implementations. FIG. 5C includes personalized analytics system 500 and mobile device 530, where mobile device 530 is in process of playing a podcast 532. Similar to that described with respect to home assistant device 502, display device 508, display device 516, and/or mobile device 522, mobile device 530 communicatively couples to, and/or is part of, personalized analytics system 500 as further described in. Various implementations gather anecdotal data of user interactions, and implicitly trigger a query analysis based upon the anecdotal data. In other words, the personalized analytics system 500 gathers information associated with user interactions, and determines to trigger a query analysis based on interpreting the user interactions as implicit feedback.

Unlike control 526 of FIG. 5B that is explicitly dedicated to triggering a query analysis, the user interactions pertain to alternate functionality. For instance, user 534 interacts with volume control 536 at a particular point in time during the podcast to increase the volume of the audio being output. In turn, the personalized analytics system 500 collects information about the user interaction and interprets this interaction as implicit positive feedback of the content being output since the audible volume is being increased. In response to determining the user has entered implicit positive feedback, the personalized analytics system 500 identifies a topic and/or keywords associated with the feedback, and triggers a query analysis based on the identified topic and/or keywords. Thus, various implementations of the personalized analytics system 500 can trigger query analyses based off of implicit user interactions, rather than explicit user interactions as further described herein. The personalized analytics system 500 can determine the associated topic and/or keywords in any suitable manner, such as by identifying a general topic associated with the podcast, a topic being output at a point in time the implicit positive feedback is received, content being displayed on a user interface at the point in time the implicit positive feedback is received, etc.

While the personalized analytics system 500 can collect information about user interactions, various implementations alternately or additionally provide mechanisms to disable tracking user interaction and/or gathering information about the user interactions, such as through the use of software controls and/or customizable settings. This allows a user to have control over the information associated with a user profile and/or workspace, thus providing the user with privacy options. In some scenarios, the personalized analytics system 500 includes gradient privacy settings that define and/or set a level of how much information is collected, how much information is saved, what information is ignored, etc. (e.g., a first privacy level corresponding to tracking all user interactions, a second privacy level corresponding to disable tracking all user interactions, a third privacy level that tracks only user interactions with a playback module, a fourth privacy level corresponding to disabling tracking correspondences, a fifth privacy level corresponding to disabling tracking calendar appointments, etc.). To demonstrate, consider a scenario in which a client device collects and forwards information about user interactions to the personalized analytics system 500. Various implementations display a user interface at the client device that provides access to privacy settings, thus enabling a user to enter input that changes what information personalized analytics system can and cannot track. For example, the user can enter input that disables tracking all user interactions user interactions. In response to receiving the privacy setting input, the personalized analytics system 500 disables collecting information about user interactions at the client device.

Figure 6:
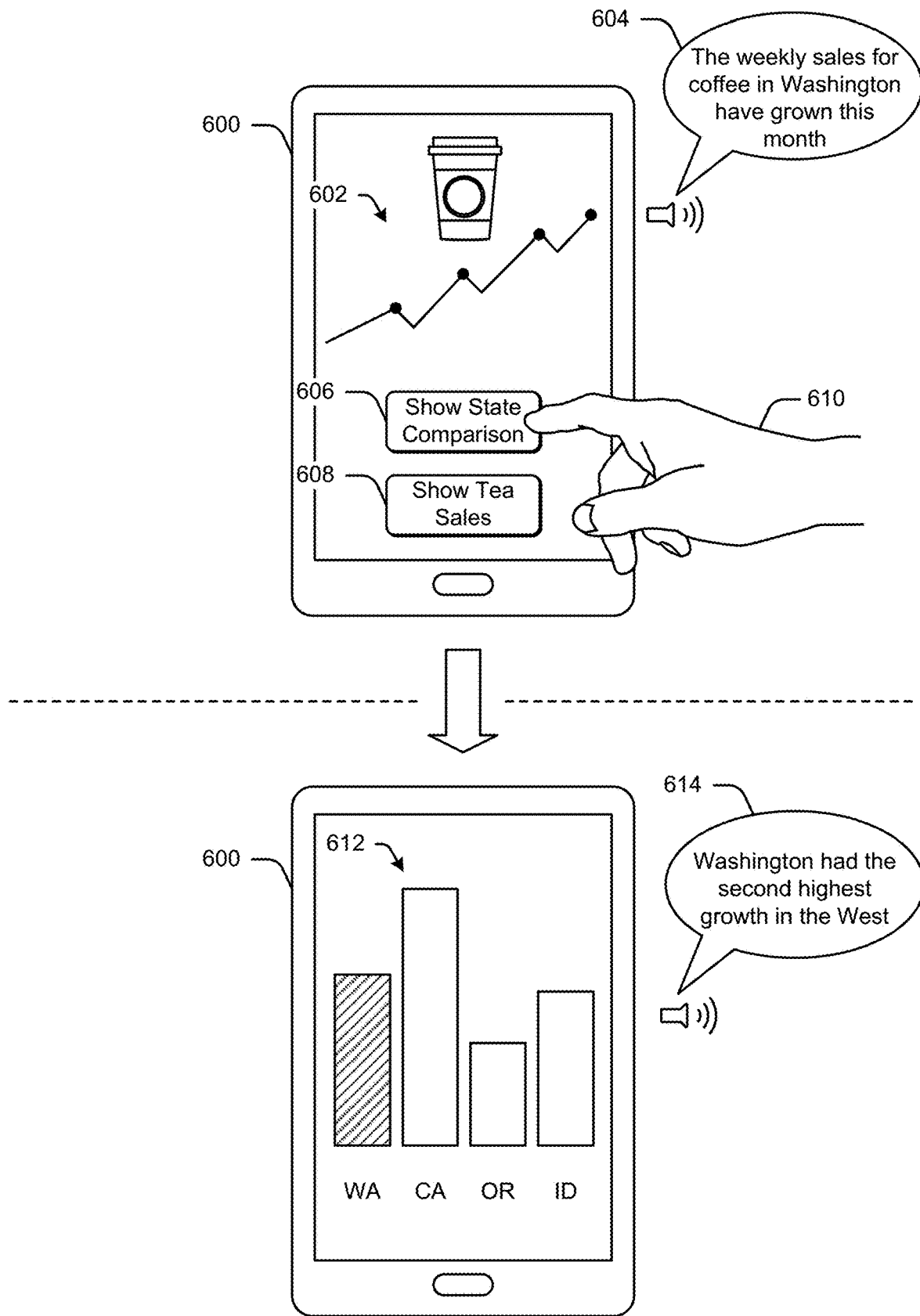
FIG. 6 illustrates generating drill path content in accordance with one or more implementations.

Various implementations alternately or additionally modify what is presented in real-time and/or while a playlist is being consumed. To further demonstrate, consider now FIG. 6 that illustrates an example of automatically generating drill-path content during playback in accordance with one or more implementations. In various scenarios, the example described with respect to FIG. 6 can be considered a continuation of one or more examples described with respect to FIGS. 1-4 and 5A-5C. FIG. 6 illustrates an example progression of events over an arbitrary time period, where the progression begins in the upper portion of FIG. 6, followed by the lower portion of FIG. 6. It is to be appreciated that the progression of events described with respect to FIG. 6 is for discussion purposes, and that any other ordering, omission, and/or addition to the events can occur without departing from the scope of the claimed subject matter.

The upper portion of FIG. 6 includes tablet 600 that is in process of rendering and/or outputting playlist content 602. Here, playlist content 602 corresponds to a statically bundled narrated analytics playlist generated by the personalized analytics system and delivered to tablet 600 for consumption. The phrase "statically bundled content" is used to denote fixed content that includes ordered and predefined content, such as a playlist with a fixed number of charts, a fixed number of graphics, fixed narration and/or description, etc. In various implementations, tablet 600 receives statically bundled content from remote devices, such as via servers 102 of FIG. 1. Alternately or additionally, tablet 600 generates the statically bundled content via a standalone application and/or by access to cloud-based services provided by servers 102.

The content displayed by tablet 600 in the upper portion of FIG. 6 includes playlist content 602 that corresponds to a sales chart of coffee sales in the state of Washington. The statically bundled content being rendered and/or output by tablet 600 also includes audible content 604 that provides a narrative description and/or additional context information corresponding to playlist content 602. Various implementations dynamically generate content during playback of statically bundled content. In other words, the personalized analytics system 500 can receive input requests for supplemental information corresponding to the rendered and/or output content, such as drill-up or drill-down items. To illustrate, the user interface being rendered by tablet 600 during playback of playlist content 602 includes control 606 and control 608, each of which corresponds to dynamically generating supplemental information. In FIG. 6, control 606 corresponds to dynamically generating a comparison chart based on regional information, while control 608 corresponds to dynamically generating a sales chart for a different, but related, product. In response to a control being actuated, the personalized analytics system 500 receives an input associated with the actuation and generates output content that was not included in the statically bundled information. Here, user 610 actuates control 606 to view a comparison chart that corresponds to requesting and/or generating drill-up content. One or more implementations generate drill-up or drill-down content autonomously based on machine-learning algorithms that learn and/or identify a user preference. As one non-limiting example, various implementations generate the drill-up content or drill-down content based on user-preferences that define a scope and/or amount of drilling content to present, such as through an evaluation of historical patterns associated with a user profile, trends associated with the user profile, etc. This can include analyzing the associated metadata and/or extracting additional curated data to generate the drill-up content and/or drill-down content.

Moving to the lower portion of FIG. 6, the personalized analytics system 500 interrupts the outputting of playlist content 602 to output supplemental content 612. Here, supplemental content 612 includes a comparison chart that compares sales figures of coffee in various regions. The supplemental content includes audible content 614 to provide a narrative description and/or additional context information associated with the dynamically generated content. The dynamic generation of content can be performed in any suitable manner. For example, some implementations use metadata included in the statically bundled content to generate new charts, graphs, narrative content, etc. Alternately or additionally, tablet 600 triggers a query analysis that includes a topic associated with the actuated control. Thus, in some implementations, tablet 600 receives the supplemental information from a remote computing device and/or generates the supplemental via a query analysis as further described herein. Various implementations alternately or additionally provide the ability to modify and/or customize statically bundled content and/or dynamically generated content.

Figure 7:
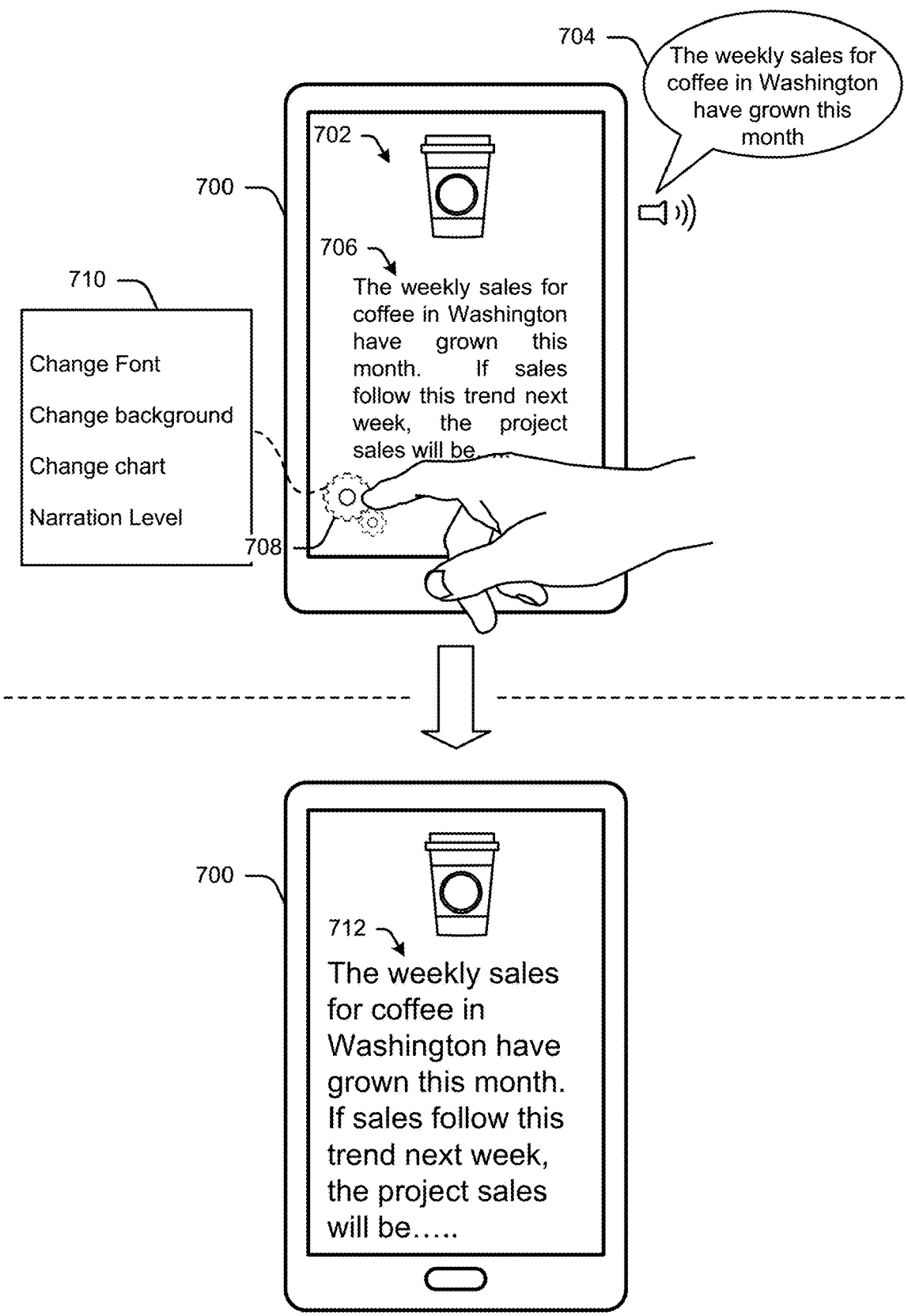
FIG. 7 illustrates an example of user-defined customizations to a personalized analytics system in accordance with one or more implementations.

To demonstrate, consider now FIG. 7 that illustrates an example of the user-defined customizations in accordance with one or more implementations. In various scenarios, the example described with respect to FIG. 7 can be considered a continuation of one or more examples described with respect to FIGS. 1-4, 5A-5C, and 6. FIG. 7 illustrates an example progression of events over an arbitrary time period, where the progression begins in the upper portion of FIG. 7, followed by the lower portion of FIG. 7. It is to be appreciated that the progression of events described with respect to FIG. 7 is for discussion purposes, and that any other ordering, omission, and/or addition to the events can occur without departing from the scope of the claimed subject matter.

Similar to that described with respect to FIG. 6, the upper portion of FIG. 7 includes tablet 700 that is in progress of outputting playlist content 702 that includes a descriptive narrative in the form of audible output 704. The playlist content also includes text 706 that corresponds to the content included in audible output 704 that displays readable content in parallel with the corresponding audible output. The user interface displayed by tablet 700 also includes setting control 708 that, when actuated, exposes user-configurable settings, such as those illustrated in menu 710. For example, menu 710 as illustrated in FIG. 7 includes configurable settings for changing a displayed font (e.g., font type, size, color, etc.), changing a background image (e.g., image, pattern, color, etc.), changing a displayed chart (e.g., chart size, color, form, shape, preferred charts, disallowed charts, etc.), and changing a narration level (e.g., minimal narration, medium narration, verbose narration, etc.). It is to be appreciated that the settings displayed by menu 710 are merely for discussion purposes, and that various implementations include alternate or additional user-configurable settings. For example, various implementations provide the ability to customize themes that control multiple facets of what is displayed (e.g., a font type, a font size, a color pallet, cursor types, etc.), such as through the use of selectable user interface controls. In response to receiving input that defines and/or configures a setting, various implementations modify the setting and/or apply the modified setting to content in real-time while a playlist is being consumed. However, while described in the context of applying settings during output of a narrated analytics playlist, alternate or additional implementations apply the settings at times other than when a narrated analytics playlist is being output. In other words, the settings can be statically applied independent of rendering and/or outputting a playlist.

Moving to the lower portion of FIG. 7, tablet 700 displays modified text 712 based upon the modified user-defined settings. Here, modified text 712 has an increased font size relative to text 706.

Figure 8A:
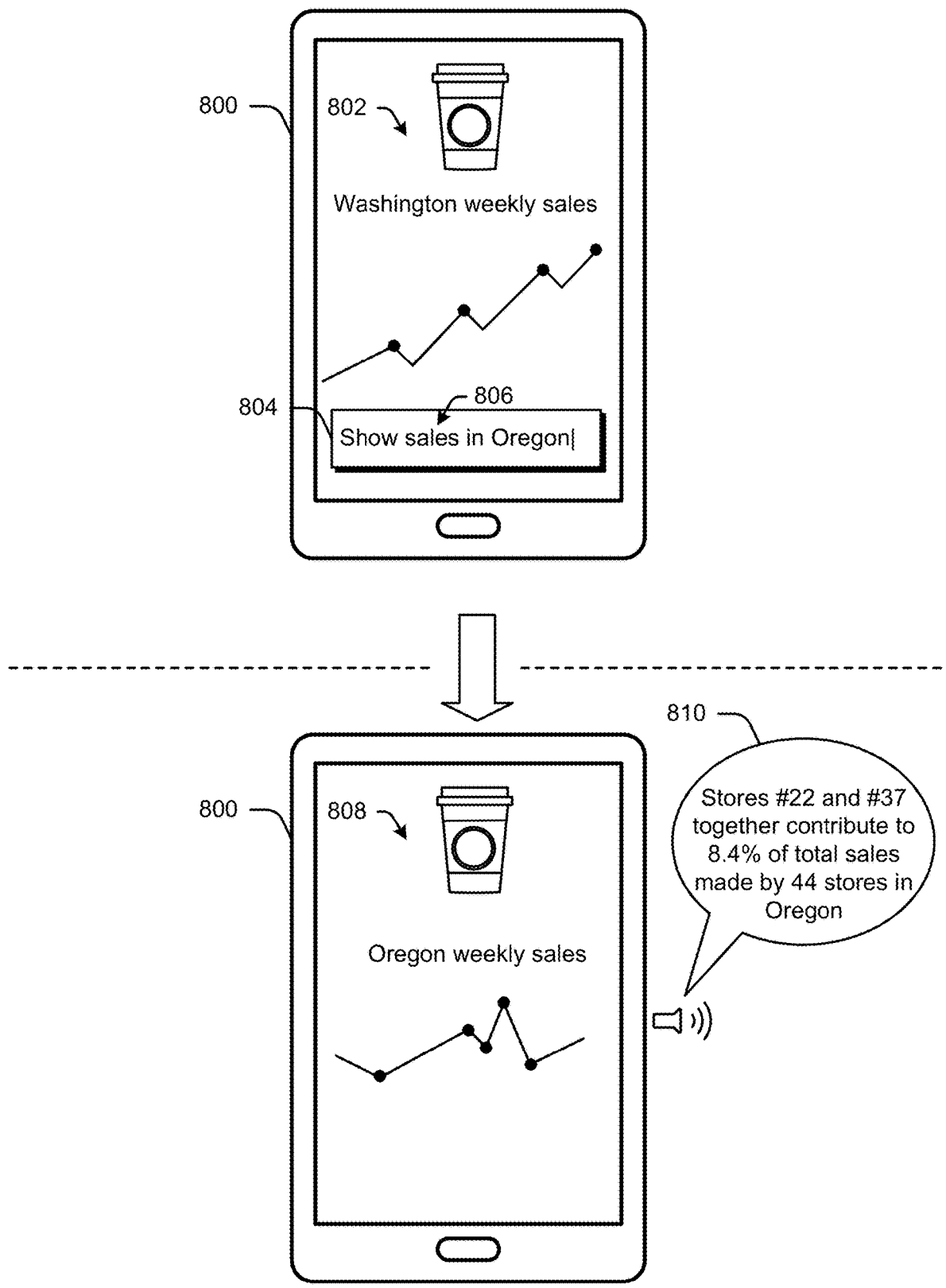
FIGS. 8A and 8B illustrate an example of analytic assistance during playback of content in accordance with one or more implementations.
Figure 8B:
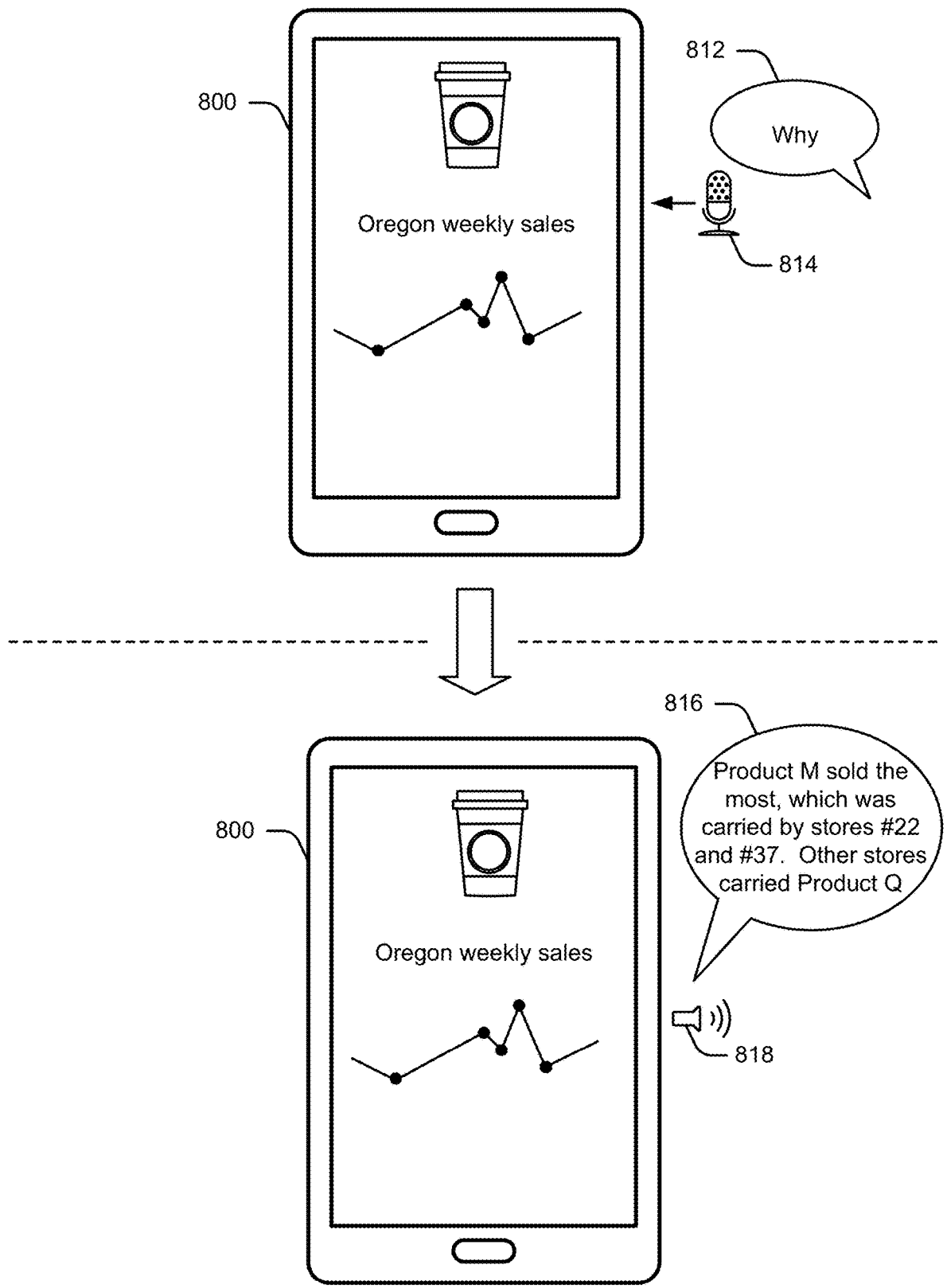

Now consider FIGS. 8A and 8B that illustrate an example of analytic assistance during playback in accordance with one or more implementations. In various scenarios, the example described with respect to FIGS. 8A and 8B can be considered a continuation of one or more examples described with respect to FIGS. 1-4, 5A, 5B, 5C, 6, and 7. FIGS. 8A and 8B collectively illustrate an example progression of events over an arbitrary time period. Here, the progression begins in the upper portion of FIG. 8A and then moves to the lower portion of FIG. 8A. The progression then moves to the upper portion of FIG. 8B, followed by the lower portion of FIG. 8B. It is to be appreciated that the progression of events described with respect to FIGS. 8A and 8B is for discussion purposes, and that any other ordering, omission, and/or addition to the events can occur without departing from the scope of the claimed subject matter.

The upper portion of FIG. 8A includes tablet 800 that is in process of outputting playlist content 802 that corresponds to a sales chart in a region corresponding to Washington State. While not illustrated here, various implementations output a narrative description as part of the consumption of playlist content 802. The user interface displayed via tablet 800 includes a search field 804 that provides a mechanism for manually entering search keywords and/or initiating a query analysis. In this example, search field 804 includes input query string 806. In various implementations, the personalized analytics system 500 performs a query analysis based on input query string 806 and/or contextual information associated with the current content being rendered and/or output by tablet 800. For instance, input query string 806 requests sales information for a region corresponding to Oregon State. In turn, the personalized analytics system 500 augments the search by using contextual information associated with playlist content 802. In other words, the personalized analytics system 500 identifies that the playlist content corresponds to weekly coffee sales, and augments input query string 806 to search for weekly coffee sales in Oregon, even though input query string 806 does not specify "weekly" or "coffee". This allows the personalized analytics system 500 to provide the user with analytic assistance to acquire additional information not included in the statically bundled content of playlist content 802. While input query string 806 enters text-based input as a way to trigger a query analysis, alternate or additional implementations receive commands and/or queries in alternate formats, examples of which are provided herein. In response to receiving the query, the personalized analytics system 500 triggers a query analysis and/or generates modified content using metadata included with playlist content 802. In one or more implementations, the personalized analytics system 500 generates a suggested query and/or a suggested action as part of the modified content, such as alternate words to include in a query, alternate actions to initiate, etc. For instance, the personalized analytics system 500 can analyze an associated user profile using various machine-learning algorithms to identify queries with positive feedback, actions with positive feedback, preferred actions, associated keywords with a higher probability of success, and so forth, to base a suggested query and/or suggested action on, such as a suggested action to request sales information for a competitor, a suggested action to generate diagnostic information associated with a product, alternate keywords to include, etc.

To demonstrate, consider a scenario in which the personalized analytics system identifies an insight associated with customer purchasing behavior. The insight can be based on any suitable type of data, such as anecdotal data, curated data, data actively being used by the personalized analytics system during, a period of time, data at rest (e.g., data stored in a database), data in motion (e.g., data being collected in real-time), and so forth. The personalized analytics system can derive the insight using any one or combination of these data types. Some implementations alternately or additionally generate a suggested action based on the insight, such as a suggestion to conduct marketing campaigns based on the insight associated with the customer purchasing behavior.

Thus, various implementations of the personalized analytics system provide suggestions to the user, in lieu of, and/or in addition to, insights. This can include suggesting different analyses to run and/or different results to request. In some implementations, the personalized analytics system provides suggestions during output and/or the rendering of a narrated analytics playlist. Alternately or additionally, various implementations provide the suggestions after performing a query analysis (but before generating the narrated analytics playlist), when a user logs into the personalized analytics system 500, etc., in response to identifying a trigger event, etc.

Moving to the lower portion of FIG. 8A, and in response to the input query string, tablet 800 displays modified content 808 that includes audible narration content 810. Here, the audible narration content 810 provides the additional context information of "Stores #22 and #37 together contribute to 8.4% of total sales made by 44 stores in Oregon" to deliver information that explains a context to what the corresponding content indicates. In various implementations, this additional context information corresponds to an insight identified by the personalized analytics system 500.

In the upper portion of FIG. 8A, input query string 806 includes multiple keywords that are used in the query analysis. However, alternate or additional implementations support one-word query analytics as well. To further demonstrate, consider now the upper portion of FIG. 8B in which the personalized analytics system, by way of tablet 800, receives a one-word audible input 812 via microphone 814. In response to receiving the one-word audible input, the personalized analytics system identifies the current content being rendered and/or output by tablet 800 (e.g., modified content 808), and uses this information to add contextual parameters to the input query. Alternatively or additionally, the personalized analytics system identifies the previously rendered content (e.g., playlist content 802) to acquire context information and/or add contextual parameters to the user input request. The personalized analytics system then performs a query analysis and/or analyzes the corresponding metadata associated with modified content 808 to generate a response to the input query.

In the lower portion of FIG. 8B, tablet 800 outputs narrative description 816 audibly via speaker 818 that corresponds to a result of the one-word input query. In some implementations, the personalized analytics system generates visual content in response to the one-word input query, such as text content, charts, graphs, videos, etc. Accordingly, various implementations receive a one-word input command, request, and/or query, and gather relevant information to identify insights and/or generate a response to the query. As further described herein, this can include identifying anecdotal data, and applying the anecdotal data in generating the response.

Figure 9:
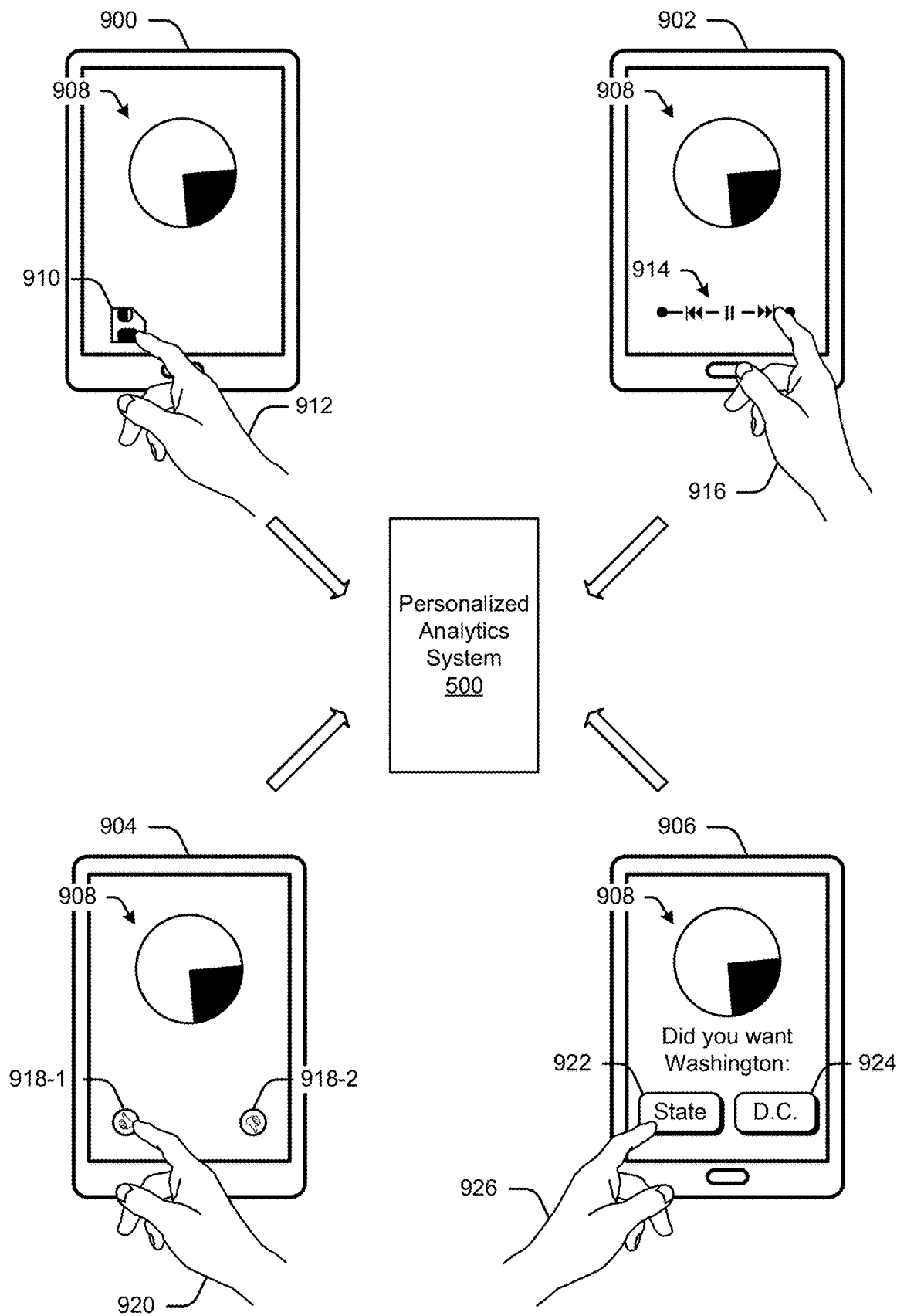
FIG. 9 illustrates an example of capturing usage analytics with respect to a user profile in accordance with one or more implementations.

Now consider FIG. 9 that illustrates examples of capturing and/or generating anecdotal data associated with a user profile and/or workspace in accordance with one or more implementations. In various scenarios, the example described with respect to FIG. 9 can be considered a continuation of one or more examples described with respect to FIGS. 1-4, 5A, 5B, 5C, 6, 7, 8A, and 8B.

FIG. 9 includes personalized analytics system 500 of FIG. 5A-C that is generally representative of the personalized analytics system described in FIG. 1, such as servers 102 and/or computing device 104. FIG. 9 also includes tablet 900, tablet 902, tablet 904, and tablet 906 that, similar to home assistant device 502, display device 508, display device 516, mobile device 522, and/or mobile device 530 of FIGS. 5A-5C, are communicatively coupled to, and/or are part of, personalized analytics system 500 as further described herein.

Tablet 900 is currently in a state of rendering and/or outputting playlist content 908, where playlist content 908 represents analytic content generated by the personalized analytics system. The user interface displayed by tablet 900 includes a control 910 that has an associated action corresponding to saving the current content being displayed and/or output. Accordingly, in response to user 912 actuating control 910, the personalized analytics system saves a screenshot of the content being rendered and/or saves a clip of the corresponding audio that is being output (not illustrated here). Various implementations identify the actuation of control 910 as implicit positive feedback, and subsequently determine to capture anecdotal data, such as identifying the content being output and/or marking the content as user-preferred content. This can include identifying a topic associated with the pie-chart as being of interest and/or identifying the pie-chart format as a user-preferred chart type. In turn, the personalized analytics system references the anecdotal data when generating future content, such as determining to render a pie-chart in a future narrated analytics playlist for the user profile associated with user 912.

As another example of capturing anecdotal data, consider now tablet 902 that also is in process of outputting playlist content 908. Here, the user interface of tablet 900 includes playback controls 914 that interface with a playback module to allow input that modifies the rendering and/or playback of playlist content 908, such as pausing the content, rewinding the content, skipping the content, etc. With respect to tablet 902, user 916 actuates a control of playback controls 914 that causes the corresponding playback module to skip outputting the current content. Various implementations of the personalized analytics system interpret this input as implicit negative feedback, and determine to collect context information to generate anecdotal data for the corresponding user profile. Similar to that described with respect to tablet 900, this can include identifying a topic associated with the current topic and/or a displayed format, and determining to avoid these topics and/or formats for a user profile associated with user 916.

While tablet 902 demonstrates an example of personalized analytics system 500 interpreting user interactions as implicit feedback, tablet 904 illustrates an example of explicit feedback. For example, the user interface of tablet 904 includes an explicit positive feedback control 918-1 and an explicit negative feedback control 918-2. Accordingly, user interaction with either controls provides the personalized analytics system with explicit feedback. In response to user 920 actuating explicit positive feedback control 918-1, personalized analytics system 500 identifies corresponding context information, and stores the information as anecdotal data as further described herein.

Various implementations identify user distinctions for ambiguous words as anecdotal data. To further illustrate, consider a scenario illustrated by tablet 906 that is in process of outputting playlist content 908. In this scenario, the personalized analytics system receives an input request for analytic assistance from the personalized analytics system, such as via an input query through a search field similar search field 804 of FIG. 8A (not illustrated here). The input query includes an ambiguous term which the personalized analytics does not have enough data to resolve, such as the term "Washington" that can refer to Washington State or Washington D.C. Various implementations prompt for input corresponding to additional context information and/or clarification, and store the additional information as anecdotal data associated with a corresponding user profile and/or workspace. For instance, the user interface of tablet 906 includes control 922 that corresponds to Washington State, and control 924 that corresponds to Washington D.C. In turn, user 926 actuates control 922 to provide additional context information that is received and stored by the personalized analytics system as anecdotal data.

Figure 10:
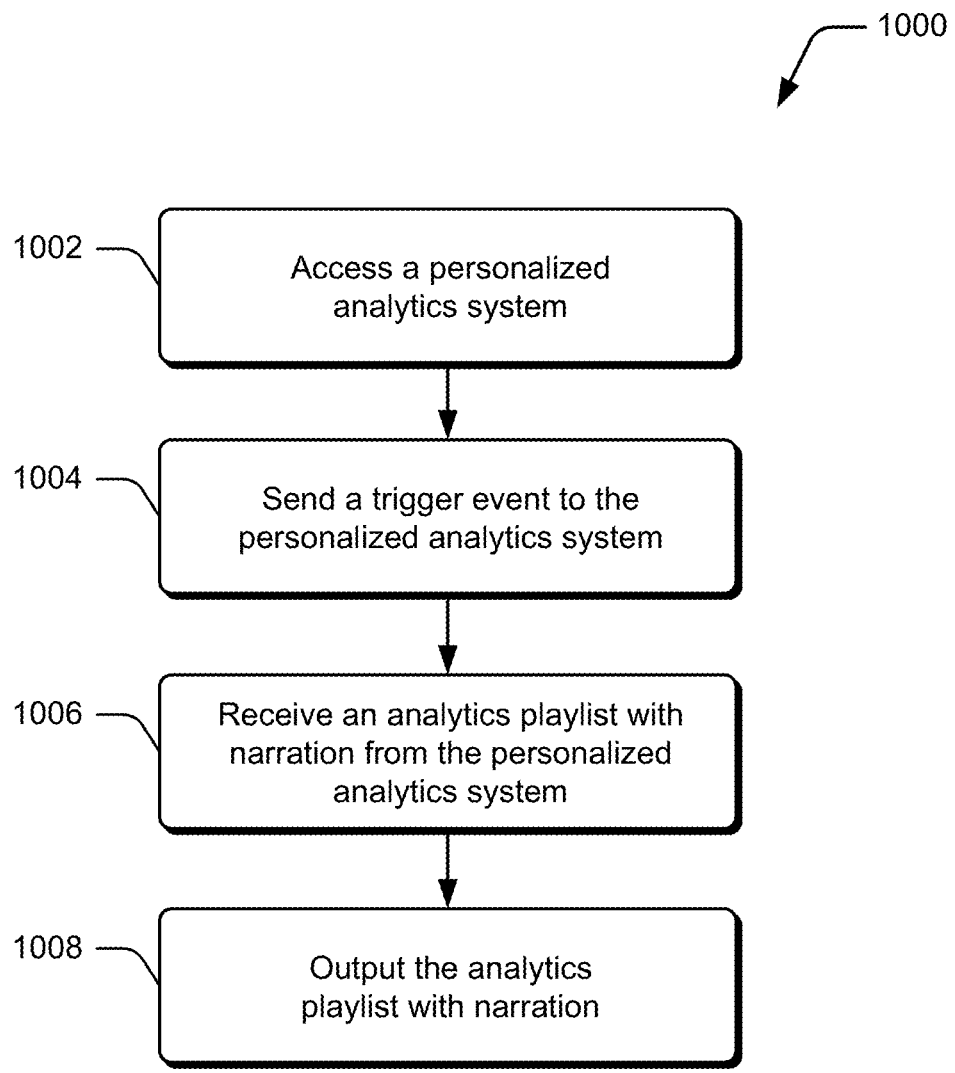
FIG. 10 illustrates a flow diagram of accessing a personalized analytics system to obtain a narrated analytics playlist in accordance with one or more implementations.

Now consider FIG. 10 that illustrates an example method 1000 that can be utilized to obtain narrated analytics playlists in accordance with one or more implementations. The method can be performed by any suitable combination of hardware, software, and/or firmware. In at least some embodiments, aspects of the method can be implemented by one or more suitably configured hardware components and/or software modules, such as various hardware and/or software modules associated with servers 102 and/or computing device 104 of FIG. 1, such as various modules included in personalized analytics module 106 and/or client analytics module 108. While the method described in FIG. 10 illustrates these steps in a particular order, it is to be appreciated that any specific order or hierarchy of the steps described here is used to illustrate an example of a sample approach. Other approaches may be used that rearrange the ordering of these steps. Thus, the order steps described here may be rearranged, and the illustrated ordering of these steps is not intended to be limiting.

At 1002, various implementations access a personalized analytics system. For example, a client device that includes a client application of the personalized analytics system (e.g., client analytics module 108) and/or a browser can access a server application of the personalized analytics system. This can include logging on to a particular workspace associated with the personalized analytics system, such as through the use of various types of authentication procedures. Thus, accessing the personalized analytics system can include logging onto a locally executing application and/or accessing remote applications a further described herein. Any suitable type of client device can be utilized, examples of which are provided herein.

In response to accessing the personalized analytics system, various implementations send a trigger event to the personalized analytics system at 1004, where the trigger event is associated with initiating, invoking, and/or performing a query analysis, such as a query analysis performed by any combination of parser module 112, query magnifier module 114, and/or insight engine module 116. Various implementations display a control explicitly assigned to triggering a query analysis, such as a search box, a scheduler application, an analytic assistance control, etc. Alternately or additionally, various implementations display controls that, when actuated, are implicitly interpreted as a command to initiate, invoke, and/or perform a query analysis. In some implementations, the trigger event includes an input query string that is used as a basis for the query analysis, such as a search query entered into a search box. Alternately or additionally, the input query string used for the query analysis is automatically generated by the personalized analytics system, such as through the use of anecdotal data, contextual information, etc. One or more implementations process audible input to identify keywords associated with triggering a query analysis and, in response to identifying the keywords, send a trigger event to the personalized analytics system.

At 1006, one or more implementations receive a narrated analytics playlist from the personalized analytics system, where the analytics playlist includes one or more insights generated by the personalized analytics system. As one non-limiting example, client analytics module 108 of FIG. 1 can receive the narrated analytics playlist from personalized analytics module 106 over communication cloud 128. Various implementations base the insights off of the trigger event, information included in the trigger event, derived contextual information, etc. A narrated analytics playlist can include data in any suitable format, such as an audio clip, a video clip, a slideshow, metadata, addressing information, user profile identification information, etc. Various implementations statically bundle the content included in a narrated analytics playlist, including information that can be utilized to dynamically generate supplemental information as further described herein.

At 1008, one or more implementations output the narrated analytics playlist effective to output images and audio, such as through the use of playback module 132 and/or user interface module 130 of FIG. 1. Some implementations utilize a playback engine associated with the personalized analytics system such that the playback engine captures anecdotal data about user interactions with the output content. The playback engine can represent any type of playback module, such as playback module 132 of FIG. 1, playback module 1120 of FIG. 11, and/or playback module 1800 of FIG. 18. In turn, the playback engine stores the anecdotal data within the personalized analytics system for future use. As further described herein, some implementations provide analytic assistance while outputting narrated analytics playlist content, and interrupt the playback of the narrated analytics playlist content to instead output the dynamically generated insights and/or responses. As one example, the personalized analytics system can access the metadata statically bundled with the narrated analytics playlist to dynamically generate drill-up and/or drill-down content.

Having described various aspects of narrated analytics playlists, consider now a discussion of data acquisition and analysis in accordance with one or more implementations.

Data Acquisition and Analysis

Various implementations generate narrated analytics playlists by curating data and analyzing the curated data in various ways to identify insights that are relevant to a particular user profile and/or workspace. In a statistical context, incorporating more curated data, as well as anecdotal data, into the analysis increases the probability of identifying relevant and accurate insights pertaining to the user profile. However, using more data to generate analytical reports adds complexity to the analysis process, such as impacting how large volumes of data are acquired, sorted, classified, tagged, accessed, and so forth. To illustrate, acquiring, sorting, classifying, and analyzing two pieces of information utilizes less organization and effort relative to two-hundred thousand pieces of information. Further, these various steps in the analysis process factor-ally increase when the attributes of each piece increase in number as well. This additionally makes manually processing the data difficult and/or infeasible.

Various implementations employ a personalized analytics system to process, sort, classify, and/or analyze various types of data as further described herein. In turn, the personalized analytics system improves the way a corresponding computing device functions by at least improving search times and reducing memory space needs relative to past systems. For example, the data curation process can consolidate curated data using a data structure that has been designed to optimally store the data (e.g., minimal space requirements) and provide quick access to data retrieval processes (e.g., improved cross-referencing, tag keywords, relational models, etc.). As another example, the use of machine-learning technologies to analyze and identify how data is curated, to identify insights, and/or to augment the insights can enhance the speed at with these various processes are performed.

Figure 11:
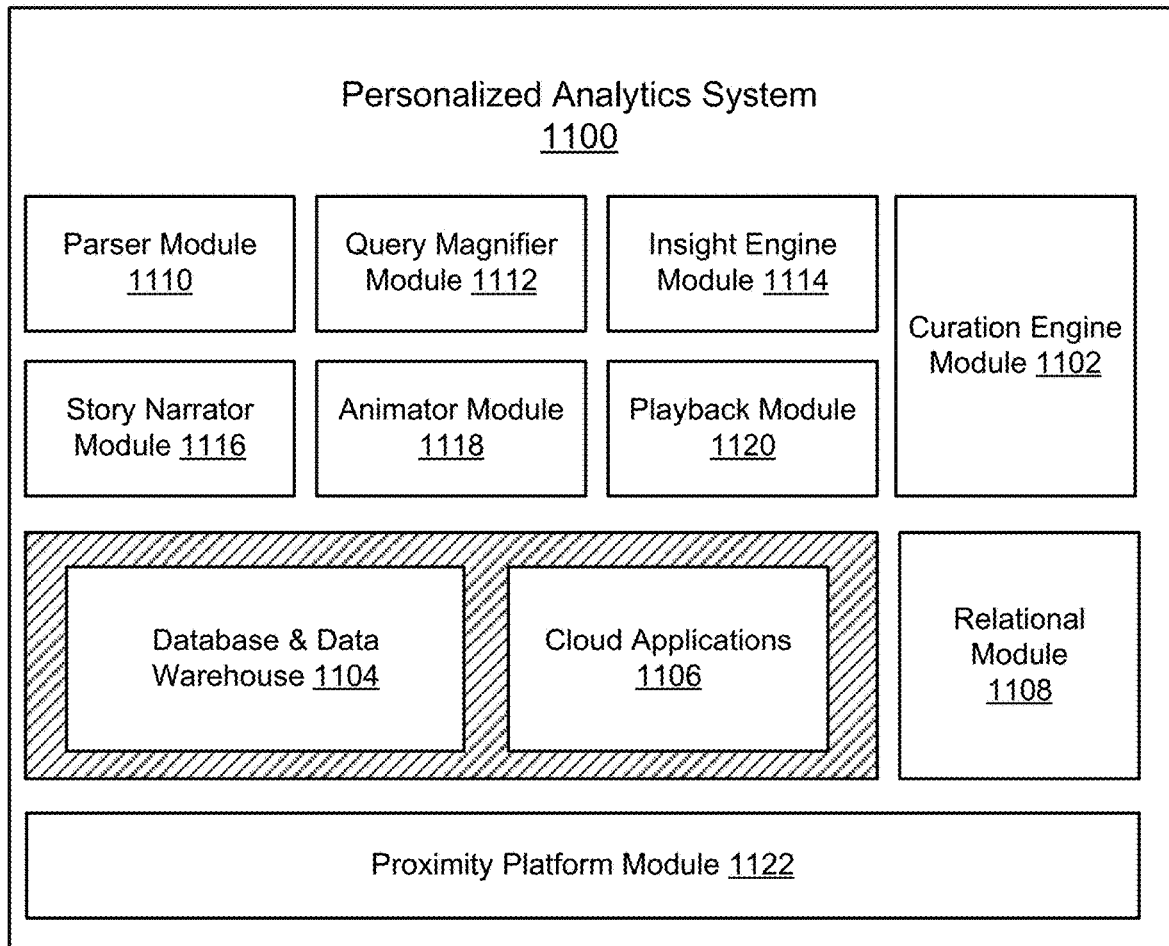
FIG. 11 illustrates an example a personalized analytics system in accordance with one or more implementations.

To demonstrate, consider FIG. 11 that illustrates an example block diagram that can be utilized to generate narrated analytics playlists in accordance with one or more implementations. In various scenarios, the example described with respect to FIG. 11 can be considered a continuation of one or more examples described with respect to FIGS. 1-4, 5A, 5B, 5C, 6, 7, 8A, 8B, 9, and 10.

FIG. 11 includes a personalized analytics system 1100 that can be implemented using various combinations of computing devices and/or modules, such as varying combinations of servers 102, computing device 104 of FIG. 1. The personalized analytics system 1100 includes curation engine module 1102 that generally scans data sources, such as database and data warehouses 1104 and/or cloud applications 1106, to identify source data that is subsequently curated and/or enriched by the curation engine module 1102 data as it is populated into the personalized analytics system. Any suitable type of database, data warehouse, and/or cloud application can be accessed and/or scanned for data, such as Structured Query Language (SQL) databases, enterprise data warehouses, data marts, Software-As-A-Service (SaaS) based applications, Google™ Cloud SQL databases, Amazon RedShift, Snowflake, Microsoft™ SQL database, Sage Inacct™, Netsuite™, Salesforce etc. Curation engine module 1102 can scan databases in real-time, such as in response to a query and/or trigger event, can perform scans at scheduled intervals, can perform scans offline during idle periods when no user interaction with the system is detected, etc.

In response to acquiring the source data, the curation engine module 1102 analyzes the source data to identify characteristics and/or attributes that are then added to the source data to generate curated data. Any type of characteristic and/or attribute can be identified, such as location information, organization information, product information, cross-references to other data, lifespan of the source data, categorization of the source data, updates to the source data, annotations associated with the source data, identifying whether the source data is obsolete, relationship to other source data, and so forth. In other words, the curation engine module 1102 accesses and scans various data sources for data, analyzes the data to identify various characteristics about the data, and then curates and/or augments the data with the identified characteristics, such as by updating metadata associated with the source data. Curating the source data can alternately or additionally include identifying data relationship models, drill path information, periodically updating the curated data, etc.

In various implementations, curation engine module 1102 applies and/or utilizes user-defined rules, such as rules that prioritize database access, rules that prioritize what data to update more frequently relative to other data, etc. For instance, a user can create a workspace associated with the personalized analytics system such that the user assigns each workspace to a particular database and/or data source. This directs the curation engine module 1102 to curate data from the identified data source. Alternately or additionally, the user can assign a collection of particular databases and/or data sources to the workspace. As yet another example, a user can assign a login name and password to the workspace to secure and/or restrict access to curated data so that only authorized users with valid user credentials can access to the curated data.

Some implementations of the curation engine module 1102 identify and/or generate inter-data relationship information, and store this information in relational module 1108. Alternately or additionally, relational module 1108 represents data relationships identified by the curation engine module that are used to form data structures within a corresponding database. In one or more implementations, curation engine module 1102 automatically triggers the data curation process without receiving explicit input associated with initiating the process, but alternate or additional implementations trigger the data curation process in response to receiving explicit input to initiate data curation. Access to the curated data can be restricted and/or limited to a single user profile and/or workspace, and/or can be distributed across multiple user profiles and/or workspaces, such as user profiles and/or workspaces associated with a same organization. This allows the curated data and/or analytics generated for a first user in the organization to be leveraged for analytics associated with a second user of the organization, thus improving the efficiency of the personalized analytics system across the organization since the information is shared, rather than repeatedly generated for each user profile.

Personalized analytics system 1100 also includes parser module 1110 and query magnifier module 1112 to analyze input query strings, and identify various permutations of the input query to use in extracting information from the curated data. For instance, parser module 1110 can parse input query strings into individual tokens and/or units, where the analyzed input query string originates from any suitable source, such as curation engine module 1102, user-defined schedules, event-based triggers, feedback loops from other modules included in the personalized analytics system, etc. Thus, parsing an input query string can be done in real-time based on receiving an explicit user-input query, based on receiving a trigger event, based on scheduled query interval(s), based on determining the personalized analytics system 1100 is idle (e.g., a lack of user interaction with the personalized analytics system), etc. In response to parsing the input query string into individual tokens, various implementations of the parser module further analyze the individual tokens to identify keywords, context information, etc.

Query magnifier module 1112 receives a canonical query from parser module 1110, such as the identified keywords, context information, etc., and determines whether to add additional constraints and/or contextual information to the query, such as time ranges, location information, etc. Alternately or additionally, query magnifier module 1112 identifies additional attributes associated with the canonical query, a corresponding relevance of the additional attributes, and whether to generate variations of the query using the additional attributes. In various implementations, query magnifier module 1112 accesses anecdotal data to augment the query, such as a last known query time that can influence time constraints, a user role, a user job position, a user group, past user query history, a device being used to access the personalized analytics system, a location of the user, a business department associated with the user, a language associated with the user, an organizational vocabulary, and so forth. Query magnifier module 1112 can generate queries that are likely to be of interest to the user based upon the distributed knowledge. Thus, various implementations generate new queries, where the new queries are configured to identify new and related subject matter, remove biases from the extracted information, identify efficient database query mechanisms, etc.

The newly generated queries and/or the original input query are then used by insight engine module 1114 to extract information from the curated data. Insight engine module 1114 analyzes the extracted information to identify one or more insights, such as by applying various machine-learning algorithms to the extracted information. An insight can include any suitable type of information, such as a trend, a pattern, an anomaly, an outlier, predictive behavior, a contradiction, connections, benchmarks, market segments, etc. Accordingly, an insight sometimes corresponds to an actionable finding that is based upon data analysis. For example, a rate of growth in sales for a product corresponds to a factual insight that a user can base future actions off of, such as a low rate of growth indicating a change is needed, a high rate of growth indicating that current solutions are working, and so forth. Insight engine module 1114 can apply any suitable type of machine-learning model and/or algorithm to discover an insight, such as cluster analysis algorithms, association rule learning, anomaly detection algorithms, regression analysis algorithms, classification algorithms, summarization algorithms, deep learning algorithms, ensemble algorithms, Neural Network based algorithms, regularization algorithms, rule system algorithms, regression algorithms, Bayesian algorithms, decision tree algorithms, dimensionality reduction algorithms, Instance based algorithms, clustering algorithms, K-nearest neighbors algorithms, gradient descent algorithms, linear discriminant analysis, classification and regression trees, learning vector quantization, supporting vector machines, Bagged Decision Trees and Random Forest algorithms, boosting, etc. While the various algorithms described here are described in the context of being utilized to generate insights by the insight engine module 1114, it is to be appreciated that these algorithms can alternately or additionally be employed in other modules of the personalized analytics system 1100, such as a curation engine module 1102, a parser module 1110, query magnifier module 1112, a story narrator module 1116, an animator module 1118, and so forth.

The insight engine module outputs the insights and/or any corresponding context information into a consumable format, such as a text-based form, metadata, mathematical formats, markup language, etc. In one or more implementations, insight engine module 1114 formats insights and/or contextual information as a story plot to provide a basis and/or outline for a narrated analytics playlist.

Personalized analytics system 1100 also includes story narrator module 1116 and animator module 1118 to generate a narrated analytic playlist from the identified insights. Story narrator module 1116 receives the output generated by the insight engine module 1114, and determines how to articulate, explain, and/or augment a corresponding description of the output. To illustrate, consider a scenario in which story narrator module 1116 receives, from the insight engine module, an insight that corresponds to a graph and/or data corresponding to a sales trend for a product in a particular state. In response to receiving this input, the story narrator module determines to generate a graph to visually display this information. Alternately or additionally, the story narrator module determines that supplemental information, such as sales trends for the product in neighboring states, could augment, explain, or further clarify a context associated with the sales trend in the particular state. Accordingly, in some implementations, the story narrator module includes a feedback loop to parser module 1110, query magnifier module 1112, and/or insight engine module 1114 to request additional insight information and/or request a query analysis be performed for the supplemental information. In various implementations, the story narrator module 1116 bundles and forwards information to the animator module to indicate what visual and/or audible information to include in the narrated analytics playlist. For example, the story narrator module 1116 can include charts, facts, text-based descriptive narratives, metadata, and other information corresponding to the insights, in the bundled information.

Animator module 1118 receives the bundled information, and uses the bundled information to generate audio and/or video outputs that are consumable by a playback engine, such as a narrated analytics playlist that is consumable by playback module 1120. Various implementations alternately or additionally base the narrated analytics playlist on predefined design themes, branding themes, etc. as further described herein.

Various implementations of the personalized analytics system include a playback module 1120 to output the narrated analytics playlist. In various implementations, the playback module receives a statically bundled analytics playlist from the animator module, and renders the content as output, such as by displaying images and/outputting audible sound. Playback module 1120 can alternately or additionally include anecdotal learning functionality that tracks and learns user preferences based on user interactions, examples of which are provided herein.

The personalized analytics system 1100 also includes proximity platform module 1122. As further described herein, various modules included in the personalized analytics system incorporate machine-learning algorithms, modules, and/or models to aid in curating and/or analyzing data. Accordingly, as the machine-learning algorithms evolve, the corresponding output becomes more personalized, more relevant, and more accurate for the corresponding user profiles and/or workspaces relative to unevolved algorithms. Proximity platform module 1122 acquires the learned information and/or the evolved algorithm parameters without having visibility into the curated data and/or queries used to generate the learned information. To illustrate, consider a scenario in which a first organization has sensitive sales growth charts that plot an organization product against a competitor's product. In generating this sales growth chart, the personalized analytics system modifies various configurable parameters of a machine-learning algorithm. Proximity platform module 1122 extracts changes to the parameters and/or the absolute values of the changed parameters without visibility into the curated data and/or query analyses used to evolve the algorithm. The proximity platform can then propagate these changed parameters to a second organization or the third organization to improve how analytic playlists are generated for these organizations without exposing the first company's sensitive information. Any suitable type of parameter can be extracted and propagated by the proximity platform, such as weights used in an artificial neural network, support vectors in a support vector machine, coefficients in a linear regression or logistic regression algorithm, an assumed distribution used in a statistical analysis (e.g., Gaussian distribution, binomial distribution, degenerate distribution, etc.), and so forth. Thus, aspects of the personalized analytics system improve the performance of various devices through the distribution of these parameters without exposing or compromising the data used to generate the parameters. This can include distributing the parameters to devices that are registered to different organizations as further described herein.

Figure 12:
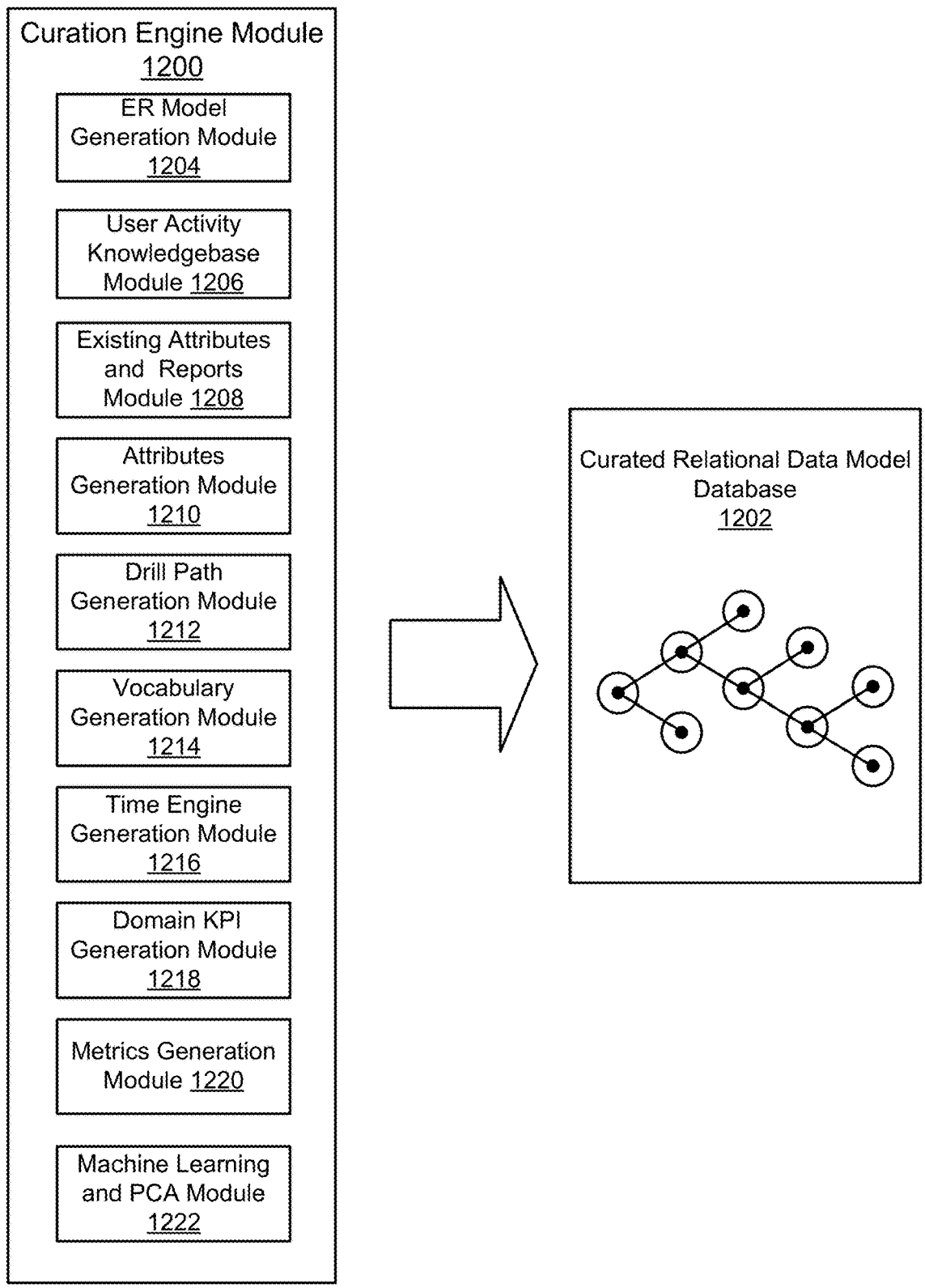
FIG. 12 illustrates an example curation engine module in accordance with one or more implementations.

Now consider FIG. 12 that illustrates a more detailed example of a curation engine module in accordance with one or more implementations. In various scenarios, the example described with respect to FIG. 12 can be considered a continuation of one or more examples described with respect to FIGS. 1-4, 5A, 5B, 5C, 6, 7, 8A, 8B, and 9-11.

FIG. 12 includes an example curation engine module 1200 that generally scans data sources to acquire and populate basic metadata about the data. This can include identifying attributes of the data and populating the metadata with the attributes. In various scenarios, curation engine module 1200 is representative of curation engine module 110 of FIG. 1 and/or curation engine module 1102 of FIG. 11. Some implementations of the curation engine module programmatically access databases, such as via an SQL interface of a database, to scan and/or analyze data to curate. The curation engine module uses the analysis to identify various attributes of the data and populate metadata with the identified attributes. In some implementations, the curation engine module identifies primary attributes associated with the data, and then identifies secondary attributes related to the primary attributes. In turn, the curation engine module updates the corresponding metadata. The curation of data and/or what data is accessible to a particular user profile and/or workspace can be based off of any suitable type of characteristic, such as characteristics associated with a particular user profile and/or organization profile, what type of software has been deployed to the particular user profile, what software features of the personalized analytics system are available to the particular user profile, what software version has been deployed, what machine-learning modules are available, etc. Thus, the curation engine module may not provide a particular user profile and/or workspace with access to all of the curated data, depending upon what level of access the user profile has been assigned.

In one or more implementations, the curation engine module 1200 bases the curation of data on a corresponding workspace associated with the particular user. As further described herein, a user can create one or more workspaces that define data source address(es) to include, database name(s), security authentication parameters for access to the workspace, read only and/or write permissions, and so forth. In various scenarios the curation engine module bases data curation on the user-defined parameters for a particular workspace. Alternately or additionally, curation engine module accesses anecdotal data associated with the workspace to influence and/or weigh what attributes of the curated data are added to the corresponding metadata. In various implementations, the curation engine module identifies related attributes of the user-defined parameters and/or anecdotal data to influence how data is curated and/or what attributes are added to the metadata in the curation process.

Curation engine module 1200 curates and adds attribute information to metadata associated with the data. In one or more implementation, the curated attributes include usage-based information, such as context information associated with input interactions, business domain information, component rankings, metric-based usage rankings (e.g., clickstream analysis, scored queries, playback rankings, etc.), knowledge graph attributes, and so forth. Alternately or additionally, the curated attributes include dictionary-based information (e.g., alternates words, synonyms, hyponyms, alternate industry words, verbiage preferences, etc.), access restrictions, data inferences (e.g., a data quality rankings, such as by applying various algorithms that determine how reliable the associated data is, an accuracy of the data determined through a verification process, a relevancy of the data relative to a particular keyword, an interpretability ranking of the data, how flexible the data is relative to a consistent taxonomy associated with context for the data, etc.), indications of whether the data is internal or external to an organization, whether the data type is commonly used, whether the data information has a common name, etc. In turn, curation engine module 1200 analyzes the curated data and/or attributes to determine and output relational data models. This can include applying machine-learning algorithms to the curated data and/or attributes to generate the relational data models stored via curated relational data model database 1202.

Curated relational data model database 1202 represents a database that includes the data relational models generated by curation engine module 1200. Generally, data relational models correspond to logical representations of information generated by assigning one or more attributes to data as further described herein. For example, a first data point can be assigned an attribute of being a parent data source, while a second data point is assigned an attribute of being a child data point of the first data point. While described here in the context of a parent/child relationship between data points, it is to be appreciated that this is merely for discussion purposes, and alternate types of relationship attributes can be modeled and/or identified. The data relational models alternately or additionally assign data types to the data. In some scenarios, curated relational data model database 1202 describes the relationships between data through the use of tables and/or data structures, where the format of the tables and/or structures describe relational information. Alternately or additionally, curated relational data model database 1202 stores the schema of the relational data model that is followed when storing curated data into a database. Other entities can then programmatically extract the relationship information from curated relational data model database 1202 through the use of one or more database interfaces, such as SQL interfaces, and a corresponding query. To identify and assign the attributes used in the curated relational data model database, curation engine module 1200 utilizes multiple types of processing and/or information.

Curation engine module includes an entity-relationship (ER) model generation module 1204 that identifies a domain or topic of interest, and then specifies a relationship model for the domain or topic. For instance, the ER model generation module 1204 can specify the relationships between different data types associated with a corporation, such as employee data types, employee attributes, customer data types, customer attributes, vendor data types, vendor attributes, etc. In various implementations, the ER model generation module 1204 uses a schema to describe the model, such as by using the schema to identify associations and dependencies between entities, where an entity can correspond to a physical object (e.g., a product), an event (e.g., a sale or service), a concept (e.g., a transaction or order), and so forth. In various implementations, the schema assigns attributes to data associations and/or entities. To illustrate, the schema can be used to assign an employee number attribute to an employee entity, a data attribute to a product sales entity, and so forth. While described here in the context of a schema, it is to be appreciated that ER models can be defined using any type of diagramming techniques and/or schemas, such as Bachman notation, Barker's notation, Unified Modeling Language (UML), Object-role modeling (ORM), Extensible Markup Language (XML) schema, etc. The relationship model generated by the ER model generation module 1204 is then used as a basis for defining a data structure for storing data in a corresponding database, such as curated relational data model database 1202.

Curation engine module 1200 also includes a user activity knowledgebase module 1206 to provide contextual information that is used in data curation as further described herein. The user activity knowledgebase includes anecdotal data associated with a particular user profile, workspace, organization profile, and so forth. While the user activity knowledgebase is illustrated here as residing within the curation engine module, it is to be appreciated that the information included in the knowledgebase can originate from any suitable data source. As one example, the user anecdotal data collected with respect to FIG. 9 can be included in user activity knowledgebase module 1206.

The curation engine module 1200 also utilizes existing attributes and reports module 1208 to identify attributes and/or build curated data. For example, the curation engine module 1200 can access existing reports, existing dashboard information, and/or existing databases to augment the existing metadata and/or create new attributes, new metadata, etc. Alternately or additionally, the curation engine module 1200 uses the existing attributes and/or reports to influence what attributes and/or reports are generated by future query analyses.

The curation engine module 1200 creates attributes for the curated data via attribute generation module 1210. In one example, the curation engine module uses ER models generated by ER model generation module 1204 to determine what attributes to identify for the data being curated and/or analyzed, and then updates the metadata with the identified attributes. Alternately or additionally, the curation engine module creates drill-up paths and/or drill-down paths via the drill path generation module 1212. To generate drill path information, various implementations identify a particular object, and use the relationship data, such as those defined by the ER model generation module 1204, to determine drill-up and/or drill-down paths. As an example, drill paths can include a breakdown of a particular attribute associated with an entity, such as a geography-based breakdown. Various implementations update the corresponding metadata to reflect the identified drill path information.

Curation engine module 1200 also includes vocabulary generation module 1214 that determines alternate wording options for the data and/or information being curated. For example, various natural language processing algorithms and/or models can be employed to identify similar wording, such as sematic matching algorithms, approximate string matching, text classifier algorithms, word2vec algorithms, latent semantic analysis, clustering algorithms, bag-ofwords models, document-term matrices, automatic summarization algorithms, tagging operations, etc. Curation engine module 1200 applies the alternate wordings in the curation process as a way to identify similar data and/or entities, and then adds the information generated using the alternate wordings into the various facets of curating data. As one example, a company entitled "My Big Company" can alternately be referred to as "MBG", "My Big Co.", "Big Co.", and so forth. Vocabulary generation module 1214 discerns when information with alternate naming conventions apply to a same entity, and builds corresponding attributes and/or relationship information to combine and/or associate the information from different sources of information to a same data point and/or entity, thus further enriching the information about that entity.

In various implementations, curation engine module 1200 includes a time engine generation module 1216 that identifies and/or curates information about the data over time spans. Consider a scenario in which the curation process identifies a sales metric for a particular product. Time engine generation module 1216 augments and/or enhances the sales metric to provide more particular information about the sales metric over a span of time, such as day-to-day sales metrics over a month, a running average over a year, monthly sales metrics, etc.

The curation engine module 1200 also generates Key Performance Indicators (KPIs) through the use of domain KPI generation module 1218. Generally, a KPI denotes a performance measurement associated with a particular activity or scope (e.g., an organization, a product, a person, etc.). A KPI can correspond to any suitable type of performance metric, such as an attrition rate, a turnover rate, a quality rate, a cycle time ratio, a utilization rate, a mean time between product failures, an average time to product delivery, a cost savings metric, employee performance indicators, etc. Various implementations of the domain KPI generation module 1218 utilize user profile information to generate the performance indicators. Consider the scenario in which a user logs into a particular workspace. The particular workspace can store anecdotal information, such as domain information (e.g., organization, customer base, product focus, job title, etc.) that is then used by the domain KPI generation module to predict what business metrics may be request from that particular workspace. In turn, KPI generation module 1218 produces business metrics based upon anticipating what information is relevant to the user and/or in response to the user manually requesting the metrics. Accordingly, domain KPI generation module 1218 can include any suitable type of algorithm to generate the KPIs, such as cash flow KPIs, churn KPIs, Human Resources KPIs, benefits KPIs, project value KPIs, healthcare KPIs, etc.

Curation engine module 1200 alternately or additionally includes metrics generation module 1220 to generate other types of statistics and/or metrics not generated via domain KPI generation module 1218. Similar to domain KPI generation module 1218, metrics generation module 1220 can include any suitable number of algorithms, each of which are used to generate a corresponding metric, such as average, sum, derivatives, log percentile, ratios, and so forth. These metrics and/or statistics can be domain-specific, domain-independent, user-specific, user-independent, and so forth. In various implementations, domain KPI generation module 1218 and metrics generation module 1220 exchange information to generate a resultant metric. For instance, domain KPI generation module 1218 can request average sum information from metrics generation module 1220.

Normalizing data that is stored in a database helps remove biases and/or undesired characteristics that potentially reduce the integrity and/or quality of data stored in a database. Accordingly, curation engine module 1200 includes machine-learning (ML) and principle-component analysis (PCA) module 1222 to normalize the curated data being stored in curated relational data model database 1202. This can include identifying and removing anomalies, removing redundant data, simplifying data mapping, validating data dependencies, etc. Various implementations restructure the data stored in curated relational data model database 1202 based upon the normalization process. ML and PCA module 1222 include various statistical procedures and/or machine-learning algorithms that can be used to organize the curated data as it is stored in curated relational data model database 1202. This can include algorithms that apply First Normal Form (1NF) Rules, Second Normal Form (2NF) Rules, Third Normal Form (3NF) Rules, Boyce-Codd Normal Form (BCNF) Rules, and so forth.

In the curating process, various implementations of curation engine module 1200 can validate data during. For example, curation engine module 1200 can analyze the data to verify spellings, perform auto-correction, and/or determine a noise factor to assign to the data. To illustrate, curation engine module can identify data attributes that are empty and/or include invalid data, such as white-spaces, punctuation marks, non-printable characters, abbreviations, prefixes, suffixes etc., and mark the corresponding noise factor and/or attribute of the data to a high number. In some implementations, the noise factor can be based on a scale, such as a scale that ranges from 0-100 (0 being an indication of non-noise and 100 being an indication of all noise) to provide a grade of the noise level. Alternately or additionally, curation engine module 1200 can compare the data being curated against publicly available data to identify mis-spellings and/or perform auto-correction. Thus, the curation engine module can identify a noise level associated with a data, generate and/or mark a noise factor attribute of the data with the corresponding noise level, and/or perform auto-corrections to the data. In turn, this can improve the overall performance of a computing device processing and/or extracting the curated data by providing quality data and reducing the processing performed by a computing device generating insights from the curated data, thus freeing up computing resources for other tasks.

Curation engine module 1200 can alternately or additionally identify and/or apply speech-abbreviated vocabulary to the curated data, such as by abbreviating number formats. For example, using natural language processing algorithms, curated data that has a first phrase can be analyzed and reworded into a second phrase, where the second phrase has an abbreviated number format. To illustrate, a phrase such as "total revenues this quarter are 53.12 million dollars" can be analyzed and reworded as "total revenues this quarter are a little over 53 million dollars", where the reworded phrase abbreviates "53.12 million dollars" to "about 53 million dollars". The abbreviation of numerical formats can, in some implementations, be formatted for target user devices to facilitated faster story development, deployment, and/or playback for the targeted user device by outputting the speech-abbreviated phrases instead of the original numerical phrase.

Some implementations of curation engine module 1200 clean the curated data at strategically determined points in time, such as at a point of intake, on a periodic basis, during identified idle periods, and so forth. Cleaning the curated data can include validating the curated data, tagging the curated data, auto-correcting the curated data, determining noise factors for the curated data, inserting speech-abbreviated language, and so forth. By selecting strategic points in time to perform the cleaning process, the overall performance of a corresponding computing device can be improved by reducing an amount demand for computing resources at a given point in time. For example, by selecting to perform data cleaning at idle periods, instead of during a user query, the computing device can dedicate more resources (e.g., processing power, memory access, etc.) to processing a user query when the user query is received, since curation engine module 1200 has determined not to perform data cleaning during the user query.

Each module described with respect to curation engine module 1200 can be implemented in any suitable manner, such as through any combination of software, hardware, and/or firmware. This can include storage memory devices that store data, storage memory devices that store processor-executable instructions, and/or various types of hardware processing systems as further described herein. Further, each of the modules illustrated as residing within the curation engine module can be implemented collectively on a single device and/or in a distributed manner across multiple devices. To demonstrate, various implementations can utilize any suitable combination of servers 102 and/or computing device 104 of FIG. 1.

Figure 13:
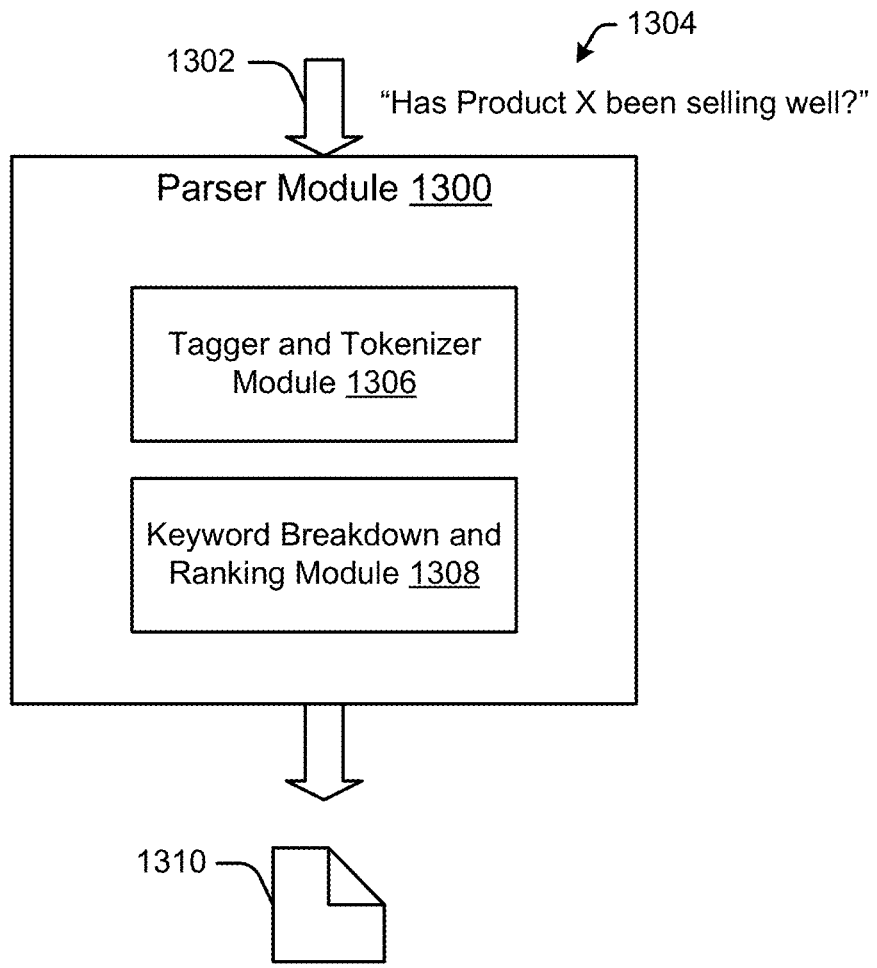
FIG. 13 illustrates an example parser module in accordance with one or more implementations.

Various implementations trigger various query analyses on the curated data generated by curation engine module 1200. FIG. 13 illustrates a more detailed example of a parser module 1300 that can receive an input query associated with a trigger event, and analyze the input query in order to initiate the analysis process. In various scenarios, the example described with respect to FIG. 13 can be considered a continuation of one or more examples described with respect to FIGS. 1-4, 5A, 5B, 5C, 6, 7, 8A, 8B, and 9-12. Thus, in some implementations, parser module 1300 is representative of parser module 112 of FIG. 1 and/or parser module 1110 of FIG. 11.

As further described herein, a personalized analytics system determines insights that are relevant to a particular user profile, workspace, and/or organization profile using curated data to generate a narrated analytics playlist relevant to a particular user profile. In some scenarios, an input query triggers the analysis process. In FIG. 13, trigger event 1302 corresponds to any suitable type of trigger event that triggers a query analysis, examples of which are provided herein. Here, trigger event 1302 includes an input query string 1304 that forms a basis for the subsequent analysis process.

Various implementations parse input query string 1304 into individual tokens and/or units via tagger and tokenizer module 1306. Accordingly, tagger and tokenizer module 1306 includes language processing algorithms to analyze a sequence of characters included in input query string 1304, to identify a grouping of characters as words, separators, commands, and so forth. To demonstrate, input query string 1304 as illustrated in FIG. 13 includes the string of characters "Has Product X been selling well?" Tagger and tokenizer module 1306 scans the string of characters to identify and classify each word, such as "Product" as a word, "selling" as an action word, etc.

Parser module 1300 also includes keyword breakdown and ranking module 1308 that receives the output of word identification and classification from tagger and tokenizer module 1306, and identifies keywords and/or contextual information to determine relevant words to base a search analysis off of. This can include using natural language processing (NLP) algorithms, word2vec algorithms, and so forth. Determining relevant keywords sometimes involves ranking identified words, and/or access ranking information generated by the curation engine, to determine whether the identified keywords are statistically likely to return successful results (e.g., results and/or words that fall within a predefined threshold associated with returning successful results). In response to identifying keywords that are statistically likely to return successful results, the keyword breakdown and ranking module 1308 assigns these words as ones to use in a query analysis. In response to identifying keywords with low success rates (e.g., a success rate that falls below a predefined threshold), the keyword breakdown and ranking module 1308 tags those keywords as candidates for replacement and/or replaces the keywords with similar words and/or phrases that have a higher success rate. Accordingly, in various implementations, keyword breakdown and ranking module 1308 generates a modified input query that includes the replacement words and/or generates additional queries relative to input query string 1304 with the replacement words. These modified input queries and/or newly generated queries are then passed to a query magnifier to augment and/or enrich the queries.

In one or more implementations, the modified input and/or newly generated queries are formatted as canonical queries that include identifying information about the input query, illustrated here as canonical query 1310. For example, using a markup language, the canonical query can include tags that identify keywords, sorted parameters, actions, timestamps, authentication tokens, etc. Thus, canonical query 1310 is representative of any suitable type of data that can be used to convey a canonical query, and can include additional information generated by the tagger and tokenizer module 1306 and/or keyword breakdown and ranking module 1308. While FIG. 13 illustrates a single canonical query output, it is to be appreciated that this is for discussion purposes, and that a parser module can generate any suitable number of canonical queries without departing from the scope of the claimed subject matter.

Figure 14:
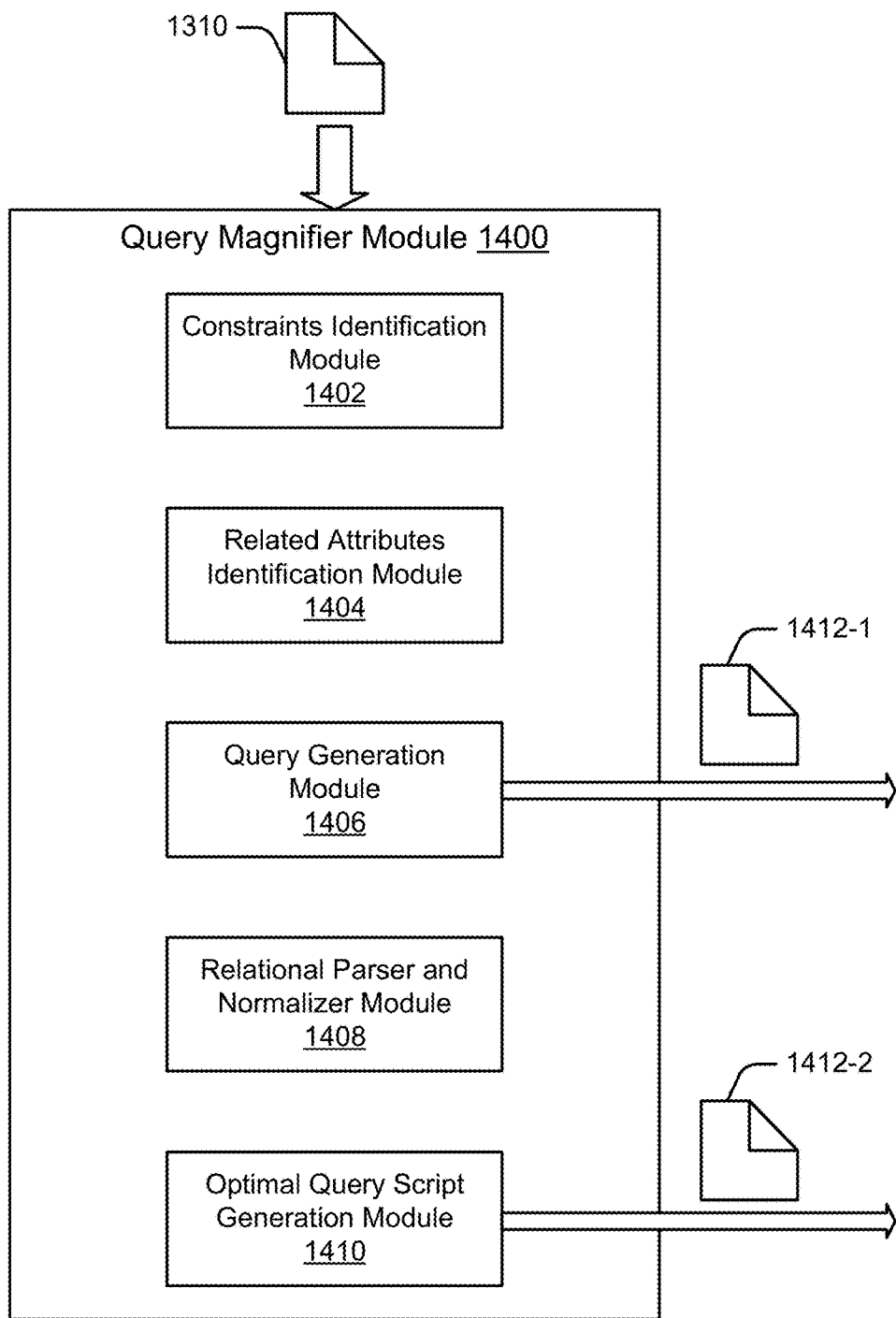
FIG. 14 illustrates an example query magnifier module in accordance with one or more implementations.

Now consider FIG. 14 that illustrates an example query magnifier module 1400 that is in accordance with one or more implementations. In various scenarios, the example described with respect to FIG. 14 can be considered a continuation of one or more examples described with respect to FIGS. 1-4, 5A, 5B, 5C, 6, 7, 8A, 8B, and 9-13. Thus, in some implementations, query magnifier module 1400 is representative of query magnifier module 114 of FIG. 1 and/or query magnifier module 1112 of FIG. 11.

Query magnifier module 1400 receives canonical query 1310 from FIG. 13 as an input, and augments the query based upon various analyses. Various implementations identify how to augment and/or add contextual parameters the query using constraints identification module 1402, related attributes identification module 1404, query generation module 1406, relational parser and normalizer module 1408, and/or optimal query script generation module 1410. While augmenting the query can include adding search constraints, user preferences, contextual parameters, alternate keywords, etc., various implementations augment the query by identifying and/or generating commands that efficiently extract information from the curated data.

Constraints identification module 1402 analyzes the canonical query to determine whether contextual information is missing from the query, examples of which are provided herein. Alternately or additionally, constraints identification module 1402 identifies new constraints to add to the query. For instance, if canonical query 1310 includes a time constraint, such as "sales over the last month", various implementations of the constraints identification module add shorter and longer time constraints to generate additional information, such as a week time constraint, a yearly time constraint, etc. The identification of additional and/or new constraints can sometimes be based off of anecdotal data, such as timeframes most often requested from a particular user profile, competitor products most often requested by the particular user profile, etc. These additions and/or modifications are then used to generate additional information. In a similar manner, related attributes identification module 1404 identifies existing attributes corresponding to the canonical query, and extrapolates the attributes to related variations, such as adding additional product categories to the input search, additional state attributes, etc. In some implementations, constraints identification module 1402 identifies subject matter that is accessible and/or inaccessible to the user profile, such as through the use of access control inclusion rules and/or access control exclusion rules, that define what a particular user profile and/or workspace can and cannot have access to in the curated data, and governs the extraction of curated data accordingly, such as by modifying search query input keywords, modifying programmatic access to sections of a database, etc.

Canonical query 1310, as well as the keyword identifications, keyword rankings, identified constraints, and/or the identified related attributes, are then fed into query generation module 1406. In turn, query generation module 1406 generates variations of each query that are then used to extract information from the curated data. These variations can be passed into the insight engine, generally indicated here as query 1412-1. Alternately or additionally, the variations are passed into relational parser and normalizer module 1408 to remove biases that may negatively impact the quality of results. The normalized queries can alternately or additionally be passed into optimal query script generator module 1410 to identify efficient database query mechanisms, such as by removing repetitive database access commands, consolidating data extraction, etc. In turn, the queries generated by optimal query script generation module 1410, generally indicated here as query 1412-2, can alternately or additionally be passed to the insight engine module for extracting information from the curated data.

Parser module 1300 and query magnifier module 1400 work in concert to generate queries that can be used to identify queries that efficiently and accurately extract curated data for insight generation, such as by identifying alternate wording with higher success rates, identifying related subject matter, and so forth. In implementations, the querying processing can be adaptive to optimize the runtime conditions of applications executing as part of a workload layer of cloud-based service. According, in various implementations, query processing operations associated with parser module 1300 and/or query magnifier module 1400 can employ batch mode adaptive joining techniques (e.g., generating execution plans for one or more specific queries) and select a plan estimated to use the lowest processing cost and memory grant feedback (e.g., a minimum memory required by the system to execute particular querying operations and/or other workload operations). In turn, this improves the efficiency of the personalized analytics system and/or the computing devices that are used to implement the personalized analytics system.

Figure 15:
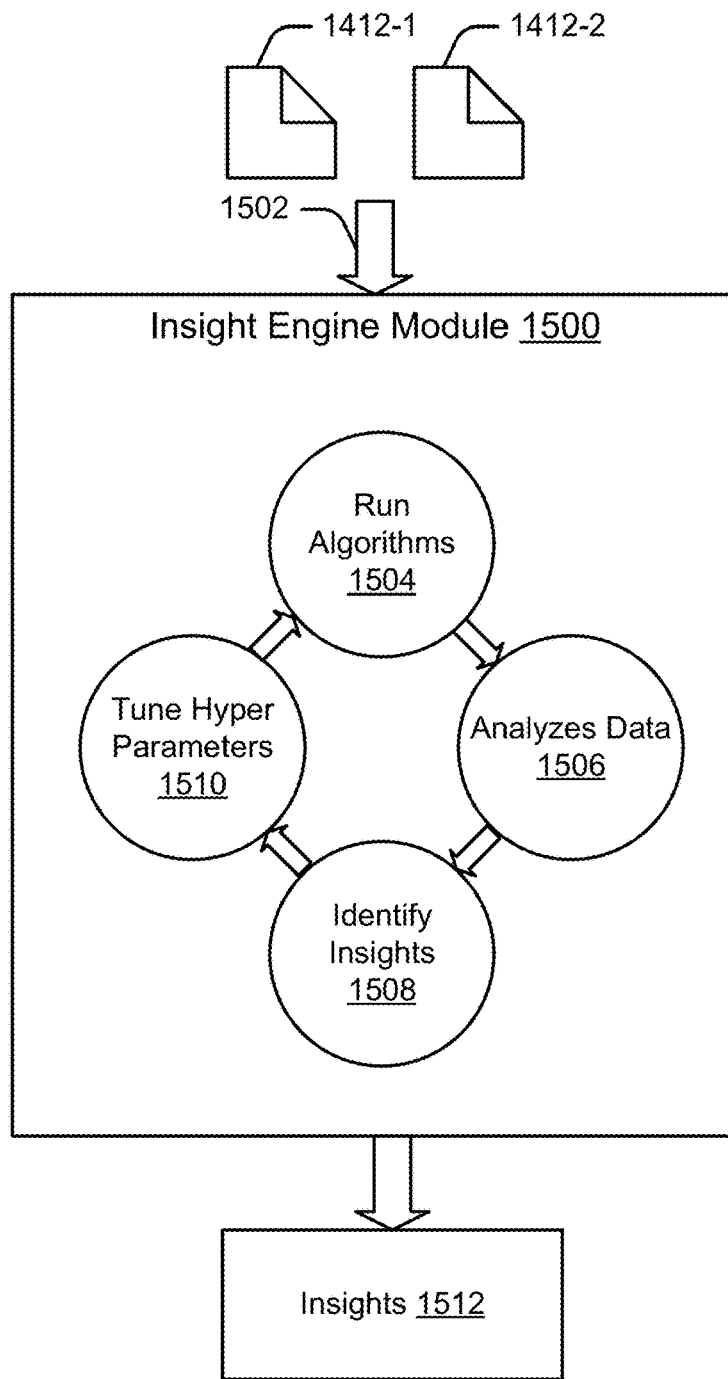
FIG. 15 illustrates an example insight engine module in accordance with one or more implementations.

Now consider FIG. 15 that illustrates an example insight engine module 1500 that is in accordance with one or more implementations. In various scenarios, the example described with respect to FIG. 15 can be considered a continuation of one or more examples described with respect to FIGS. 1-4, 5A, 5B, 5C, 6, 7, 8A, 8B, and 9-14. Thus, in some implementations, insight engine module 1500 is representative of insight engine module 116 of FIG. 1 and/or insight engine module 1114 of FIG. 11.

Insight engine module 1500 at 1502 receives query 1412-1 and/or query 1412-2 of FIG. 14, and submits the queries to a database to extract information, such as curated relational data model database 1202 of FIG. 12. In turn, the insight engine module 1500 selects and runs various algorithms at 1504 on the data, such as machine-learning algorithms, to identify a result to the query. In turn, at 1506, the insight engine module analyzes the data and/or results generated by the various algorithms at 1504. The analysis results the insight engine module identifying various types of insights at 1508 as further described herein. In some scenarios, the analysis at 1506 and/or the identification of insights at 1508 cause the insight engine module 1500 to tune hyper-parameters of a corresponding algorithm at 1510. For example, in response to applying the algorithms to the extracted (curated) data, contextual data and/or anecdotal data through one or more machine-learning modules at 1504, the insight engine module 1500 generates an insight and/or prediction. The generated insight and/or prediction then evaluated during the analysis at 1506, such as by comparing the generated insight and/or prediction to actual values to evaluate an accuracy of the prediction and/or insight. The accuracy evaluation can then be used to adjust and/or tune the hyper-parameters until best values for the predictions, insights, and/or hyper-parameters are achieved. Here, the phrase "best values" is used to denote values that result in minimal accuracy error relative to other values. Some implementations extract and share the hyper-parameters with other user profiles, workspaces, and/or organization profiles, such as by way of the proximity platform as further described herein.

The process implemented by insight engine module 1500 corresponding to running algorithms at 1504, analyzing data at 1506, identifying insights at 1508, and tuning hyper parameters at 1510 can be an iterative process, and can be achieved in any suitable manner. For example, various implementations utilize the combination of a processor and processor-executable instructions that drive the behavior of the processor, hardware, firmware, or any combination thereof, to implement the algorithms, to extract the information from the curated data, etc. Examples of such implementations are further illustrated and described in FIGS. 29 and 30. Alternately or additionally, the process combines information from the multiple queries in a statistical manner. For example, consider a scenario in which the query magnifier module 1400 of FIG. 14 receives a single input query and generates "n" variations of the input query, where "n" represents an arbitrary value. Each respective query of the "n" variations can be run through the process associated with the insight engine module such that the corresponding algorithm output, data analysis, insight identification, and/or hyper-parameter tuning combines and/or collectively analyzes the outputs of each respective query. The insight engine module 1500 then outputs one or more insights 1512 that correspond to the insights identified in the process, where the insights can be described using textual output, markup output, metadata, etc. In various implementations, the insights are formatted into a story plot that provides a basic (e.g., un-augmented) outline for a playlist. These insights are then forwarded to a story narrator module for processing.

Figure 16:
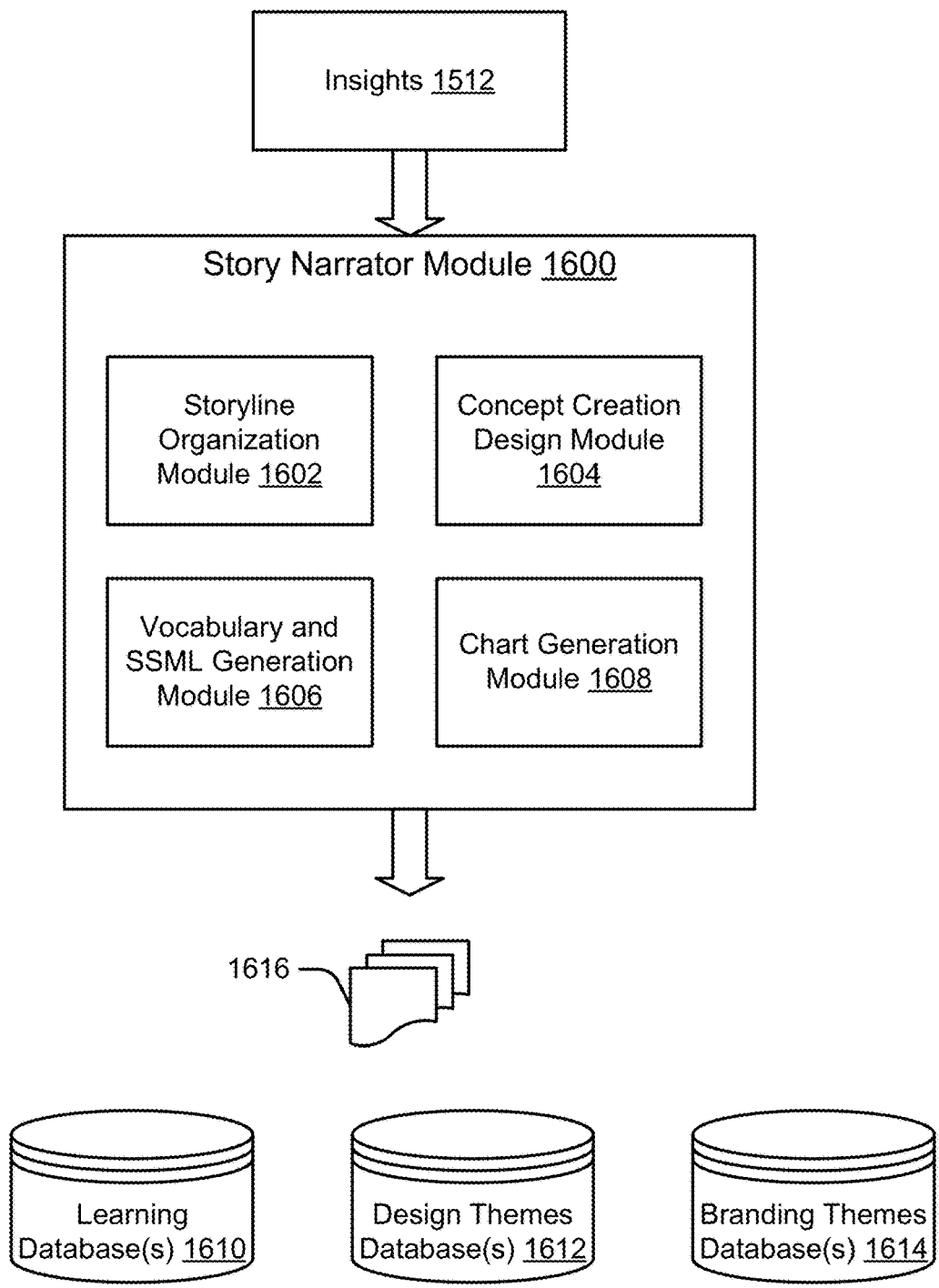
FIG. 16 illustrates an example story narrator module in accordance with one or more implementations.

Consider now FIG. 16 that illustrates an example story narrator module 1600 that is in accordance with one or more implementations. In some scenarios, story narrator module 1600 is representative of story narrator module 118 of FIG. 1 and/or story narrator module 1116 of FIG. 11. In various scenarios, the example described with respect to FIG. 16 can be considered a continuation of one or more examples described with respect to FIGS. 1-4, 5A, 5B, 5C, 6, 7, 8A, 8B, and 9-15. Story narrator module 1600 represents functionality that determines how to articulate and/or describe the insights received from the insight engine module, such as what visualizations to include in the narrated analytics playlist (e.g., charts, graphs, images, tables, etc.), what summarization of facts to include, the detailed narrative descriptions, etc. In other words, the story narrator module determines augmentation content (e.g., the visualizations, the summarizations, the charts, etc.) for the insights. In this example, story narrator module 1600 receives insights 1512 of FIG. 15. The story narrator module 1600 includes storyline organization module 1602, concept creation design module 1604, vocabulary and Speech Synthesis Markup Language (SSML) generation module 1606, and chart generation module 1608 that collectively work together to generate scripts that are used to generate narrated analytic playlists. As part of the generation process, various implementations access one or more databases that include data related to the insight(s). For example, some implementations of story narrator module 1600 access learning database(s) 1610 to acquire anecdotal data associated with a particular user profile the playlist is being designed for to determine what items to include or exclude from the playlist. Alternately or additionally, story narrator module 1600 accesses design theme database(s) 1612 to obtain formatting information for the playlist, such as colors, backgrounds, font types and size, watermarks, etc. As yet another option, story narrator module 1600 can access branding theme database(s) 1614 to acquire images, text, copyrighted images, and so forth, to include in the playlist.

Storyline organization module 1602 receives the insights and/or story plots from the insight engine, and determines an outline, plot, and/or components to include in a playlist that help explain the various insights. This can include supplemental information, contextual information, etc. In one or more implementations, the storyline organization module 1602 accesses metadata associated with the insights to identify primary attributes (e.g., main attributes associated with an insight) and/or secondary attributes (e.g., attributes of the main attributes). In turn, these attributes can be used to determine what visualizations to include in the narrated analytics playlist and/or what supplemental queries to request information to augment to the narrated analytics playlist. Some implementations of the storyline organization module 1602 apply computational algorithms to the attributes and/or corresponding text as a way to generate a corresponding plot outline. Any suitable type of computational and/or story generator algorithm can be utilized, such as Propps algorithms, Natural Language Generation (NLG) algorithms, Hidden Markov Model (HMM) algorithms, probabilistic context free grammars (PCFGs) algorithms, etc. In one or more implementations, the storyline organization module 1602 identifies one or more advertisements to include in the narrated analytics playlist, such as by analyzing anecdotal information associated with the corresponding user profile, analyzing metadata to identify relevant advertisements, etc.

Concept creation design module 1604 receives an augmented story outline from the storyline organization module 1602, and determines what additional design detail to include in the story outline, such as a design details on which chart to include, what ordering, what drill-down or drill-up information to include in the design, etc. For example, concept creation design module 1604 can analyze the augmented story outline and/or the corresponding metadata to determine related KPIs, attributes, apply entity linking algorithms, etc. In various implementations, the concept creation design module accesses learning database(s) 1610, design themes database(s) 1612, and/or branding themes database(s) 1614 to design how the plot outline is presented. In one or more implementations, the concept creation design module 1604 requests additional information from the parser module 1110, query magnifier module 1112, and/or insight engine module 1114 of FIG. 11.

Vocabulary and SSML generation module 1606 generates narrative descriptions that describe the plot outline and/or the augmented plot outline generated by the concept creation design module 1604. In various implementations, the vocabulary and SSML generation module 1606 generates multiple narrative descriptions of varying narration levels for a corresponding topic and/or playlist (e.g., minimal narration, medium narration, verbose narration) and statically bundles the multiple narrative descriptions with the narrated analytics playlist such that a recipient user profile has an ability to provide input that selects which level of narration to output during playback. Alternately or additionally, the vocabulary and SSML generation module accesses a user-defined setting that identifies a narration level, and generates a corresponding narrative description based upon the user-defined setting. This can include the vocabulary and SSML generation module 1606 accessing the metadata associated with the insights and/or augmented story outline to generate the narrative description. Accordingly, various implementations employ machine-learning algorithms that evolve grammar knowledge, language pattern algorithms, syntactic and/or structural pattern recognition algorithms, and so forth, as a way to output descriptions of the storyline plot and/or design.

Chart generation module 1608 generates visuals that are included in the corresponding playlist. In various implementations, the concept creation design module 1604 interfaces and/or communicates the desired charts to include to chart generation module 1608, such as by updating metadata to indicate the desired charts, sending commands to generate the charts, etc. In turn, the chart generation module 1608 access the corresponding metadata to obtain data used to generate the charts, graphs, images, etc. Alternately or additionally, chart generation module 1608 generates captions for charts. As an example, for a chart that illustrates monthly revenues for a calendar year (January thru August), the chart generation module 1608 can generate the captions "Revenues monthly from January 2018 to August 2018", "Monthly Revenues January-August 2018", or "Revenues January thru August 2018 monthly" based on the metadata, insights, etc. Vocabulary and SSML generation module 1606 can alternately or additionally generate short narration that describes the chart (e.g., "Peak Sales months are April 2018 and July 2018, while the year-to-date increase in sales was 4.3%") as well as long narration that describes the chart (e.g., "Monthly revenues have a consistent positive growth with April and July being the best months. The year to date sales growth is 4.3% across 8 months and the total sales being 24.3 million dollars"). Both the short narration and the long narration can be statically bundled with the narrated analytics playlist to allow a user to select more than one narration mode, thus enhancing the user experience. In some implementations, the chart generation module extracts summary points from a chart to use as short-narrations that can be displayed by the personalized analytics system as bulleted points.

Collectively, these modules generate scripts 1616 which are then delivered to an animator module to generate the narration analytics playlist. Scripts 1616 can include any suitable type of information, such as charts, narrative descriptions, storyline plots, design information, etc. In various implementations, scripts 1616 indicates not only what type of information is included in the narrated analytics playlist, but what order the information is presented in, when information is output simultaneously (e.g., audible output simultaneously with particular graphics), when to transition from a first piece of information to a second piece of information, and so forth. This can be achieved in any suitable manner, such as by marking transition and/or trigger points with flag data, identifying a time duration for each piece of information, etc.

Figure 17:
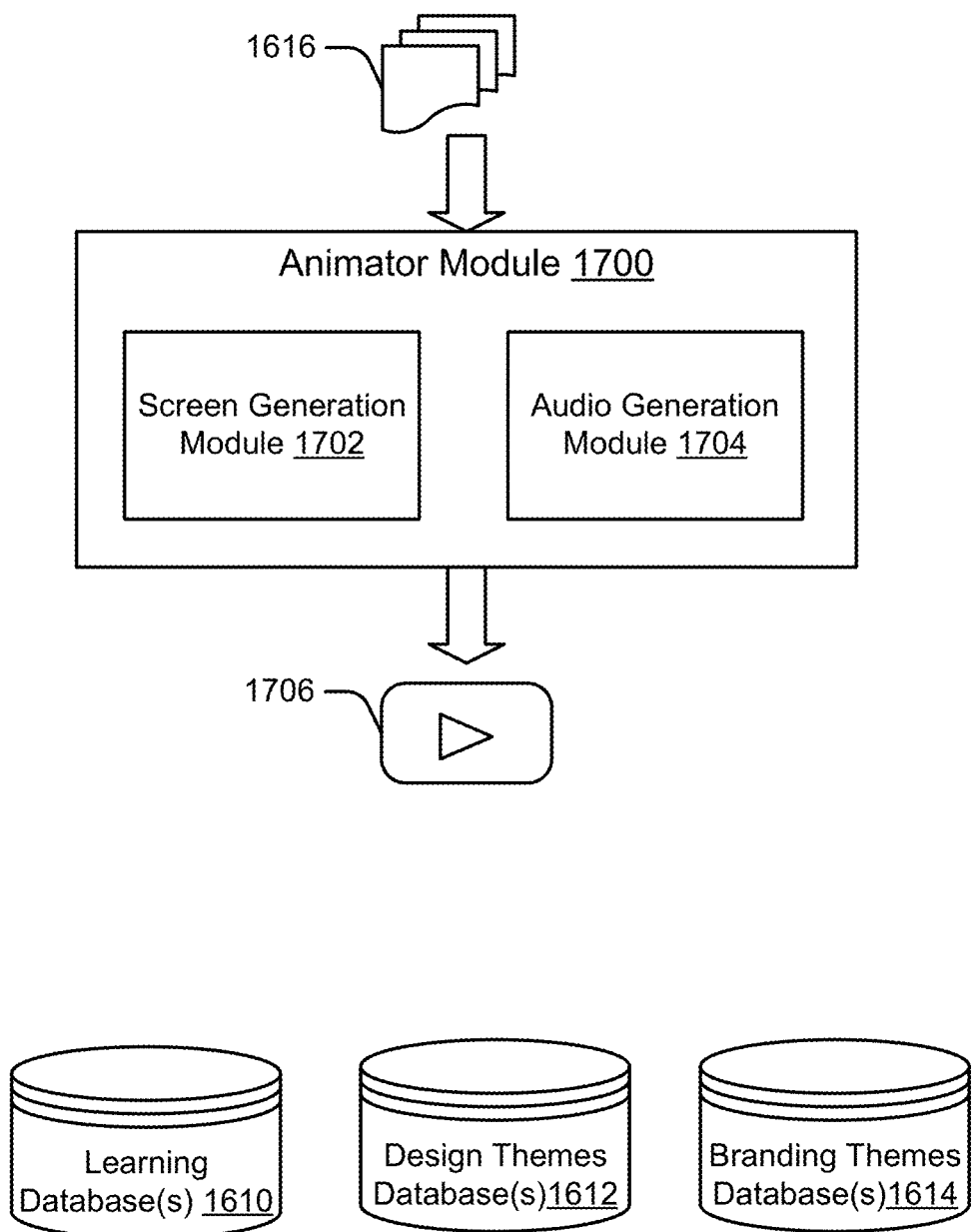
FIG. 17 illustrates an example animator module in accordance with one or more implementations.

Now consider FIG. 17 that illustrates an example animator module 1700 in accordance with one or more implementations. In some scenarios, animator module 1700 is representative of animator module 120 of FIG. 1 and/or animator module 1118 of FIG. 11. In various scenarios, the example described with respect to FIG. 17 can be considered a continuation of one or more examples described with respect to FIGS. 1-4, 5A, 5B, 5C, 6, 7, 8A, 8B, and 9-16.

Animator module 1700 receives scripts 1616 of FIG. 16, and generates a corresponding playlist from the scripts. Accordingly, animator module 1700 includes screen generation module 1702 and audio generation module 1704.

Screen generation module 1702 generates visual content that is included in the playlist. This can include accessing learning database 1610, design themes database(s) 1612, and/or branding themes database(s) 1614 of FIG. 16 to identify images, colors, formatting, user preferences, etc. to include in the visual content. For example, screen generation module 1702 can analyze an input script and identify keywords, such as product information, company information, location information, etc. In turn, screen generation module 1702 accesses corresponding databases to obtain images related to these keywords.

Audio generation module 1704 converts the descriptions generated by vocabulary and SSML generation module 1606 of FIG. 16 into an audible form. One or more implementations include text-to-speech algorithms to generate audible output. In scenarios in which the statically bundled content includes multiple narrative descriptions, the audio generation module 1704 selects one of the narrative descriptions, such as the verbose narrative description, to convert into audible output. The audible output description can be in any suitable language, such as a default language (e.g., English) and/or a user-defined language (e.g., French, German, Mandarin), where audio generation module 1704 includes machine-learning algorithms corresponding to the selected language. In some implementations, the audible output can be customized via alternate or additional user-defined settings, such as a gender-voice setting, output pace setting, verbal tone, etc. Collectively, these modules output a narrated analytics playlist 1706 that provides information corresponding to an input query in a video form. In turn, various playback engines can render the corresponding images and/or output the corresponding audio.

Figure 18:
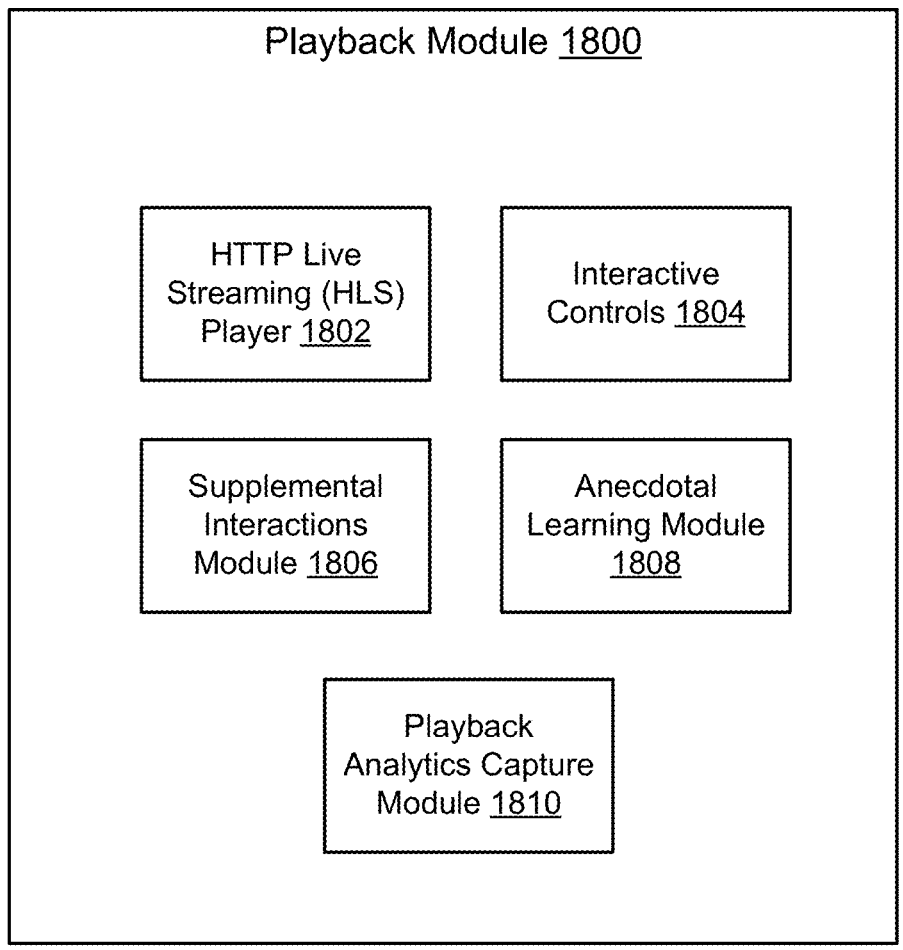
FIG. 18 illustrates an example playback module in accordance with one or more implementations.

FIG. 18 illustrates an example playback module 1800 in accordance with one or more implementations. In some scenarios, playback module 1800 is representative of playback module 132 of FIG. 1 and/or playback module 1120 of FIG. 11. In various scenarios, the example described with respect to FIG. 18 can be considered a continuation of one or more examples described with respect to FIGS. 1-4, 5A, 5B, 5C, 6, 7, 8A, 8B, and 9-17.

Playback module 1800 generally represents functionality that outputs images and/or audio corresponding to a narrated analytics playlist. In this example, playback module 1800 includes an HTTP Live Streaming (HLS) player 1802, interactive controls 1804, supplemental interactions module 1806, anecdotal learning module 1808, and playback analytics capture module 1510.

HLS player 1802 renders and/or outputs playlist contents. In various implementations, HLS player 1802 streams content corresponding to a narrative analytics playlist over a network connection, such as a network connection to servers 102 of FIG. 1. HLS player 1802 can be implemented as a stand-alone application, as a player that is integrated into a web browser, as a client application that connects to a server application, etc. In response to receiving content, the HLS player renders images as specified by the content. Alternately or additionally, the HLS player outputs synchronized audio.

Interactive controls 1804 provide user-accessible controls that modify playback of content. For example, interactive controls 1804 visually render software controls that pause, start, stop, forward, and/or rewind the playback of content. Interactive controls 1804 can alternately or additionally include audio controls, such as software controls that increase, decrease, and/or mute audio output levels. In some implementations, interactive controls 1804 provide navigation features, such as file navigation.

Similar to interactive controls 1804, supplemental interactions module 1806 provides user-accessible controls. Here, the user-accessible controls correspond to interactions with the personalized analytics system, such as a search query to trigger a query analysis, a chart request, a request for drill-up content and/or drill-down content, etc. Accordingly, various implementations allow for the generation of supplemental information during the playback of a narrated analytics playlist as further described herein.

Anecdotal learning module 1808 tracks information corresponding to user interactions with and/or input to playback module 1800, such as interactions with interactive controls 1804 and/or supplemental interactions module 1806. Alternately or additionally, anecdotal learning module 1808 gathers contextual information about when these interactions happen, what content is currently being output, whether the interaction can be implicitly and/or explicitly identified as positive feedback, negative feedback, etc. In various implementations, the information tracked by anecdotal learning module 1808 is stored with curated data and/or forwarded to cloud-based services as further described herein.

Playback analytics capture module 1810 enables the playback module to capture screen content, such as through control 910 of FIG. 9. Various implementations of playback analytics capture module 1810 not only capture screen content and/or audible content when initiated, but alternately or additionally capture additional information about the captured content, such as metadata, insight information, etc. In some scenarios, playback analytics capture module 1810 triggers a query analysis based upon the captured content and/or the additional information as further described herein.

Figure 19:
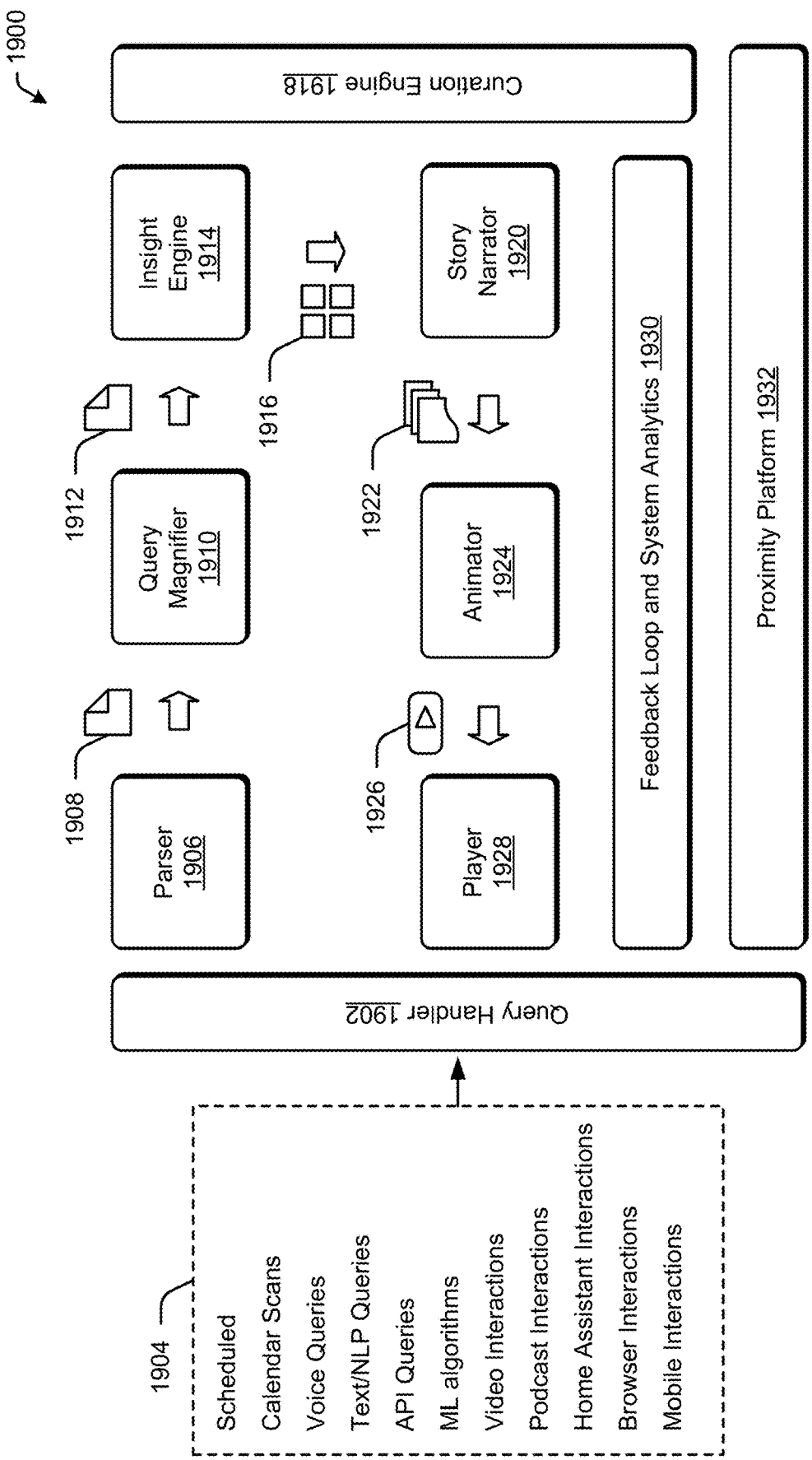
FIG. 19 illustrates an example of a personalized analytics system in accordance with one or more implementations.

To further demonstrate how various modules interact with one another to provide narrated analytic playlists, consider now FIG. 19 that illustrates an example block diagram 1900 in accordance with one or more implementations. In some scenarios, block diagram 1900 can be considered a continuation of one or more examples described with respect to FIGS. 1-4, 5A, 5B, 5C, 6, 7, 8A, 8B, and 9-18.

Block diagram 1900 includes query handler 1902 that generally handles any type of query input and/or query trigger into the personalized analytics system. In one or more implementations, query handler 1902 represents a library of callable application programming interfaces (APIs) that can be used by other software, hardware, and/or firmware module to trigger the analytics process and/or input a query string. Alternately or additionally, query handler 1902 includes audible interfaces, touch screen interfaces, programmatic interfaces, image processing, audio processing, and so forth, which enable query handler to receive and identify query inputs. In various implementations, query handler 1902 and/or other modules of the personalized analytics system are implemented on various devices of an IoT network (e.g., Zibgee, Z-wave, Thread, Weave, etc.). This allows the personalized analytics system to perform various functionality in a distributed manner and/or on devices that are dedicated to a particular purpose. Thus, various implementations utilize an IoT device dedicated to performing functionality associated with query handler 1902. As another example of utilizing IoT devices, a first device of the IoT can be a computing device dedicated to collecting data which is then transferred to a second device of the IoT associated with curating the data (e.g., curation engine module 110 of FIG. 1, curation engine module 1102 of FIG. 11, and/or curation engine module 1200 of FIG. 12). Continuing on, trigger events 1904 represent example events that trigger a query analysis and/or the generation of a narrated analytics playlist in accordance with one or more implementations. Here, trigger events 1904 include scheduled trigger events that correspond to user-defined schedules that indicate when to generate a narrated analytics playlist and/or perform the analysis associated with generating the narrated analytics playlist. Trigger events 1904 also include calendar scan trigger events that represent trigger events automatically generated by the personalized analytics system in response to a scan of a user's calendar as further described herein. Voice query trigger events and text/NLP query trigger events correspond to manual input to the personalized analytics system, such as audible input with an explicit query request, text strings input into a search field, etc. Trigger events 1904 also include programmatic trigger events, generally represented here as API query trigger events, that enable the personalized analytics system to receive a query request and/or trigger event programmatically. In a similar manner, ML algorithm-based trigger events correspond to programmatic trigger events generated by a machine-learning algorithm requesting more information, such as a machine-learning algorithm employed in the concept creation design module 1604 of FIG. 16 requesting more information, a machine learning algorithm employed in the insight engine module 1500 of FIG. 15 requesting more information, etc. Video interactions trigger events, podcast interactions trigger events, and home assistance device interactions trigger events correspond to implicit trigger events corresponding to the personalized analytics system identifying implicit feedback via video playback, via audible playback, and/or via home assistant interactions. Alternately or additionally, the video interactions, podcast interactions, and/or home assistant device interactions can include explicit feedback, examples of which are provided herein. Trigger events 1904 also include browser interactions trigger events and mobile interactions trigger events that correspond to the personalized analytics system implicitly triggering a query analysis and/or generation of a narrated analytics playlist in response to identifying implicit feedback when interacting with a browser and/or a mobile device. Query handler 1902 includes any combination of software, firmware, and/or hardware that enables these various types of trigger events to interface with the personalized analytics system to trigger and/or initiate a query as further described herein.

In response to receiving any of the trigger events 1904, the personalized analytics system forwards the corresponding input query to parser 1906 for analysis. In response to analyzing the input query, parser 1906 outputs a canonical query 1908 that is utilized as an input to query magnifier 1910. Canonical query 1908 can be formed using any suitable type of data structure that can be utilized to store information, examples of which are provided herein.

Query magnifier 1910 receives the canonical query 1908, and augments the query and/or generates variations of the query with additional subject matter (e.g., context information, additional constraints, alternate and/or related attributes, preferences, etc.). Thus, query magnifier 1910 outputs augmented queries 1912, which can alternately or additionally represent raw data identified during the analysis process. Augmented queries 1912 can include optimized database access instructions that pull information from a database in a more efficient manner (e.g., faster, less data, more concise data, more informative data, etc.) relative to un-optimized database access instructions. Augmented queries 1912 can be formed using any suitable type of data structure that can be utilized to store information, examples of which are provided herein.

Augmented queries 1912 are input to insight engine 1914 which, in turn, pulls information from a database and analyzes the data to not only find an answer to a query, but alternately or additionally identify one or more insights 1916 associated with the query, examples of which are provided herein. Some implementations of the insight engine format insights 1916 as a story plot that provides a basic outline, without augmentation, for a playlist. Various implementations of insight engine 1914 extract and analyze data curated by curation engine 1918 as further described herein. Insights 1916 can be formed using any suitable type of data structure that can be utilized to store information, examples of which are provided herein.

Story narrator 1920 receives the one or more insights 1916 and generates scripts 1922 that can be utilized to generate a narrated analytics playlist. As further described herein, scripts 1922 can include an outline of events to include in the narrated playlist, a text form of a narrated description, a chart, keywords, and so forth. In one or more implementations, scripts 1922 correspond to an augmented version of the story plot and/or insights received from the insight engine. Various implementations include the answer to the query, as well as the identified insights associated with the query, in a same script such that the narrated analytics playlist includes narrated videos that describe the answer, as well as the insight(s). Scripts 1922 can be formed using any suitable type of data structure that can be utilized to store information, examples of which are provided herein.

Scripts 1922 are provided to animator 1924, which uses the scripts and/or corresponding metadata to identify what images and audio to include in the narrated analytics playlist. For example, animator 1924 can generate synthetic speech to include in the playlist based upon the text included in the scripts, can pull branding information, chart images, etc. Thus, animator 1924 generates narrated analytics playlist 1926, which is consumable by player 1928 to render images and/or output synchronized audio. In various scenarios, player 1928 corresponds to playback module 132 of FIG. 1, playback module 1120 of FIG. 11, and/or playback module 1800 of FIG. 18. Various implementations of player 1928 capture playback analytics and learnings, which are then stored in feedback loop and system analytics 1930 and/or uploaded into proximity platform 1932. In various implementations, feedback loop and system analytics 1930 is representative of databases 124 of FIG. 1. Alternately or additionally, player 1928 represents a third-party playback engine that is external to the personalized analytics system. Accordingly, various implementations generate narrated analytics playlist 1926 in formats that are compatible with multiple different types of playback engines. Playlist 1926 can be formed using any suitable type of data structure that can be utilized to store information, examples of which are provided herein.

While player 1928 is described here as generating playback analytics and learning that is stored in feedback loop and system analytics 1930, alternate or additional modules within the personalized analytics system generate and/or upload various types of analytics and learnings to the feedback loop and system analytics 1930 and/or proximity platform 1932. Thus, feedback loop and system analytics 1930 corresponds to data, algorithms, and/or information learned by the personalized analytics system that is subsequently utilized in future data curation and/or future insight generation. The playback analytics and learning can include various hyper-parameters used by machine-learning algorithms in various modules of the personalized analytics system that are shared with other shared systems by way of proximity platform 1932.

To further demonstrate, consider now FIGS. 20A and 20B that illustrate an example of utilizing a proximity platform to share learned information in accordance with one or more implementations. In various scenarios, the example described with respect to FIGS. 20A and 20B can be considered a continuation of one or more examples described with respect to FIGS. 1-4, 5A, 5B, 5C, 6, 7, 8A, 8B, and 9-19.

FIGS. 20A and 20B collectively illustrate an example progression of events over an arbitrary time period. Here, the progression begins in FIG. 20A and then moves to FIG. 20B. It is to be appreciated that the progression of events described with respect to FIGS. 20A and 20B is for discussion purposes, and that any other ordering, omission, and/or addition to the events can occur without departing from the scope of the claimed subject matter.

FIG. 20A illustrates an example environment 2000 that includes servers 102 of FIG. 1 that provide cloud-based services 2002 associated with a personalized analytics system to various devices and/or organizations. Here, the personalized analytics system includes proximity platform 2004. While illustrated separately from cloud-based services 2002 and servers 102, this is merely for discussion purposes and it is to be appreciated that alternate or additional implementations integrate portions or all of the proximity platform functionality into the cloud-based services and/or servers 102 without departing from the scope of the claimed subject matter.

In this example, the personalized analytics system provides services to two separate and disparate organizations: organization 2006-1 and organization 2006-2 respectively. Accordingly, each organization has a respective server to access the cloud-based services, identified here as private server 2008-1 and private server 2008-2. Similarly, each organization also has respective private data, labeled here as private data 2010-1 and private data 2010-2. Thus, private data 2010-1 corresponds to data accessible to devices associated with organization 2006-1, such as client device 2012-1 and the client device 2012-2 but inaccessible to devices associated with other organizations, such as client device 2012-3 and client device 2012-4 of organization 2006-2. Similarly, private data 2010-2 corresponds to data accessible to client device 2012-3 and client device 2012-4, but inaccessible to client device 2012-1 and client device 2012-2. Thus, the various computing devices included in organization 2006-1 are disparate and unrelated to the various computing devices of organization 2006-2.

As each client device accesses the personalized analytics system, various implementations collect anecdotal data and/or evolve machine-learning algorithms as further described herein. Since the personalized analytics system as illustrated in FIG. 17 supports multiple organizations, it is desirable to apply the anecdotal and/or evolved machine-learning algorithms at a system level (e.g., at servers 102). For example, applying the machine-learning algorithms evolved at organization 2006-1 at organization 2006-2 (and vice versa) allows the personalized analytics system return information more relevant to each organization. However, it is undesirable to share the private data used to evolve the machine-learning algorithms. In other words, to protect the privacy of each organization, it is desirable to share learned information across organization, but keep private data 2010-1 inaccessible to devices external to organization 2006-1, and private data 2010-2 inaccessible to devices external to organization 2006-2.

Various implementations forward learned information to the personalized analytics system without exposing private data. To illustrate, consider learnings 2014-1 that generally corresponds to various types of anecdotal data, machine-learning algorithm observations, reinforcement learning information, hyper-parameters, etc., generated by client device 2012-1 and/or client device 2012-2. These learnings are forwarded by the respective client devices to private server 2008-1, as further indicated here by the directional arrows. Private server 2008-1 then forwards learnings 2014-1 to proximity platform 2004, indicated here by directional arrow 2016-1, such as through the use of cloud-based services 2002. Similarly, client device 2012-3 and client device 2012-4 forward respective learnings 2014-2 to private server 2008-2 which, in turn, forwards the learnings to the proximity platform 2004, indicated here by directional arrow 2016-2. The proximity platform 2004 then integrates the learning information into the personalized analytics system, generally indicated here with arrow 2018. In some implementations, the proximity platform 2004 executes operations represented by a logical format language that is separate from underlying languages of systems utilized by each client device and/or organization. Using the logical format language allows the proximity platform to communicate with several varied underlying technologies and language formats (e.g., disparate technologies) used by each organization. To illustrate, with respect to FIG. 20A, organization 2006-1 can employ a first technology to support various devices (e.g., private server 2008-1, client device 2012-1, and/or client device 2012-2) and organization 2006-2 can employ a second, different technology to support various devices (e.g., private server 2008-2, client device 2012-3, and/or client device 2012-4). Even though these organizations utilize different technologies, the organizations can both interact with a same proximity platform 2004 via the logical format language, which allows the proximity platform to abstract and/or protect each organization's private data from the other.

Moving to FIG. 20B, and in response to integrating the learning information into the personalized analytics system, various implementations generate updates to one or more machine-learning algorithms, such as by forwarding hyperparameters to each server of the system (e.g., private server 2008-1, private server 2008-2, etc.). Alternately or additionally, proximity platform 2004 integrates the information into cloud-based services 2002. In FIG. 20B, proximity platform 2004 forwards algorithm updates 2020 to both private server 2008-1 and private server 2008-2, as generally indicted by the directional arrow 2022-1 and arrow 2022-2. Thus, the personalized analytics system is able to extract learned information about various user profiles and/or workspaces of the system and forward the learned information without exposing private data. In other words, by extracting and sharing learned information, such as the non-limiting example of sharing machine-learning algorithm hyper-parameters from a first system to a second system, the proximity-platform provides the personalized analytics system with the ability to change the second system's behavior (e.g., impact a prediction outcome, adjust parameters of a model applied to similar data of a different client device, etc.) without compromising the security of the first system. The changed system behavior can include efficiency improvements (e.g., faster insight determination times, faster data extraction, faster data curation, etc.). As one non-limiting example, a set of hyper-parameters can be adjusted or tuned to generate optimal hyper-parameter values to improve efficiency, such as by using grid search techniques, random search technique, Bayesian optimization technique, as part of the tuning algorithms. In various implementations, the personalized analytics system determines which of the hyper-parameters are relevant for tuning based on a predictive learning model or target outcome. In turn, the optimal hyper-parameter values can be distributed to different systems. Accordingly, the personalized analytics system can leverage the learned efficiencies across disparate computing devices without exposing the data used to generate the efficiencies.

Figure 21:
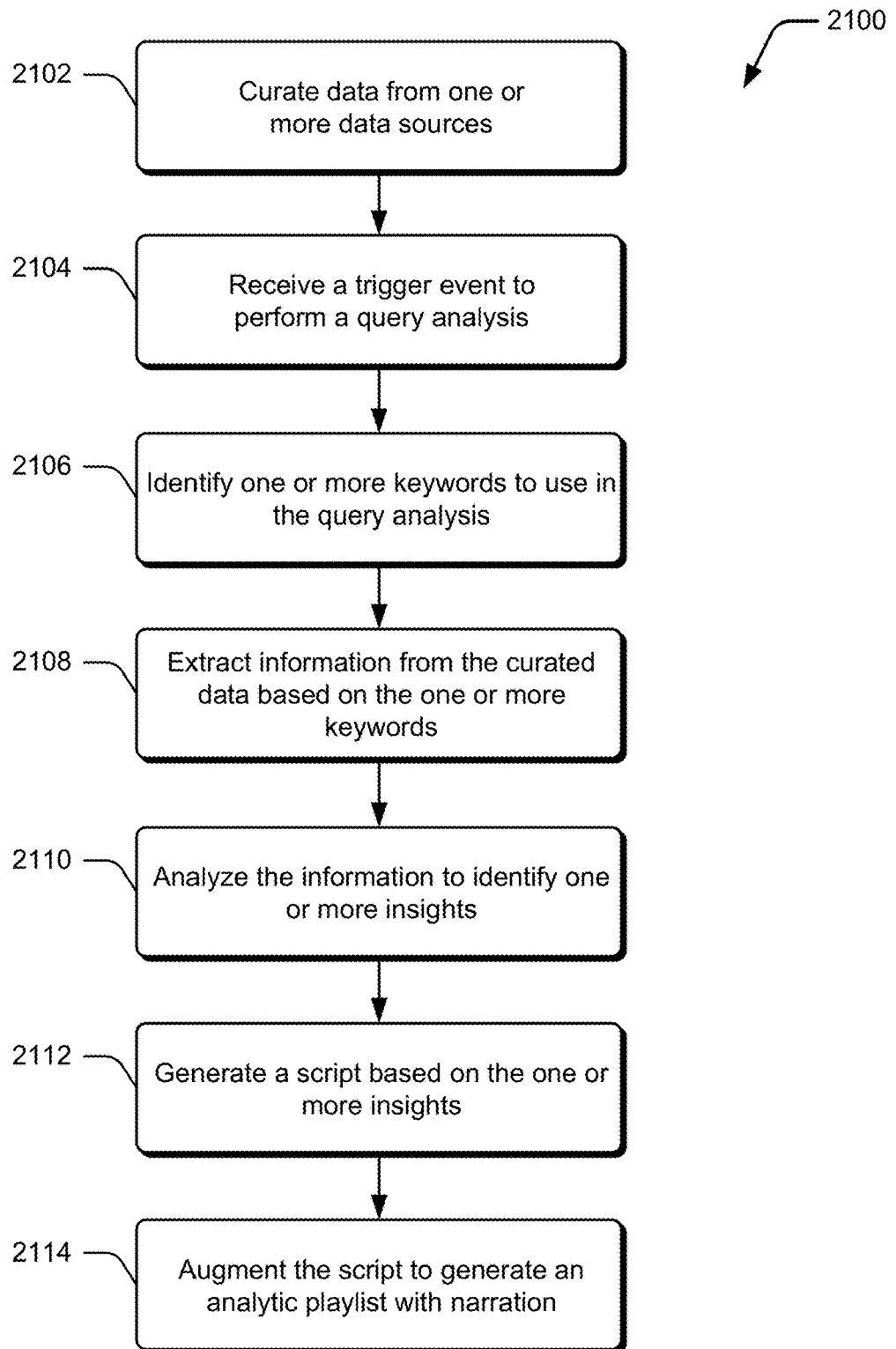
FIG. 21 illustrates a flow diagram of generating a narrated analytics playlist in accordance with one or more implementations.

FIG. 21 illustrates an example method 2100 that can be utilized to generate narrated analytics playlists in accordance with one or more implementations. The method can be performed by any suitable combination of hardware, software, and/or firmware. In at least some embodiments, aspects of the method can be implemented by one or more suitably configured hardware components and/or software modules, such as various hardware and/or software modules associated with servers 102 and/or computing device 104 of FIG. 1. While the method described in FIG. 21 illustrates these steps in a particular order, it is to be appreciated that any specific order or hierarchy of the steps described here is used to illustrate an example of a sample approach. Other approaches may be used that rearrange the ordering of these steps. Thus, the order steps described here may be rearranged, and the illustrated ordering of these steps is not intended to be limiting.

At 2102, various implementations curate data from one or more data sources, such as through the use of curation engine module 110. In some implementations, the personalized analytics system identifies data sources to scan based on user-defined data sources, such as database addresses assigned to a particular workspace via explicit input to the personalized analytics system. Alternately or additionally, various implementations scan applications for data to curate, such as SaaS applications. The curation of data can be in response to input corresponding to a manual trigger request and/or occur automatically, such as at scheduled intervals, during idle periods of system inactivity (e.g., no active input), and so forth. To curate the data, one or more implementations identify attributes and/or relational information between the data that is then stored in metadata. The personalized analytics system oftentimes generates relational data models during the curation process, and applies the relational data models when storing the curated data in a database. In some implementations, the curation of data includes identifying drill-path information, and storing the drill-path information as part of the curated data. Alternately or additionally, one or more implementations utilize anecdotal data to influence the curation process.

At 2104, the personalized analytics system receives a trigger event to perform a query analysis (e.g., personalized analytics module 106). The trigger event can be received in any suitable manner, such as via an explicit input and/or interaction to perform the query analysis and/or an implicit input and/or interaction that is used to trigger the query analysis. Alternately or additionally, the trigger event can originate from a scheduler and/or from calendar scans as further described herein.

In response to receiving the trigger event, various implementations identify one or keywords to use in the query analysis at 2106, such as by using parser module 112 and/or query magnifier module 114. This can include utilizing keywords included in an input query string and/or deriving keywords from anecdotal data associated with a user profile and/or workspace, accessing metadata, using word ranking information, etc. For instance, various implementations identify contextual words included in the input query string, such as by using a tagger and tokenizer module, and then find similar words to the contextual words that have a higher success rate of returning results.

One or more implementations extract information from the curated data based upon the one or more keywords at 2108, such as by using insight engine module 116, parser module 112 and/or query magnifier module 114. In some implementations, the exact words included in the input string are utilized to extract information, while in alternate or additional implementations, the personalized analytics system augments the keywords with contextual parameters. Sometimes the augmentation is based upon anecdotal data. The personalized analytics system can also identify and use alternate words to extract additional information, and then collectively analyze the different variations of extracted information to identify insights. This can include generating multiple queries with alternate wording, using primary and secondary attributes, and so forth. Accordingly, at 2110, one or more implementations analyze the extracted information and/or the additional information to identify one or more insights (e.g., insight engine module 116). Any suitable type of insight can be identified, examples of which are provided herein. In turn, the personalized analytics system generates a script based upon the one or more insights at 2112.

At 2114, and in response to receiving the script, one or more implementations augment the script to generate narrated analytics playlists. In various implementations, the personalized analytics system applies a computational algorithm to the script to identify what components and/or visualizations to include in a playlist that help explain the various insights. One or more implementations augment the script with narrative description(s) using various types of machine-learning algorithms, such as grammar-based algorithms, language pattern algorithms, syntactic algorithms, etc. In turn, the textual description generated by these machine-learning algorithms can be converted into an audible output, such as through the use of various text-to-speech algorithms. The visualizations and audible output are then statically bundled to form a narrated analytics playlist. In one or more implementations, metadata is combined and/or statically bundled the narrated analytics playlist as well.

Having described an example of generating narrated analytics playlists, consider now a discussion of query magnification that is in accordance with one or more implementations.'

Query Magnification

The automated generation of narrated analytic playlists receives input phrases or keywords, and uses the input phrases or keywords to identify insights that are relevant to a user, such as business insights as further described herein. The input queries can include automated input queries including trigger event(s) and manual input queries from a user. This can include input queries with actionable phrases, such as "tell me about Cappuccino sales every day at 8:00 AM in the morning", that include a command and/or action (e.g., "tell me about . . . "). In each scenario, the personalized analytics system uses the input phrases or keywords as a basis for extracting curated data that is subsequently analyzed to generate the insight. In other words, the input phrases and/or keywords provide the personalized analytics system with clues on how to generate insights and/or use curated metadata for interpretation purposes. illustrate, an automated calendar scan can extract calendar information and use the calendar information to form the input query. Alternately or additionally, a user can manually enter a text string as the input query. In turn, the personalized analytic system can augment the input query to extract and analyze data as a way to identify the insights as further described herein.

Oftentimes, the user desires to obtain an insight, but is unaware of how to request the insight. This can lead to broadly phrased input queries that are ambiguous, vague, and/or fail to clearly articulate what the user is searching for. For example, a user may enter a general input query, such as "How are Product X sales doing?", that includes ambiguities (e.g., a location ambiguity and a time ambiguity). In other words, the general input query fails to include location qualifiers and time qualifiers that narrow the scope of the input query. The general input query also fails to more specifically articulate the information the user may be desiring. To illustrate, the input queries "How are Product X sales doing this week in Chicago" and "How are Product X sales doing in the Western states relative to Competitor A's product?" provide additional location qualifiers, time qualifiers, and/or intent qualifiers relative to the general input query, where each qualifier results in the generation of a different insight.

To provide a user with relevant insights, various implementations receive canonical queries, and expand and/or simplify the canonical query based on anecdotal information associated with the user. Here, the phrase "relevant insights" denotes insights generated on additional context information associated with a source of the query, such as anecdotal information about a particular user associated with query (e.g., user actions, user preferences, user history data, user demographics, etc.). Alternately or additionally, the additional context information can include learned information extracted from multiple devices, such as learned information extracted and propagated by proximity platform module 1122 of FIG. 11. The use of the additional context information provides guidance on how to prioritize, qualify, extract, and analyze data for insight generation. Various implementations apply the additional context to magnify and/or augment the base input query, such as by using the additional context to identify an intent of the base input query, add scope to the base input query, determine a time scope for the base input query, and so forth.

Figure 22:
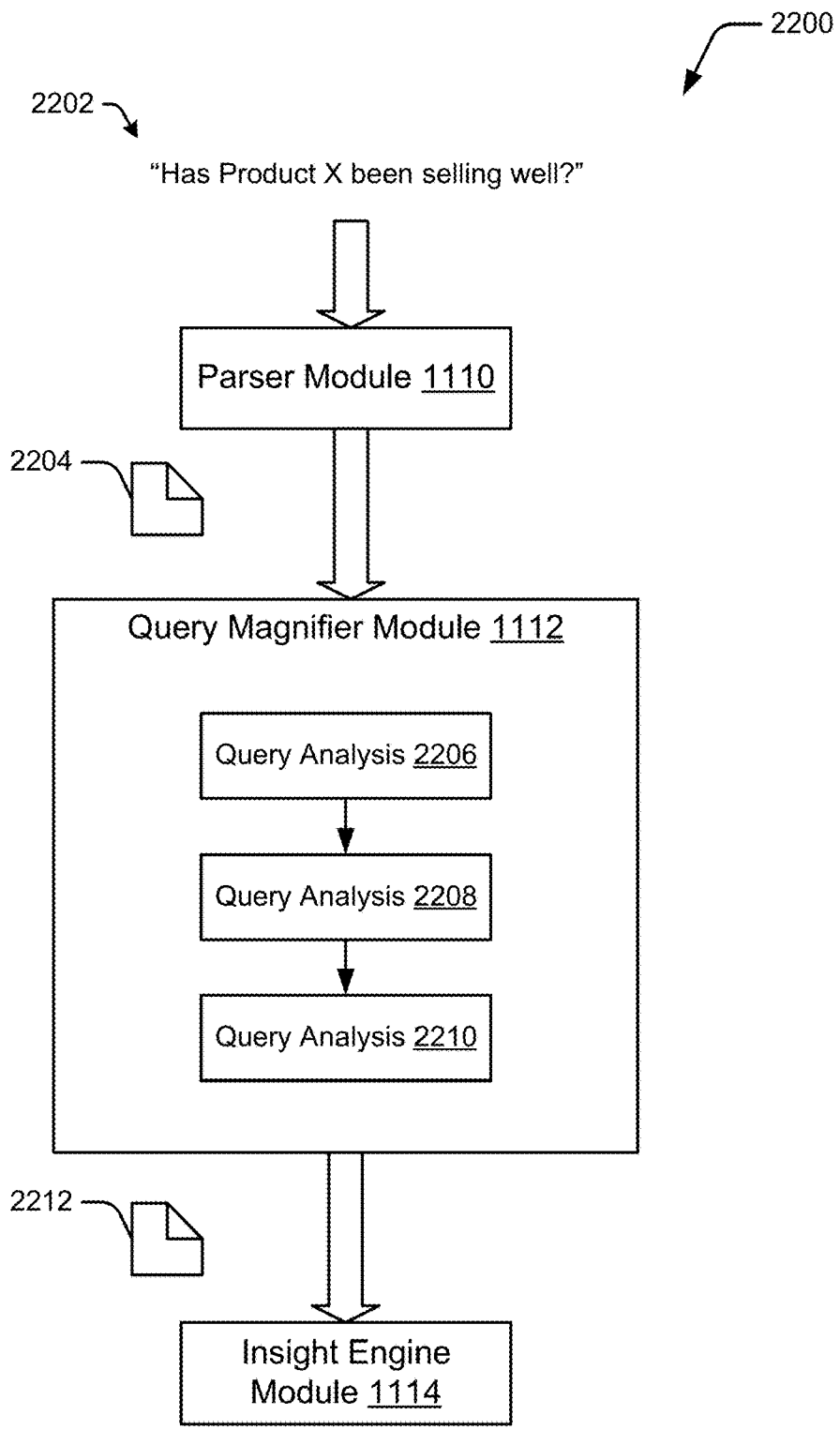
FIG. 22 illustrates an example of a query magnifier module in accordance with one or more implementations.

To further illustrate, consider now FIG. 22 that illustrates an example 2200 that is in accordance with one or more implementations. Example 2200 includes parser module 1110, query magnifier module 1112, and insight engine module 1114 of FIG. 11, and illustrates interactions between the modules that can be utilized to generate a narrated analytics playlist as further described herein. In various scenarios, the example described with respect to FIG. 22 can be considered a continuation of one or more examples described with respect to FIGS. 1-4, 5A, 5B, 5C, 6, 7, 8A, 8B, 9-19, 20A, 20B, and 21.

In example 2200, parser module 1110 receives input query 2202 that generally represents any type of base input query, such as a manual user input query, an automated input query based on a trigger event, and so forth. In response to receiving the input query, parser module 1110 analyzes the input query, and generates a canonical query 2204, such as through the use of a tagger and tokenizer module and/or a keyword breakdown and ranking module as further described herein. Accordingly, canonical query 2204 generally represents a query that includes identifying information about the base input query (e.g., input query 2202), such as through the use of markup language to denote keywords, sorted parameters, actions, timestamps, authentication tokens, etc. Alternately or additionally, a canonical query corresponds to a clean form of the input query that has been corrected for spelling errors, context errors, and so forth.

Query magnifier module 1112 analyzes the canonical query 2204 to determine what information would be helpful to the user and how to efficiently query for data that can be used to generate that information. Alternately or additionally, query magnifier module 1112 receives and/or accesses anecdotal information about a user (e.g., user preferences, user history data) as part of the analysis process. In implementations, the query magnifier module generates enhanced versions of the input query, such as by increasing a scope of the query in depth and breadth, by using user specific information user preferences, created data, etc. This enrichment process helps identify data more relevant to the user, which, in turn, improves the quality of a resultant insight (e.g., generates an insight that addresses the user query more accurately relative to other insights). In other words, by enriching the query with user specific data (e.g., user specific information and/or preferences), as well as performing canonical corrections and formatting, the query magnifier module improves the data extraction process which, in turn, generates insights relevant to the particular user. In some implementation, the enrichment process analyzes learned information extracted and propagated by a proximity platform as further described herein.

Query magnifier module 1112 can alternately or additionally optimize the operations that are used to extract curated data from a database (e.g., use less operations relative to other methods to extract a same data set). The optimization of data extraction improves the operation of a computing device performing the extraction by reducing a number of operations used to extract the data set, thus performing the operation more quickly relative to unoptimized data extraction calls. This frees up processing resources more quickly for other tasks.

The query enhancement process performed by query magnifier module 1112 is generally denoted in example 2200 through the use of query analysis 2206, query analysis 2208, and query analysis 2210, each of which can be implemented using any combination of software, hardware, and/or firmware. For discussion purposes, example 2200 illustrates the three query analyses in serial form (e.g., an output of query analysis 2206 is used as input to query analysis 2208, etc.), but it is to be appreciated that alternate or additional implementations perform the query analyses in parallel and/or iteratively. For example, the output of query analysis 2208 can be used as input to query analysis 2206 to iteratively refine an output generated by query analysis 2206, and so forth. Alternately or additionally, each query analysis can operate asynchronously from one another. Collectively, query analysis 2206, query analysis 2208, and query analysis 2210 enable query magnifier module 1112 to generate an augmented logical query 2212 that can be used by insight engine module 1114 to extract curated data as further described herein.

Where conventional parsers translate a single user input query into a single logical query output, query magnifier module 1112 can generate multiple logical queries from a single user input query. The query magnifier module, for instance, can analyze the user input query to identify an intent, and add scope to the user input query based on various types of information, such as anecdotal information associated with the user and/or learned information extracted and propagated by a proximity platform as further described herein. In some implementations, the scope provides context to an abstract question. To illustrate, consider a user input query corresponding to "how is my business doing" that has ambiguity. Query magnifier module 1112 can translate this single user input query into multiple logical queries, such as "sales yesterday", "net new customers this month", and "inventory holding times this quarter" by identifying an intent, expanding the intent, and/or adding qualifiers based on anecdotal information associated with the user as further described herein.

Query magnifier module 1112 can alternately or additionally access public information to generate the multiple queries. For instance, referring to the single user input query of "how is my business doing", the query magnifier module 1112 can identify public information associated with a location of the user, such as identifying the user is located in Florida and the current public news refers hurricanes. Query magnifier module 1112 can generate a query corresponding to "daily store sales in Florida this week" based the public news and/or information extracted from outside an organization. Thus, query magnifier module 1112 can analyze a user input query, determine an intent of the user input query, and generate multiple variations of the user input query that can be used to not only answer the user input query, but help extract data that can be used identify insights the user may not know to ask for.

Figure 23:
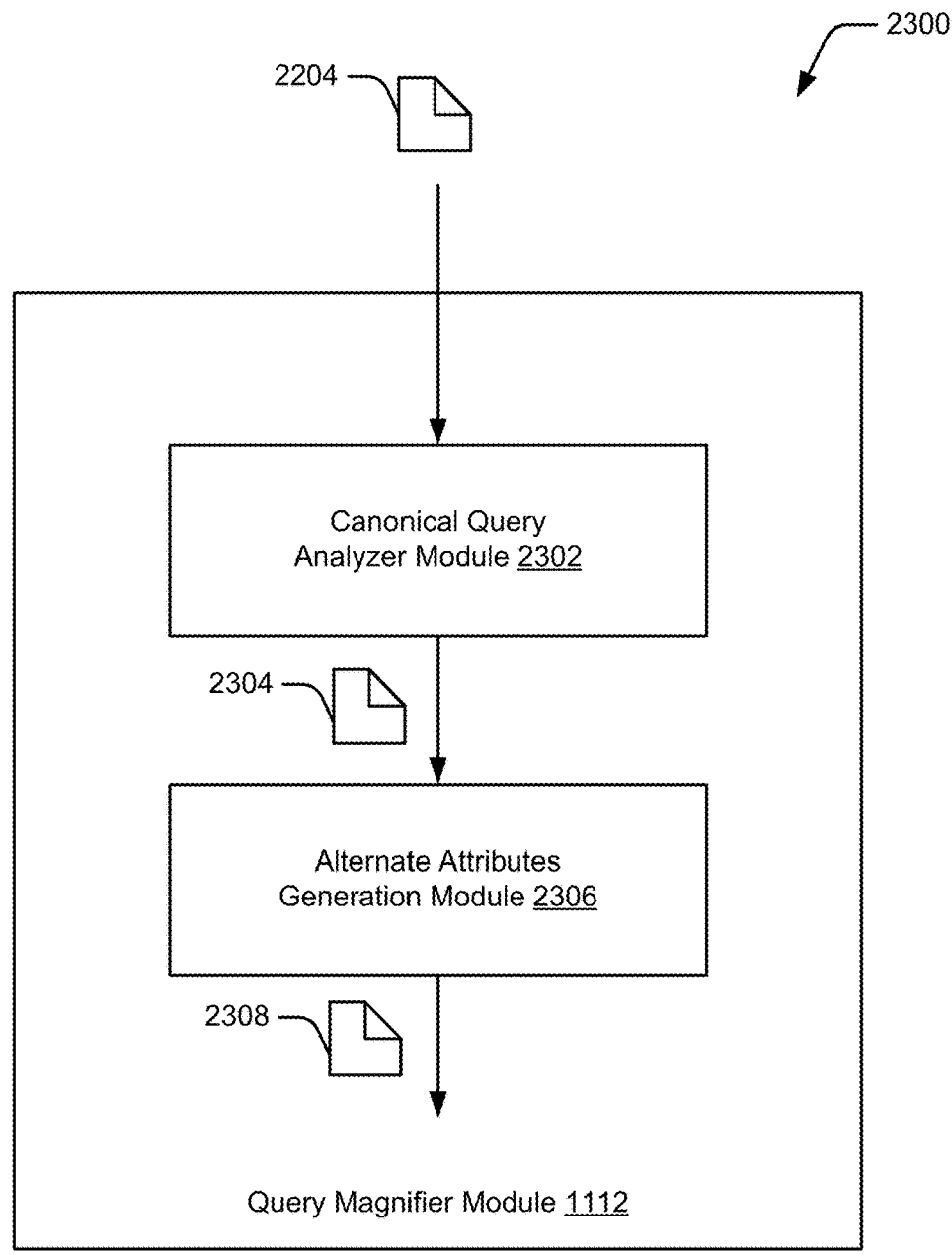
FIG. 23 illustrates an example of a query analysis performed by a query magnifier module in accordance with one or more implementations.
Figure 23:
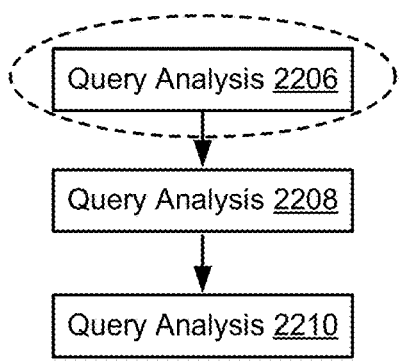
Figure 24:
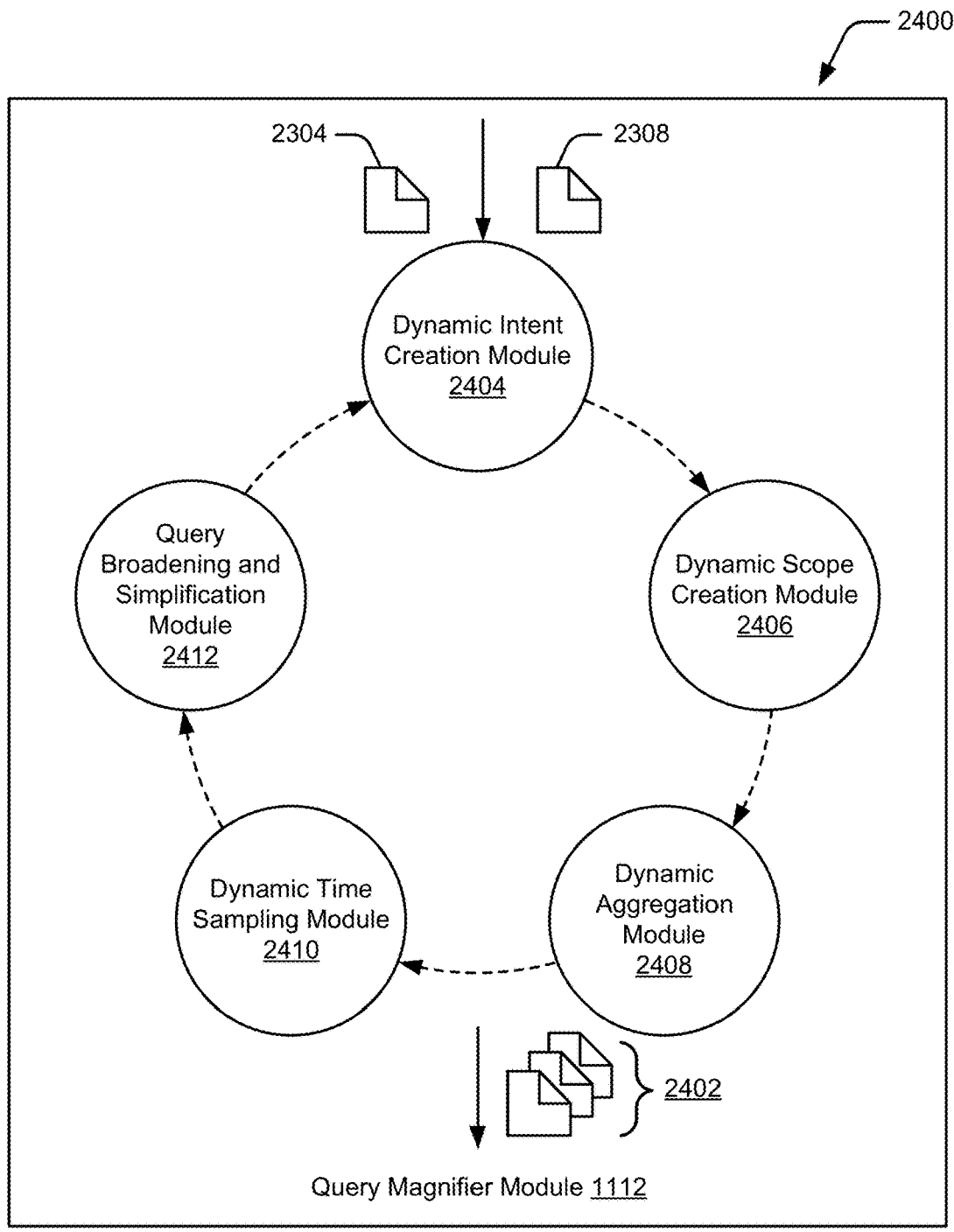
FIG. 24 illustrates an example of a query analysis performed by a query magnifier module in accordance with one or more implementations.
Figure 24:
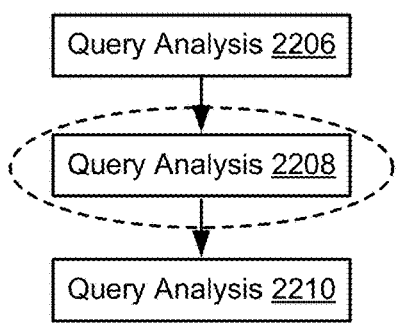
Figure 25:
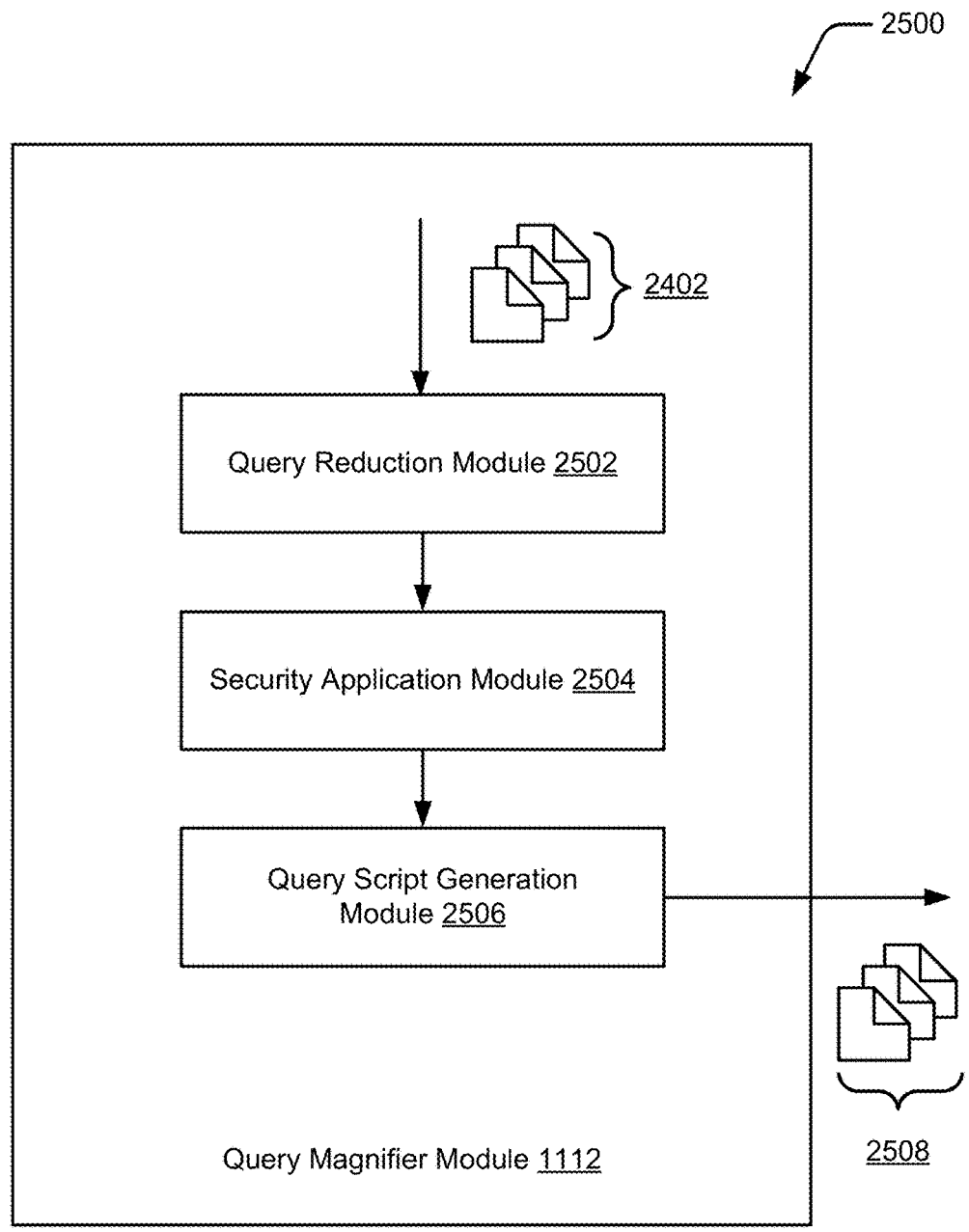
FIG. 25 illustrates an example of a query analysis performed by a query magnifier module in accordance with one or more implementations.
Figure 25:
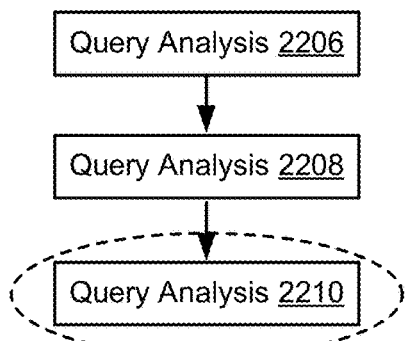

To further illustrate, consider now FIG. 23, FIG. 24, and FIG. 25 that illustrate example implementations of query analysis 2206, query analysis 2208, and query analysis 2210 in accordance with one or more embodiments. FIG. 23 illustrates an example 2300 that corresponds to query analysis 2206, FIG. 24 illustrates an example 2400 that corresponds to query analysis 2208, and FIG. 25 illustrates an example 2500 that corresponds to query analysis 2210. In various scenarios, the examples described with respect these Figures can be considered continuations of one or more examples described with respect to FIGS. 1-4, 5A, 5B, 5C, 6, 7, 8A, 8B, 9-19, 20A, 20B, 21, and 30.

In example 2300, the query magnifier module 1112 receives canonical query 2204 of FIG. 22 as input to a canonical query analyzer module 2302. Canonical query analyzer module 2302 can be implemented using any combination of software, firmware, and/or hardware. Canonical query analyzer module 2302 analyzes the canonical query to understand more information and/or details about the query, such as by applying natural language processing algorithms to the canonical query, examples of which are provided herein. For example, through the use of natural language processing algorithms, various implementations can identify an intent of the query, determine a scope of the query, identify areas of aggregation for the query, apply grouping methods to the query, apply time sampling to the query, and/or apply filters to the query.

To illustrate, the canonical query analyzer module 2302 can apply natural language processing algorithms to canonical query 2204 as a way to understand an intent of the query. With reference to input query 2202 of FIG. 22, natural language processing algorithms can identify the keyword "selling" within the query string, and correlate "selling" to a sales metrics. In turn, the canonical query analyzer module determines that an intent of the query is to learn sales information, and stores this detail for future use.

The canonical query analyzer module 2302 can alternately or additionally determine a scope of the query. Consider the example in which the determined intent of an input query relates to learning sales information. Various implementations can analyze the canonical query based on anecdotal information about a particular user to determine details about sales information that are of interest to a particular user. For instance, user A may have a history of asking for regional sales information, while user B has a history of asking for sales margins. Canonical query analyzer module 2302 can identify these user preferences, and determine a scope for the query based on the user preferences that further details the intent of the query. For user A, query parser module 2302 can identify a location qualifier that adds a location scope to the query, while for user B the query parser module identifies an intent variation qualifier (e.g., type of sales metric). Alternately or additionally, the canonical query analyzer module can analyze learned information extracted from multiple devices to determine a scope, such as learned information extracted and propagated by proximity platform module 1122 of FIG. 11.

In implementations, the canonical query analyzer module 2302 identifies aggregate information associated with the canonical query. For instance, the canonical query analyzer module 2302 can identify variations of an intent, and generate these aggregations for logical queries as a way to identify more information. To illustrate, the canonical query analyzer module can identify variations of sales information based on a sales intent, such as sales quantity for a particular product, sales margins at a particular price point, sales forecasts for a product, customer metrics on past sales, regional sales information, and so forth. The canonical query analyzer module 2302 can identify these variations, and aggregate/expand the input query based on identified variations.

Canonical query analyzer module 2302 alternately or additionally filters the information gathered as a way to reduce and/or remove permutations of the query that are less likely to address a query. For example, the canonical query analyzer module 2302 can perform an analysis that prioritizes the aggregated variables based on anecdotal information about the user (e.g., user preferences, user history, etc.) and remove lower priority aggregated variables from consideration. Removing the lower priority variables helps improve a resultant insight by eliminating data that is less likely to address a user's query. This also improves the computation speed of a corresponding computing device by reducing an amount of data extracted (and processed) from a database relative to data extracted using unfiltered variables.

As another example, canonical query analyzer module 2302 can filter the information based on intent and/or context. For instance, consider a first input query "cardiology patients by race" and a second input query "top diseases last month". Each of these queries have a shared intent associated with patient entities, which the canonical query analyzer module 2302 can derive based on context. The identification of a shared intent and/or entity can be used to filter and/or reduce how data is queried by eliminating redundant data queries that share a same intent.

In implementations, canonical query analyzer module 2302 applies time sampling to the query as a way to quantify the resulting insight. Consider again the example in which a user enters a query for sales information that lacks time specifications. In implementations, the canonical query analyzer module can determine a window of time over which to extract data. For instance, canonical query analyzer module 2302 can apply machine learning algorithms to anecdotal information about the user as a way to identify past units of time that are of interest to the user (e.g., a day, a week, a month, a year, etc.). As another example, the canonical query analyzer module can determine an appropriate time window for each query based on trends and/or patterns in the curated data (e.g., a seasonality of the curated data). This not only helps generate information relevant to the user, but helps define limits to the data extraction to optimize how the data is extracted.

In analyzing a canonical query, the canonical query analyzer module 2302 learns and/or identifies information about the query that describes topics relevant to a user, such as an intent of the query, a scope of the query, aggregate interpretations of the query, and so forth. While these analyses can broaden an interpretation of the query, the canonical query analyzer module can also help strategically reduce a scope interpretation of the query, such as by filtering out less relevant variations and adding time limits to the query. In implementations, the canonical query parser can group the learned query information, such as by using clustering algorithms that classify each identified attribute and/or detail into a specific group with similar properties and/or features. This can alternately or additionally provide insight into characteristics associated with the input query.

The canonical query analyzer module generates learned query information 2304 based on the analysis of canonical query 2204 as further described herein. The learned query information can include any combination of learned intent information, learned scope information, learned aggregation information, learned timing windows, learned filters, learned groupings, and so forth. In implementations, the learned query information 2304 includes attributes identified by the canonical query analyzer module during the analysis process. Various implementations forward the learned query information to an alternate attributes generation module 2306 as a way to identify similar attributes to those determined by the canonical query analyzer module.

For instance, the alternate attributes generation module 2306 can use machine learning algorithms, examples of which are provided herein, to identify attributes similar to the determined query intent. While described with reference to a determined query intent, it is to be appreciated that attributes for other types of learned query information can be identified as well, such as alternate attributes for aggregated topics and/or scopes. Referring to a determined query intent that corresponds to "sales information", various implementations can apply machine learning algorithms that identify alternate attributes, such as "marketing", "buying", "demand", etc., that can be used to help broaden how curated data is extracted from a database. In other words, the alternate attributes can be used to help generate logical queries that subsequently extract the curated data.

In implementations, the alternate attributes generation module 2306 applies algorithms to identify additional and/or secondary information associated with a primary topic of the query, such as an intent, to generate drill-up attributes and/or drill-down attributes. The logic of identifying the hierarchy of attributes includes finding repeating patterns or the number of unique attribute values, such as a state name being repeated when comparing cities in a stored address data table. This can include time-based drill-up/drill-down attributes, location-based drill-up/drill-down attributes, product-based drill-up/drill-down attributes, etc. In identifying alternate attributes that correspond to drill-up/drill-down information, as well as alternate attributes for learned query information, the alternate attributes generation module 2306 broadens the subsequent logical query that is generated to extract curated data for processing. This metadata of paths can be used for better search recommendations (e.g., more efficient, more relevant, etc.) or identifying the logical queries that need to be generated.

Similar to canonical query analyzer module 2302, alternate attributes generation module 2306 can alternately or additionally filter the alternate attributes, such as by prioritizing the alternate attributes based on anecdotal information about a user, relevance calculations, etc., to remove variations that are less likely to provide relevant data when compared to other variations. Alternate attributes generation module 2306 can also identify and/or determine time sampling parameters (e.g., a day, a week, a month, a year) to define time limits that can improve extracting the curated data from a database. For instance, logical queries generated from the identified time windows can reduce an amount of curated data extracted by preventing the personalized analytics system from extracting curated data outside the defined time limits. Alternately or additionally, alternate attributes generation module 2306 can apply clustering algorithms to group the learned alternate attributes. Accordingly, and similar to canonical query analyzer module 2302, alternate attributes generation module 2306 generates learned alternate attributes information 2308 that corresponds to any combination of learned alternate intent attributes, learned alternate scope attributes, learned alternate aggregation attributes, learned alternate timing window attributes, learned alternate filtering attributes, learned alternate grouping attributes, and so forth. Thus, in some scenarios, canonical query analyzer module 2302 and/or the alternate attributes generation module 2306 curate the canonical query 2204 by identifying relevant and irrelevant attributes and/or enhancements to the query.

Moving to FIG. 24, example 2400 illustrates aspects of query analysis 2208 that is in accordance with one or more implementations. Generally, query analysis 2208 receives any combination of learned query information 2304 and/or learned alternate attributes information 2308 of FIG. 23, and generates logical queries 2402. Alternately or additionally, query analysis 2208 can generate the logical queries 2402 based on anecdotal information about a user and/or can analyze learned information extracted and propagated by proximity platform. A logical query generally corresponds to a query generated by query magnifier module 1112 that is based on a determined intent. Accordingly, the query magnifier module 1112 can generate multiple logical queries based on identifying multiple intents and/or scopes. To determine an intent and/or scope, various implementations iterate through a series of analyses, either using a single iteration and/or multiple iterations. In example 2400, the query analysis 2208 iterates through analyses performed by a dynamic intent creation module 2404, a dynamic scope creation module 2406, a dynamic aggregation module 2408, a dynamic time sampling module 2410, and a query broadening and simplification module 2412. Each of these modules can be implemented using any combination of software, firmware, and/or hardware.

The dynamic intent creation module 2404 analyzes the input information (e.g., learned query information 2304 and/or learned alternate attributes information 2308) using machine learning algorithms to dynamically identify a query intent, such as an intent of input query 2202 of FIG. 22. This can include applying natural language processing algorithms to a canonical input query and/or to attributes as further described herein. Generally, learned query information 2304 and/or learned alternate attributes information 2308 correspond to broader and expanded information corresponding to the input query 2202, where the broader and expanded information has been curated, audited, and/or inspected by canonical query analyzer module 2302 and/or alternate attributes generation module 2306 of FIG. 23. In some implementations, the broader and expanded information includes information that has been identified as having more relevance to the user and/or input query relative to additional information identified, but excluded, during the query analysis 2206. This provides the dynamic intent creation module 2404 with information that can be used to more accurately determine a query intent of the user relative to determining a query intent from only the input query 2202.

In implementations, any type of data and/or attribute included in learned query information 2304 and/or learned alternate attributes information 2308 can be interpreted as a query intent. For example, consider a text-based attribute that corresponds to a store name, such as "Coffee Cabana". Various implementations of the dynamic intent creation module analyze the text-based attribute to dynamically identify a query intent, such as a query intent corresponding to determining a distribution of stores (e.g., "Show the distribution of Coffee Cabana across America").

As another example, consider a numerical attribute that has a measure unit, such as a number of sales employees "1000". The dynamic intent creation module can analyze the numerical attribute to dynamically determine a query intent, such as "Has the sales force increased over the past year". As yet another example, the dynamic intent creation module can identify "sales" as a measure and generate a query intent corresponding to "sales growth". This can include identifying variations of the measure (e.g., increased employees, decreased employees, sales growth, sales decline, new customers, incremental customers, etc.), and including the variations in logical queries, such as "how many new customers were added last month" corresponding to an increased variation of a customer measure. A sales growth measure, for instance, can be used to identify a query intent of "in what regions did our sales growth decline" that is based on a decreased measure variation. Accordingly, any attribute can be analyzed and/or utilized to dynamically determine a query intent, including text-based attributes and numerical attributes.

In implementations, dynamic intent creation module 2404 produces text-based data to describe a generated query intent and/or a query generated from the query intent. For instance, the dynamic intent creation module can generate text-based descriptions, such as "Sales by Region", "Sales Region-wise", "Region Sales", "Sales Across Regions", and/or "Region-wise Sales" for the query intent of "in what regions did our sales growth decline". This provides the personalized analytics system with an ability to communicate a description of a query intent and/or insights generated for the corresponding query intent, such as by using the text-based descriptions in a narrated analytics playlist.

Various implementations dynamically determine a query intent to include in a logical query by identifying correlated attributes, and then generate the logical query based on the correlated attributes. For example, dynamic intent creation module 2404 can apply machine-learning algorithms to attributes included in learned query information 2304 and/or learned alternate attributes information 2308 to identify attributes that are correlated to one another, and determine an insight from the correlated attributes. Consider an example in which the learned query information 2304 and/or learned alternate attributes information 2308 includes a sales attribute and a promotion attribute for the particular store. Machine learning algorithms can correlate the sales attribute to the promotion attribute to identify an insight corresponding to the sales and when the promotion is in progress (and/or when the promotion is not in progress). In turn, the dynamic intent creation module can generate a logical query for querying curated data, such as "daily store sales last week, promotional sales vs. non-promotional sales". Thus, the dynamic intent creation module can correlate information generated by the canonical query analyzer module and/or the alternate attributes generation module to identify query intents to include in a logical query.

While described as identifying correlated attributes from the input information (e.g., learned query information 2304 and/or learned alternate attributes information 2308), alternate or additional implementations of the dynamic intent creation module can scan other types of information to identify correlated attributes, such as existing charts, existing reports, existing dashboards of a customer, and so forth. In that one or more implementations, the dynamic intent creation module utilizes API level access to obtain the additional information. Alternately or additionally, dynamic intent creation module 2404 can scan saved reports, such as spreadsheet reports, Portable Document Format (PDF) reports, text documents, etc. In various implementations, the additional information can be obtained via page scraping and/or web scraping that extracts data from web pages for analysis.

The dynamic intent creation module can alternately or additionally skip or down-prioritize the analysis of attributes that have been marked as having higher data noise. For instance, in various implementations, attributes can have a corresponding data noise factor that indicates the noise level of the corresponding data. In some implementations, the noise factor can be based on a scale, such as a scale that ranges from 0-100 (0 being an indication of non-noise and 100 being an indication of all noise) to provide a grade of the noise level. The determination of a data noise factor for an attribute can be performed by any portion of the personalized analytics system, such as by the curation engine module 1102 of FIG. 11. In curating data, the curation engine module 1102 can identify a data noise factor of an attribute and mark the corresponding indication. In turn, dynamic intent creation module 2404 can analyze the data noise factor, and skip or down-prioritize the analysis of such attributes marked as having higher data noise.

Generally, a value of an attribute can be represented in multiple ways that have a same meaning. For example, a company named "JP Morgan Chase" can be represented as "JP Chase", "JPM Chase", "JPMC", etc., where each variation has a same meaning. Various implementations can identify word attributes that have similar meanings as a way to reduce the data noise, such as through the use of a combination of algorithms (e.g., word2vec, Binary Classification Methods, etc.). To illustrate, words can be represented in a lower dimensional space using a word2vec algorithm and/or modern machine learning algorithms that leverage publicly available data sources, such as business newspaper archives, word2vec representations, or Wikipedia. In turn, a binary classification algorithm can take two words or phrases represented in a lower dimensional space as inputs, and output a probability value that indicates how similar the two words and/or phrases are. For example, a probability value close to 0 within a first threshold value can be used indicate that the two words are not similar, while a probability value with a value close to 1 within a second threshold value can be used indicate that the two words are similar. In turn, the personalized analytics system can use the probability value and/or the corresponding threshold value(s) to determine when two words that have been identified as being similar.

Alternately or additionally, the personalized analytics system can determine to substitute one of the similar words for the other based on the probability value. In some implementations, the personalized analytics system can, for a particular attribute and/or word, search for similar words by searching for attributes that have a probability value greater than a particular threshold value, such as 0.9, and determine to substitute the similar words used as substitutes for one another. In some implementations, the personalized analytics system can lower the data noise factor of the corresponding attribute that has been identified as being similar. In turn, upon receiving an input query that includes one of the similar and/or substitute phrases, the personalized analytics system can consider the other phrases. For example, in response to receiving an input query of "total sales of JPMC", the personalized analytics system can internally aggregate the input query to include the sales of "JPMC", "JP Morgan Chase", "JP Chase", and "JPM Chase".

Intents generated by the dynamic intent creation module can alternately or additionally be analyzed by the personalized analytics system to extract attributes and/or intents to use in identifying future query intents. For example, the curation engine module 1102 can analyze previously generated query intents and/or previously generated queries. To illustrate, consider a scenario in which a user previously inputs queries on sales information for Store #132 and Store #198. The curation engine module 1102 can analyze these queries using machine learning algorithms to identify common attributes between the queries, such as an attribute that each store is managed by a same person, an attribute that each store resides in a same sales region, an attribute that each store is in close proximity to a school, and so forth. Alternately or additionally, these attributes can be marked as being user preferences. Accordingly, various implementations capture these details and/or observations. In turn, the dynamic intent creation module 2404 can use the attributes and/or user preferences to generate a current query intent as further described herein. Dynamic intent creation module 2404 can create and/or contribute to the creation of any number of logical queries based on identified intents, user preferences, learned information extracted and propagated by a proximity platform, and so forth.

Moving on in the analysis process, dynamic scope creation module 2406 determines a scope of a logical query, such as a logical query generated by dynamic intent creation module 2404. For example, dynamic scope creation module 2406 can analyze, using machine learning algorithms, metadata, user activity, user query history, user profile information, learned information extracted and propagated by a proximity platform, and so forth, to learn anecdotal information and/or past user behavior that provides understanding on what scoping is of value for a particular user. In turn, the dynamic scope creation module 2406 can resolve ambiguities in the logical query based on the anecdotal information, such as location ambiguities, business metric ambiguities, fiscal metric ambiguities, gender ambiguities, time ambiguities, customer ambiguities, etc. Generally, the term ambiguity is used to denote a scoping ambiguity that can be resolved with qualifiers.

To illustrate, consider a scenario in which an intent and/or logical query identified by the dynamic intent creation module corresponds to a retail store. The retail store can have associated attributes, such as a store number, product information, city information, state information, region information, territory information, holiday hours, promotional offer information, sales information, customer identification information, and so forth. By analyzing anecdotal information about the user, dynamic scope creation module 2406 can add scope to the intent and/or logical query based on a combination of the attributes and anecdotal information.

For example, if a user associated with the input query works in California, the dynamic scope creation module can add California as a scope to the intent and/or logical query to focus on curated data corresponding to California branches of the retail store. The personalized analytics system can alternately or additionally identify that the user associated with the logical query has a job responsibility associated with managing sales for the retail store over an assigned territory (e.g., Territory 2, Territory 10, etc.). As yet another example, the personalized analytics system can identify that the user has a history of submitting queries for a particular city in California (e.g., San Jose, Camarillo, Oxnard, etc.). In turn, dynamic scope creation module can analyze these user details and determine what scope to add to the intent and/or logical query, such as by adding a state scope of California based on where the user is located, adding a territory scope based upon the user's job responsibility, adding a city scope based on user search history information, etc.

Dynamically determining a scope can alternately or additionally include extrapolating and/or limiting information to generate the scope. For instance, consider the scenario in which the user is located in California and has a history of querying for sales data related to San Jose, California. Various implementations of the dynamic scope creation module analyze this information, and determine to limit a scope to a predetermined number of cities located around San Jose and/or a predetermined number of cities located in California. This helps reduce computation times by limiting an analysis to relevant data.

As another example, with reference to the user managing an assigned territory, the dynamic scope creation module can determine to extrapolate and/or expand the scope to include additional territories that have been identified as being comparable to the assigned territory of the user. To further illustrate, and with reference to promotional events, the dynamic scope creation module can identify, based on analyzing attributes, that a retail store has varying promotional events, and determine to add scope that distinguishes between the promotional events (e.g., sales information during a promotional event, sales information during non-promotional events, etc.). Thus, for a particular intent, such as sales or sales growth, dynamic scope creation module 2406 can determine different types of scope that are applicable to the intent, such as a scope based on region, a scope based on sales events, a scope based on time (e.g., holidays, non-holidays), a scope based on comparable traits (e.g., identifying entities with historically comparable traits), and so forth. Accordingly, the dynamic scope creation module can selectively characterize a logical query based upon user information as further described herein. This allows the dynamic scope creation module 2406 to generate queries that selectively extract by identifying data relevant to the user and decreasing the size of the resultant data sets extracted by selecting relevant data and/or eliminating irrelevant data. In turn, this improves the operation of a computing device performing the extraction by reducing a number of operations used to extract the data set, thus performing the operation more quickly relative to unoptimized data extraction calls. This frees up processing resources more quickly for other tasks.

Dynamic aggregation module 2408 analyzes a query intent, and selectively determines an aggregation method to use in analyzing data and/or attributes associated with the query intent. This can include identifying and/or assigning an aggregation method to a logical query. Generally, an aggregation method corresponds to a data calculation that can be used to generate a metric, such as a sum, an average, a variance, a median, a standard deviation, and so forth. The dynamic aggregation module analyzes the query intent, and selects aggregation method(s) to apply to curated data as a way to generate an answer to the query intent. To illustrate, consider again the scenario in which the query intent corresponds to sales. The dynamic aggregation module 2408 can analyze the query intent and determine that sales attributes are aggregate-able, such as through a sum aggregation method to generate a sales number over a month. Alternately or additionally, the dynamic aggregation module 2408 can select an aggregation method based on the query intent in combination with a scope. Dynamic aggregation module 2408, for instance, can identify that the sales query intent has a corresponding time scope of a year, and determine to assign an aggregate method that determines an average sales metric for each month over the year. The selected aggregate method can then be incorporated in a logical query that is used to extract and analyze curated data.

In some implementations, dynamic aggregation module 2408 selects an aggregation method based on a combination of a query intent and a grouping method. For instance, dynamic aggregation module 2408 can assign a "sum" aggregation method to a logical query of "salary across business units" that has a query intent of salary, and a grouping of salaries by business unit. Conversely, the dynamic aggregation module can assign an "average" aggregation method to a logical query of "salary across cities" that has the same query intent of salary, but groups information by cities. As another example, dynamic aggregation module assigns a logical query of "salary across age groups" a "mean" aggregation method to the logical query based on the grouping on age groups. In each example, the logical queries share a same query intent of "sales", but group the data in varying manners. Thus, how data is grouped can influence the aggregation methods applied, and the corresponding metrics generated. In some implementations, the selection of an aggregation method, and/or multiple aggregation methods, can be performed automatically and without user input that specifies the aggregation method, such as by selecting an aggregation method that best fits a determined intent relative to other aggregation methods. Alternately or additionally, the selection of the aggregation method, and/or the multiple aggregation methods, can be based upon specific user input (e.g., an input query that specifies "what are the average sales last week for tea?").

In some implementations, dynamic aggregation module 2408 selects an aggregation method based on minimizing a query impact on database processing operations. For example, dynamic aggregation module 2408 can identify multiple aggregation methods that are possible for a particular attribute, and select one of the multiple aggregation methods based on the anticipated operations and/or system impact associated with each aggregation method.

Consider an example in which a "sum" aggregation method, an "avg" aggregation method, a "median" aggregation method, a "minimum" aggregation method, and a "maximum" aggregation method can all be applied to particular attribute. Various implementations analyze anticipated processing characteristics associated with the aggregation methods and/or the personalized analytics system, such as a time duration of performing each aggregation method, a number of curation operations associated with each aggregation method, whether the personalized analytics system is operating during off-peak performance times, whether concurrent querying activities are being performed, how many concurrent query activities are being performed, database processing impact, system impact, and so forth. In turn, dynamic aggregation module 2408 can select one of the multiple aggregation methods to perform on the particular attribute based on the processing characteristics and/or to minimize an impact on the personalized analytics system. In other words, various implementations select the aggregation method that impacts the system less (e.g., uses fewer resources, uses fewer curation instructions, etc.) relative to other aggregation methods. This can include analyzing network characteristics to determine an impact to network resources, and select the aggregation method based on the impact to the network resources.

Similar to dynamic scope creation module 2406, dynamic time sampling module 2410 determines and adds a time scope to a logical query in the form of a time window and/or time limits. This can include any suitable duration of time, such as a day, a week, a month, a year, a fiscal quarter, a fiscal year, etc. In implementations, dynamic time sampling module 2410 automatically determines a time scope to add to a logical query when no timeframe is given, such as through an analysis of anecdotal information and/or learned information extracted and propagated from multiple devices by a proximity platform as further described herein. Alternately or additionally, dynamic time sampling module 2410 adds time granularity to logical queries that include time specifications. For instance, consider a logical query "monthly sales by region this year" that has a query intent of "sales" and a time scope of "monthly . . . this year'. Various implementations add time granularity to the provided time scope that adds more partitioning to the time scope. To illustrate, a keyword search can identify "monthly sales" in the logical query. In turn, the dynamic time sampling module can determine to partition the monthly time specification into daily increments, thus adding a daily time scope to the logical query forwarded to insight engine module 1114 of FIG. 11. In implementations, the size of the additional partition, such as the addition of a daily partition, can be based on the available data set and what granularity can be supported by the data set (e.g., curated data).

As further described herein, a time scope can be based on anecdotal information about a particular user and/or learned information extracted and propagated from multiple devices by a proximity platform, examples of which are provided herein. A logical query, for instance, that includes an ambiguous time scope, such as the term "recently", can be interpreted based on user preferences and/or user search history information. Alternately or additionally, the time scope can be interpreted based on input data flow into an entity. Consider an example where input data is received by the personalized analytics system and/or the curated data on a weekly basis. In analyzing the weekly input data, dynamic time sampling module 2410 can interpret "recently" in units of weeks, and add time scoping limits based on a week. Conversely, for input data received in a continual, streaming manner, "recently" can be interpreted in units of minutes. Accordingly, in analyzing streaming input data, dynamic time sampling module 2410 can interpret "recently" in units of minutes, and add time scoping limits to a logical query based on minutes. Thus, a type of input data and/or a frequency in which the input data is received can influence how dynamic time sampling module 2410 selects the time scope.

Various implementations select the time scope based on an analysis of a current date as well. For example, consider again a logical query with a query intent of "sales". If the logical query corresponds to a last day of a month (e.g., May 31), or a day close to the end of the month, various implementations select a time scope using this knowledge, such as by applying a time scope similar to "sales in May". Conversely, if the same logical query is received on June 18, dynamic time sampling module 2410 can identify a relative importance of this date, such as being close to the end of a fiscal quarter, and apply a time scope similar to "sales this Quarter". Thus, the dynamic time sampling module can analyze a current date on which a query is received, and determine a relative importance of the date, such as through knowledge of the user, a corresponding company, etc. In turn, the dynamic time sampling module can base the time scope on this relative importance.

Dynamic time sampling module 2410 can alternately or additionally determine time scoping limits based upon a projected computation time. For instance, if a projected computation time for "N" number of data points exceeds an acceptable computation time, various implementations determine to limit a number of computation points to a smaller value, such as "N/2", "N/4", etc. To illustrate, consider an example in which a projected computation time for processing four weeks of data for an attribute exceeds a computation time threshold value, such as a 1 second threshold value. Additional analysis determines that four weeks of data corresponds to 10 million rows of data. Various implementations determine to reduce the time scope from four weeks to two weeks, and reduces the processed data from 10 million rows to 5 million rows. In turn, the projected computation time falls below the computation time threshold value. Accordingly, a projected computation time can influence how the dynamic time sampling module selects a time scope to improve the overall execution speed of a corresponding computing device by reducing a computational load.

In some instances, a canonical query and/or input query can specify limitations. Consider an example in which a canonical query specifies "women's salaries by business unit". This specifies particular information: salaries of women. However, insights into a query can sometimes be made by expanding and/or broadening the specific query. Query broadening and simplification module 2412 analyzes a canonical query to identify opportunities and/or angles that can provide additional context to the query and, in turn, provide additional insights. For instance, query broadening and simplification module 2412 can analyze a logical query and/or a canonical query for Boolean categories, such as women and men, teenagers and adults, cats and dogs, East coast and West coast, and so forth. In identifying Boolean categories and/or topics, the query broadening and simplification module can expand the logical query to include the complementary category, such as by including a search for men's salaries by business unit in parallel with the specific request for women's salaries by business unit. This expansion appends information to the logical query, rather than replacing the original query, to provide context that can be used to determine an insight.

As another example, query broadening and simplification module 2412 identifies sets of categories, and expands a logical query and/or a canonical query into multiple logical queries, each of which corresponds to a particular category in a set. A specific query that identifies a particular topic in a set, such as "monthly sales for region 10" can be expanded into multiple logical queries, each of which corresponds to a particular instance of the set. With reference to the specific query for sales for region 10, query broadening and simplification module 2412 identifies multiple regions are related to region 10, and generates a first logical query for sales in region 1, a second logical query for sales in region 2, and so forth, to broaden the data being acquired an analyzed. Other types of sets of categories can be identified and expanded in the logical queries as well, such as sets of customer bases, sets of retail store locations, sets of successful and unsuccessful opportunities, sets of states in regional groupings, and so forth.

Query broadening and simplification module 2412 can alternately or additionally simplify specific canonical queries and/or specific logical queries. Consider an example in which a user initiates a query that requests complex content, such as an input query that requests information on "sales opportunities by state for each product in each line of products over each month this past year". Query broadening and simplification module 2412 can determine that the culmination of data for the specific query for sales opportunities, by state, by product, by each product line, each month over the year, would exceed threshold values corresponding to computational times. Accordingly, query broadening and simplification module 2412 determines the canonical query is a complex query, and further determines to reducing a scope for various parameters in the query, such as by reducing a time scope from monthly sales to quarterly sales, reducing a product scope from each produce in a product line to simply a product line, and so forth. Generally, a complex query corresponds to a query that has been identified as having permutations that exceed a predetermined threshold.

To illustrate, consider again the specific query that requests information for sales opportunities (4) for each product (6) in a product line (10) over the year (12) months, where each value represents an arbitrary value. This equates to 4×6×10×12=21,600 rows of data to extract and evaluate. Query broadening and simplification module 2412 can compare the amount of data for the specific query (e.g., 21,600) to a complexity threshold value, such as a threshold value with an arbitrary value of 200. Here, calculated rows of data for the specific query exceeds the complexity threshold value, and the query broadening and simplification module 2412 determines to simplify the corresponding logical query as further described herein.

The process of determining a dynamic intent, determining a dynamic scope, dynamically selecting aggregation methods, determining dynamic time sampling windows, and dynamically broadening and/or simplifying a query can be an iterative process, where each analysis process can receive an input from another analysis process for further refinement and/or evaluation. For example, in response to query broadening and simplification module 2412 generating a simplified logical query, the dynamic intent creation module 2404 can evaluate the newly generated logical query to determine an intent and whether the intent of the simplified logical query aligns with the canonical query. As another example, the dynamic time sampling module 2410 can evaluate a newly generated logical query from dynamic scope creation module 2406 to validate whether the applied time scopes align with user preferences. Alternately or additionally, each of the analyses processes can independently and/or asynchronously analyze input queries and generate corresponding logical queries from one another. Thus, query analysis 2208 can generate multiple logical queries 2402, each of which has varying scope and/or focus from one another. To keep computation times within a predetermined limit, and/or to ensure that a resultant narrated analytics playlist has a playback duration within a predetermined time window, various implementations analyze logical queries 2402 and select a portion of the logical queries for further analysis.

Moving to FIG. 25, example 2500 illustrates aspects of query analysis 2210 that are in accordance with one or more implementations. Generally, query analysis 2210 selects a portion of the logical queries generated by the query magnifier module to reduce computation times, to manage a corresponding time duration of a narrated playlist, and/or to select logical queries identified as being more applicable to answering an input query relative to other logical queries. Example 2500 includes a query reduction module 2502, a security application module 2504, and a query script generation module 2506, each of which can be implemented using any combination of software, firmware, and/or hardware.

Query reduction module 2502 receives logical queries 2402, and analyzes the logical queries in combination to determine how to reduce the number of queries. With reduction process, the personalized analytics system can collect and analyze data that has a higher probability of answering an input in an efficient manner relative to non-reduced logical queries. For instance, various implementations can analyze the logical queries to identify duplicate logical queries and/or queries that would extract similar curated data, such as by comparing attributes, keywords, time scopes, and so forth, and remove logical queries that have matching characteristics. For instance, if a first logical query and a second logical query have "M" matching keywords, where "M" represents an arbitrary threshold value, the query reduction module marks the first and second logical queries as being duplicates of one another. In turn, one of the duplicates is removed from consideration and/or deleted. As another example, query reduction module 2502 can analyze an intent and/or scope of each logical query, and mark the logical queries that share the intent and/or scope as being duplicates. In turn, one of the duplicate logical queries is removed from consideration and/or deleted. By eliminating duplicate logical queries, the overall computation efficiency of the personalized analytics system is improved by removing redundant data extractions, data computations, etc.

Alternately or additionally, query reduction module 2502 ranks the logical queries, such as by relevancy based on anecdotal information about the user and/or learned information extracted and propagated from multiple devices by a proximity platform. This can include the query reduction module ranking query intents and/or generated queries, such as those generated by dynamic intent creation module 2404 as further described herein. To illustrate, consider an example in which logical queries 2402 include a first logical query "what are sales the past month for Product X" and "what are sales the past year for Product X". Query reduction module 2502 can analyze anecdotal information and/or learned information extracted and propagated from multiple devices by a proximity platform, such as through the use of machine learning algorithms, to identify that historically, a particular user associated with the search positively reacts to monthly sales information, and reacts neutrally to yearly sales information. Based on this historical user information, query reduction module 2502 can rank "what are sales the past month for Product X" higher than "what are sales the past year for Product X".

In some implementations, machine learning algorithms and/or statistical analyses can be applied to identify attributes that are correlated with an intent attribute, and used to construct logical queries based on the correlated attributes. To illustrate, consider an input query "distribution of age in cardiology" that has an intent attribute of age that can be measured in various ways. Various implementations correlate the intent attribute (e.g., age) to other attributes, such as a length of stay attribute, a race attribute, a payment type attribute, and so forth, in anticipation of alternate logical queries, such as a "distribution of length of stay in cardiology" logical query, a "race distribution in cardiology" logical query, etc. These logical queries can alternately or additionally be ranked based on the strength of the correlations to the intent attribute. For example, consider a scenario in which a correlation value that indicates the correlation between the age intent attribute and the "distribution of length of stay in cardiology" attribute has a higher value relative to a correlation value that indicates the correlation between the age intent attribute and a payment type attribute. Various implementations rank the logical queries based on the correlation values to place logical queries with attributes having a higher correlation value at a higher rank relative to logical queries with attributes having a lower correlation value.

The strength of the correlation, also referred as effect sizes, can alternately or additionally, be classified into low, medium and high correlations, such as by using Cohen's classification scheme. For instance, Cohen's classification scheme classifies correlation values between 0 and 0.2 as "low", correlation values between 0.2 and 0.5 as medium, and correlation values above 0.5 as high. In applying Cohen's classification scheme to logical queries, the logical queries can be rank ordered based on the corresponding correlation values such as by ranking logical queries with highly correlated attributes first, followed by logical queries with medium correlated attributes, and so forth. Some implementations ignore and/or remove logical queries that have lowly ranked attributes to reduce the number of logical queries considered by the personalized analytics system. Various implementations construct multivariate logical queries based on the combinations of correlated variables to provide additional insights (such as segmentations). In other words, additional insights can be discovered by probing the curated data with highly correlated attributes that are positioned together in a logical query, rather than probing the curated data with individual attributes.

Any suitable type of statistical method can be applied to generate a correlation value. In some implementations, the statistical method to compute a correlation value is selected based on a type (and/or types) of the associated attributes. To illustrate, a Pearson correlation coefficient can be used to compute correlations between two continuous measures, Crames' V algorithms can be used to compute correlations between two categorical variables, a correlation ratio algorithm can be sued to generate correlation values between a continuous and a categorical variable, and so forth.

Various implementations can select a subset of the logical queries, such as a predetermined number of logical queries based on the ranking (e.g., selecting the top "N" ranked logical queries, where N is an arbitrary number). Using a subset of logical queries helps ensure that the personalized analytics system generates a narrated analytics playlist with a playback duration that falls within a predetermined time. By using the subset number of logical queries, this also reduces the number of insights generated by the insight engine module, which affects the playback duration. Accordingly, the ranking process helps ensure that the selected subset of logical queries is directed towards extracting and analyzing data that has relevancy to the particular user.

Security application module 2504 can apply any user security constraints to a logical query, such as constraints on what data can be accessed and analyzed. For example, various implementations apply an access token to a logical query that indicates to a corresponding database what level of authorized data access the corresponding logical query has to data (e.g., access to all data, partial access to data, only public access to data, sectional access, and so forth). This allows the personalized analytics system to protect private data, ensure authorized access to data, and the generation of insights that correspond to a particular user's knowledge base.

Query script generation module 2506 generates scripting statements for the limited number of logical queries, where the scripting statements extract and/or initiate the analysis of data in a database. In implementations, the query script generation module optimizes the scripting statements by identifying and selecting scripting statements that are determined to be more efficient relative to other scripting statements. For example, query script generation module 2506 can evaluate a first set of scripting statements and a second set of scripting statement, each of which generate a same desired result. The evaluation can include evaluating efficiency metrics, such as computation time metrics, statement number metrics, data volume metrics, etc., to determine which of the scripting statements accesses and/or computes the desired result more efficiently (e.g., less computation time, less statements, less data volume, etc.). In turn, the query script generation module selects the set of scripting statements that has more efficient metrics. Accordingly, query script generation module 2506 generates optimized scripting statements 2508 that correspond to scripting statements for each of the subset of logical queries.

Figure 26:
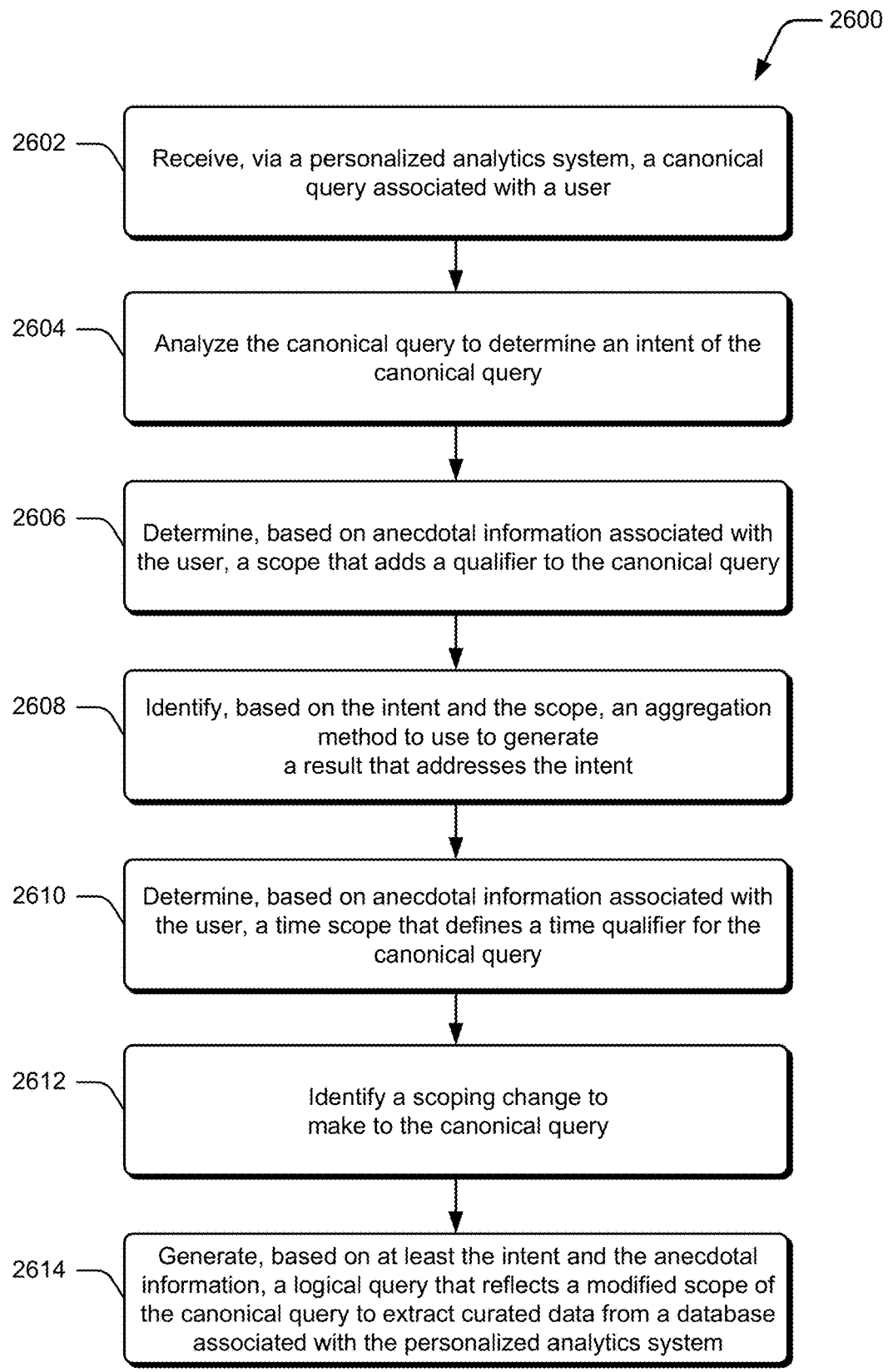
FIG. 26 illustrates an example method that can be utilized to generate logical queries in accordance with one or more implementations.

Now consider FIG. 26 that illustrates an example method 2600 that can be utilized to generate logical queries used by a personalized analytics system in accordance with one or more implementations. The method can be performed by any suitable combination of hardware, software, and/or firmware. In at least some embodiments, aspects of the method can be implemented by one or more suitably configured hardware components and/or software modules, such as various hardware and/or software modules associated with servers 102 and/or computing device 104 of FIG. 1, such as various modules included in personalized analytics module 106 and/or client analytics module 108. While the method described in FIG. 26 illustrates these steps in a particular order, it is to be appreciated that any specific order or hierarchy of the steps described here is used to illustrate an example of a sample approach. Other approaches may be used that rearrange the ordering of these steps. Thus, the order of the steps described here may be rearranged, and the illustrated ordering of these steps is not intended to be limiting.

At 2602, a canonical query associated with a user is received via a personalized analytics system. For instance, query magnifier module 1112 can receive canonical query 2204 from parser module 1110. Implementations analyze the canonical query to generate alternate attributes that can be used to broaden a scope of the canonical query, filter out less relevant attributes, group the alternate attributes, and so forth.

In response to receiving the canonical queries, the canonical query is analyzed to determine an intent of the canonical query at 2604. For example, dynamic intent creation module 2404 can analyze learned query information 2304 and/or learned alternate attributes information 2308 using natural language processing algorithms to identify keywords and/or the intent. Alternately or additionally, dynamic intent creation module 2404 can analyze canonical query 2204 using the natural language processing algorithms to identify the intent. In implementations, dynamic intent creation module 2404 identifies numeric values associated with the canonical query 2204, and identifies metrics associated with the numeric values as the intent. Determining the intent can also include first identifying an intent and then identifying variations of the intent to broaden a scope of the canonical query. Various implementations of dynamic intent creation module 2404 generate logical queries in response to identifying an intent.

At 2606, a scope that adds a qualifier to the canonical query is determined based on anecdotal information associated with the user and/or learned information extracted and propagated from multiple devices by a proximity platform. For instance, dynamic scope creation module 2406 analyzes a logical query generated by the dynamic intent creation module 2404 to determine how to resolve scoping ambiguities in the logical query, such as by adding scope qualifiers that are based on user search history information. Alternately or additionally, dynamic scope creation module 2406 analyzes canonical query 2204, identifies scoping ambiguities, and determines resolutions to the scoping ambiguities as further described herein. For instance, dynamic scope creation module 2406 identifies a location ambiguity in the logical query and/or canonical query, and determines a location qualifier as a scope based on user preferences. Various implementations of dynamic scope creation module 2406 generate logical queries that include scoping qualifiers.

At 2608, an aggregation method used to generate a result that addressed the intent is identified based on the intent and the scope. Dynamic aggregation module 2408, for instance, analyzes an intent identified by dynamic intent creation module 2404 and selects an aggregation method that corresponds to generating a metric that answers the intent. This can include analyzing a logical query generated by the dynamic intent creation module, where the logical query includes tags and/or identifiers that specify the intent.

Various implementations determine a time scope that defines a time qualifier for the canonical query based on the anecdotal information associated with the user at 2610. Alternately or additionally, the time scope is determined based learned information extracted and propagated from multiple devices by a proximity platform. In some implementations, dynamic time sampling module 2410 adds time qualifiers to one of logical queries 2402 that are based upon user search history information, user preferences, and so forth. Alternately or additionally, dynamic time sampling module 2410 selects a time scope based on an associated computation time threshold value.

One or more implementations identify a scoping change to make to the canonical query at 2612. For instance, query broadening and simplification module 2412 determines to simplify canonical query 2204 and/or one of logical queries 2402 based on an analysis that determines the query is a complex query. As another example, query broadening and simplification module 2412 determines to broaden canonical query 2204 and/or one of logical queries 2402 based on an analysis that identifies a Boolean category associated with the query.

At 2614, a logical query that reflects a modified scope of the canonical query is generated based on the intent and anecdotal information associated with the user, where the logical query is used to extract curated data from a database associated with the personalized analytics system based on the modified scope. In some implementations, the logical query is generated based on the canonical query, the intent, the scope, the aggregation method, the time scope, the scoping change, and/or any combination thereof. This can include any combination of dynamic intent creation module 2404, dynamic scope creation module 2406, dynamic aggregation module 2408, dynamic time sampling module 2410, and/or query broadening and simplification module 2412 iteratively generating the logical query, independently generating the logical query, sequentially generating the logical query, etc.

Figure 27:
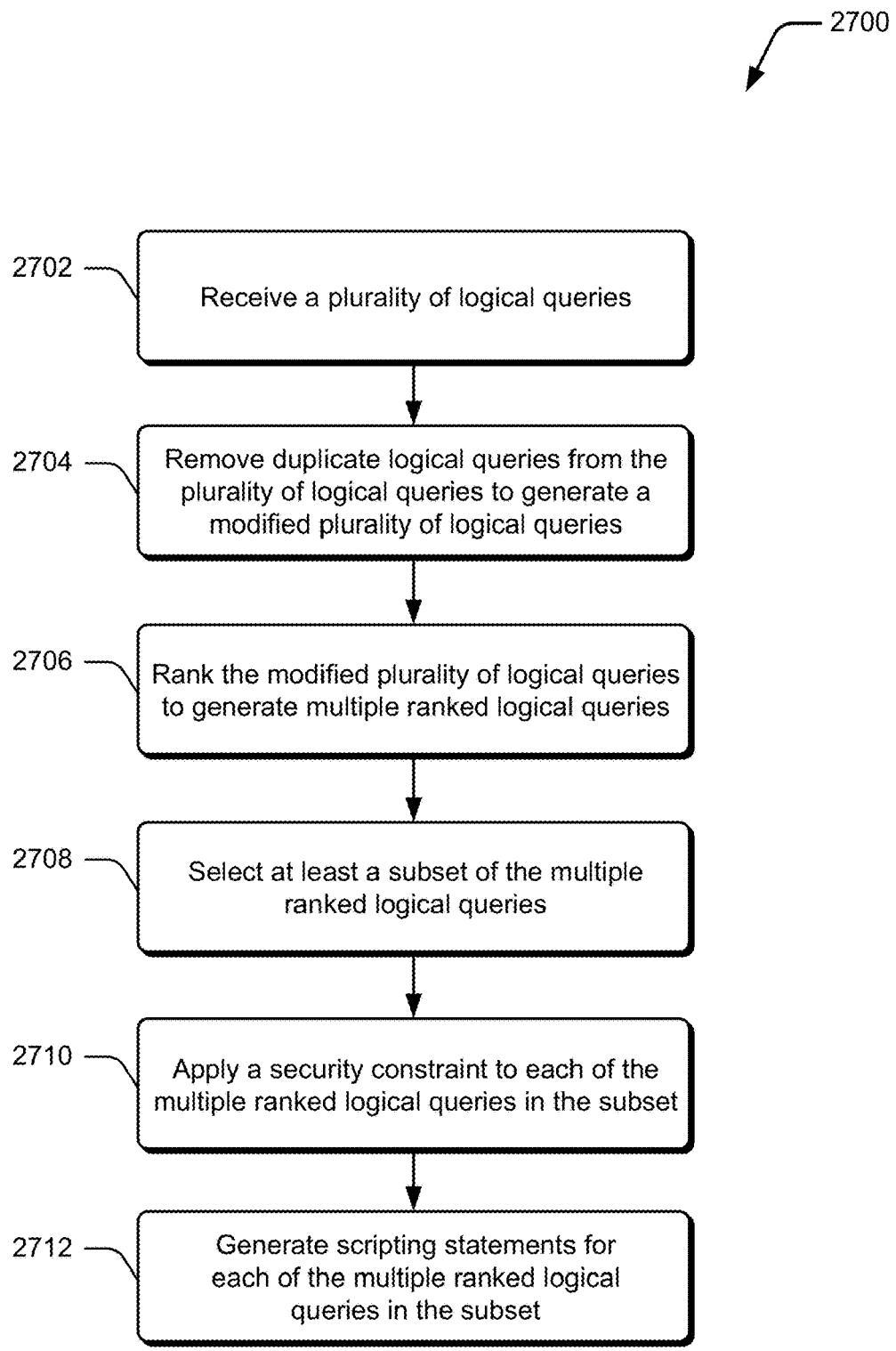
FIG. 27 illustrates an example method that can be utilized to scripting statements in accordance with one or more implementations.

Now consider FIG. 27 that illustrates an example method 2700 that can be utilized to generate scripting statements used by a personalized analytics system in accordance with one or more implementations. The method can be performed by any suitable combination of hardware, software, and/or firmware. In at least some embodiments, aspects of the method can be implemented by one or more suitably configured hardware components and/or software modules, such as various hardware and/or software modules associated with servers 102 and/or computing device 104 of FIG. 1, such as various modules included in personalized analytics module 106 and/or client analytics module 108. While the method described in FIG. 27 illustrates these steps in a particular order, it is to be appreciated that any specific order or hierarchy of the steps described here is used to illustrate an example of a sample approach. Other approaches may be used that rearrange the ordering of these steps. Thus, the order of the steps described here may be rearranged, and the illustrated ordering of these steps is not intended to be limiting.

At 2702, a plurality of logical queries is received. For example, query reduction module 2502 receives logical queries 2402 that are generated by query analysis 2208 as further described herein.

At 2704, duplicate logical queries are removed from the plurality of logical queries to generate a modified plurality of logical queries. Query reduction module 2502, for instance, analyzes keywords in each of logical queries 2402 to identify a first logical query and a second logical query that have a threshold value of matching keywords. In response to the analysis, query reduction module 2502 marks the first logical query and the second logical query as being duplicates of one another. As another example, query reduction module 2502 analyzes keywords in each of logical queries 2402 to identify a first logical query and a second logical query that have a same intent and a same scope. In response to the analysis, query reduction module 2502 marks the first logical query and the second logical query as being duplicates of one another. Various implementations generate the modified plurality of logical queries by removing duplicate logical queries from the plurality of logical queries.

In response to generating the modified plurality of logical queries, one or more implementations rank the modified plurality of logical queries to generate multiple ranked logical queries at 2706. For instance, query reduction module 2502 can rank the modified plurality of logical queries by correlating each logical query of the modified plurality of logical queries to anecdotal information associated with a user to generate a respective correlation value. Alternately or additionally, the modified plurality of logical queries can be correlated to and/or learned information extracted and propagated from multiple devices by a proximity platform. The query reduction module 2502 then ranks the modified plurality of logical queries by the respective correlation values.

At 2708, at least a subset of the multiple ranked logical queries is selected. Query reduction module 2502, as one example, selects a predetermined number of logical queries based on a playback duration of an associated narrated analytics playlist.

One or more implementations apply a security constraint to each of the multiple ranked logical queries in the subset at 2710. In some implementations, security application model 2504 applies, to each logical query of the subset, a security constraint that indicates a level of authorized data access.

At 2712, scripting statements for each of the multiple ranked logical queries in the subset are generated. For example, query script generation module 2506 evaluates a first set of scripting statements and a second set of scripting statements to generate respective efficiency metrics, wherein the first set of scripting statements and the second set of scripting statements are configured to generate a same result. Query script generation module then selects one of the first set of scripting statements and the second set of scripting statements to use as the scripting statements to extract information from the database based, at least in part, on the efficiency metric. In implementations, the scripting statements correspond to database scripting statements.

Having described scoping query searches based on anecdotal information about a user and/or learned information extracted and propagated from multiple devices by a proximity platform, consider now a discussion of categorical ordered groups that is in accordance with one or more implementations.

Categorical Ordered Groups

Figure 28:
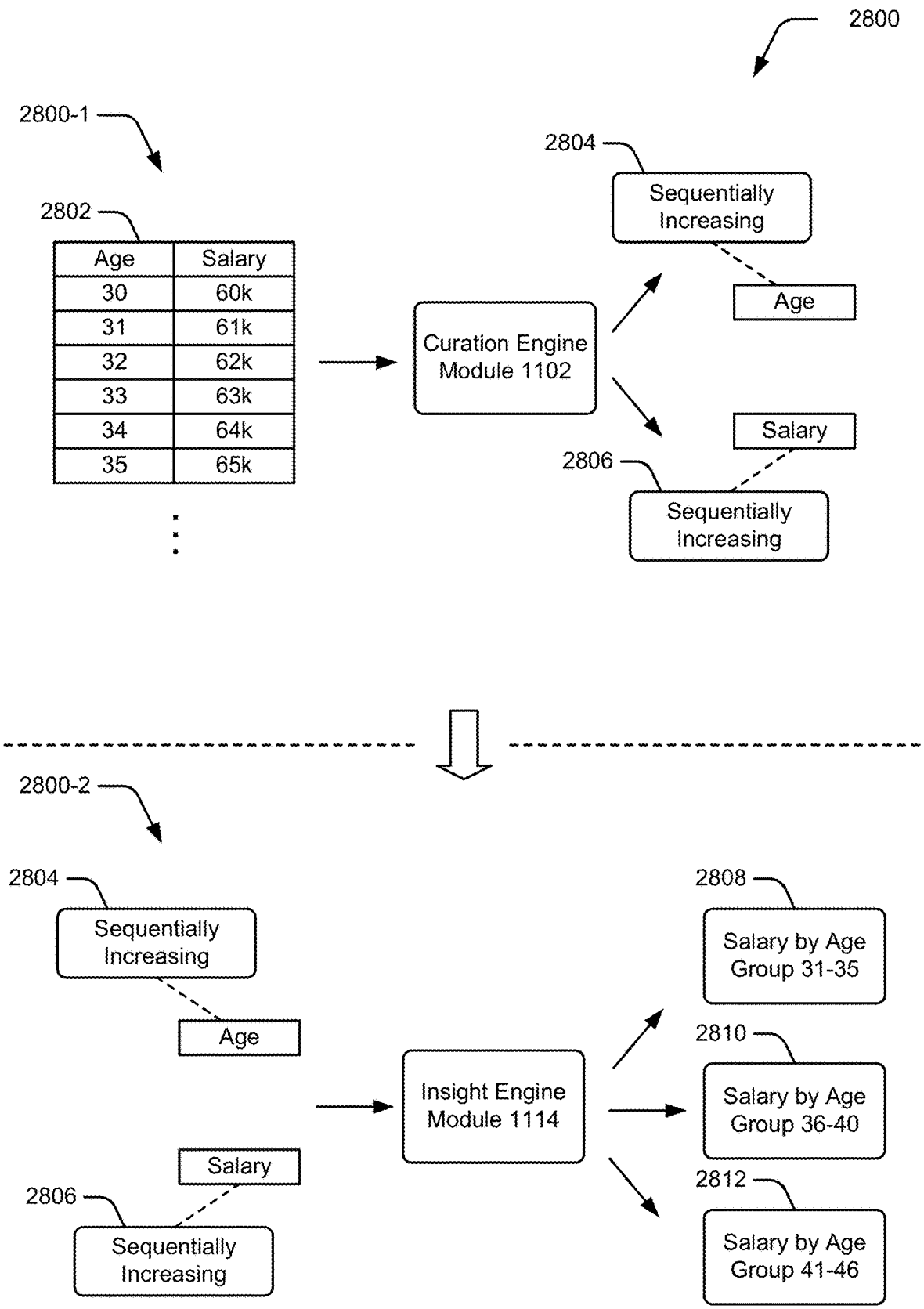
FIG. 28 illustrates an example environment in which categorical ordered groups can be utilized in accordance with one or more implementation.

Various implementations generate categorical ordered groups based upon identified properties of data sets. Generally, a categorical ordered group corresponds to a grouping of data that is dynamically identified and formed by the personalized system to provide additional insight. To demonstrate, consider now FIG. 28 that includes an example environment 2800 that illustrates a progression of events that describe aspects of generating categorical ordered groups that are in accordance with one or more implementations. The example environment 2800 is represented at two arbitrary points in time that are labeled as example environment 2800-1 and example environment 2800-2. Collectively, the example environment 2800-1 and example environment 2800-2 embody the example environment 2800. In various scenarios, the example described with respect to FIG. 28 can be considered a continuation of one or more examples described with respect to FIGS. 1-4, 5A, 5B, 5C, 6, 7, 8A, 8B, 9-19, 20A, 20B, 21-30.

Environment 2800-1 includes curation engine module 1102 of FIG. 11, that accesses and curates data as further described herein. In environment 2800-1, the curation engine module analyzes data 2802 to determine various attributes, relationships, properties, and so forth, related to the data. Data 2802 includes two columns of related data: an age column and a salary data, where the respective rows are related. For instance, age 30 corresponds to a salary of $60 k, age 32 corresponds to a salary of $62 k, and so forth. The curation engine module 1102 analyzes the related age column and salary column, and determines that each column has the property of sequentially increasing in number. In other words, age numbers sequentially increase as the column is traversed downward and the salary numbers sequentially increase as the column is traversed downward. Accordingly, the curation engine module can assign property 2804 to the age column, and property 2806, each of which that indicates the columns have the property of sequentially increasing. In various implementations, curation engine module 1102 can identify characteristics about the related columns of data, such as a density and/or volume, that can be used to determine categorical ordered groupings. To illustrate, the curation engine module can determine that age range X has a salary volume of Y, which can then be used by the insight engine to partition the data into categorical ordered groups. While data 2802 illustrates both age and salary as having a sequentially increasing property, alternate or additional implementations only identify one of the related columns as having the sequentially increasing property, such as only age or only salary.

Moving to environment 2800-2, insight engine module 1114 of FIG. 11 can identify that the age column has property 2804 and/or identify that the salary column has property 2806. In turn, the insight engine module can apply statistical methods to the data (e.g., the age column and/or the salary column) to generate categorical ordered groupings of the data as a way to present additional insights and/or meaning to the data. For example, the insight engine module generates categorical ordered grouping 2808, categorical ordered grouping 2810, and categorial ordered grouping 2812 that groups the salary data salaries in a categorical order (e.g., ages 31-35, ages 36-40, and ages 41-45). The groupings can be partitioned in any suitable manner and/or based on any type of information, such as characteristics identified by the curation engine module. Thus, various implementations can identify sequentially increasing properties of related data, and dynamically determine categorical ordered groupings of the data to provide additional insight. This can include assigning and/or applying names and/or terminology to the groupings, such as assigning the phrase "Generation Y" to categorical ordered grouping 2808, and assigning the phrase "Generation X" to categorical ordered grouping 2812.

As further described herein, insight engine module 1114 can automatically generate, define, and/or classify the categorical ordered groupings based upon information and/or characteristics about the curated data identified by curation engine module 1102. To illustrate, consider the example in which the curation engine module identifies a salary volume Y for an age range X, where X and Y are arbitrary values. Insight engine module 1114 can use these characteristics to dynamically define and/or generate categorical ordered groups. For instance, consider an example in which ages are represented as discrete numbers that span from 0-100. Insight engine module 1114 can determine to group the ages into the categorical ordered groupings of 0-3, 4-9, 10-18, 19-29, and so forth, for a first data set corresponding to duration of hospital stay, based on each grouping having a same volume and/or factor. The insight engine module can alternately or additionally partition the group of ages into the categorical order groupings of 0-7, 8-21, 22-35, 36-50, and so forth for a second data set corresponding to readmittance based upon a different factor. Thus, insight engine module 1114 can dynamically determine and/or generate the categorical ordered groupings based upon the characteristics of the curated data being analyzed such that a same set of data (e.g., age) can be partitioned into different ordered groupings based upon the associated data.

Having described categorical ordered groups, consider now example devices in which can be used for various implementations.

Example Devices

Figure 29:
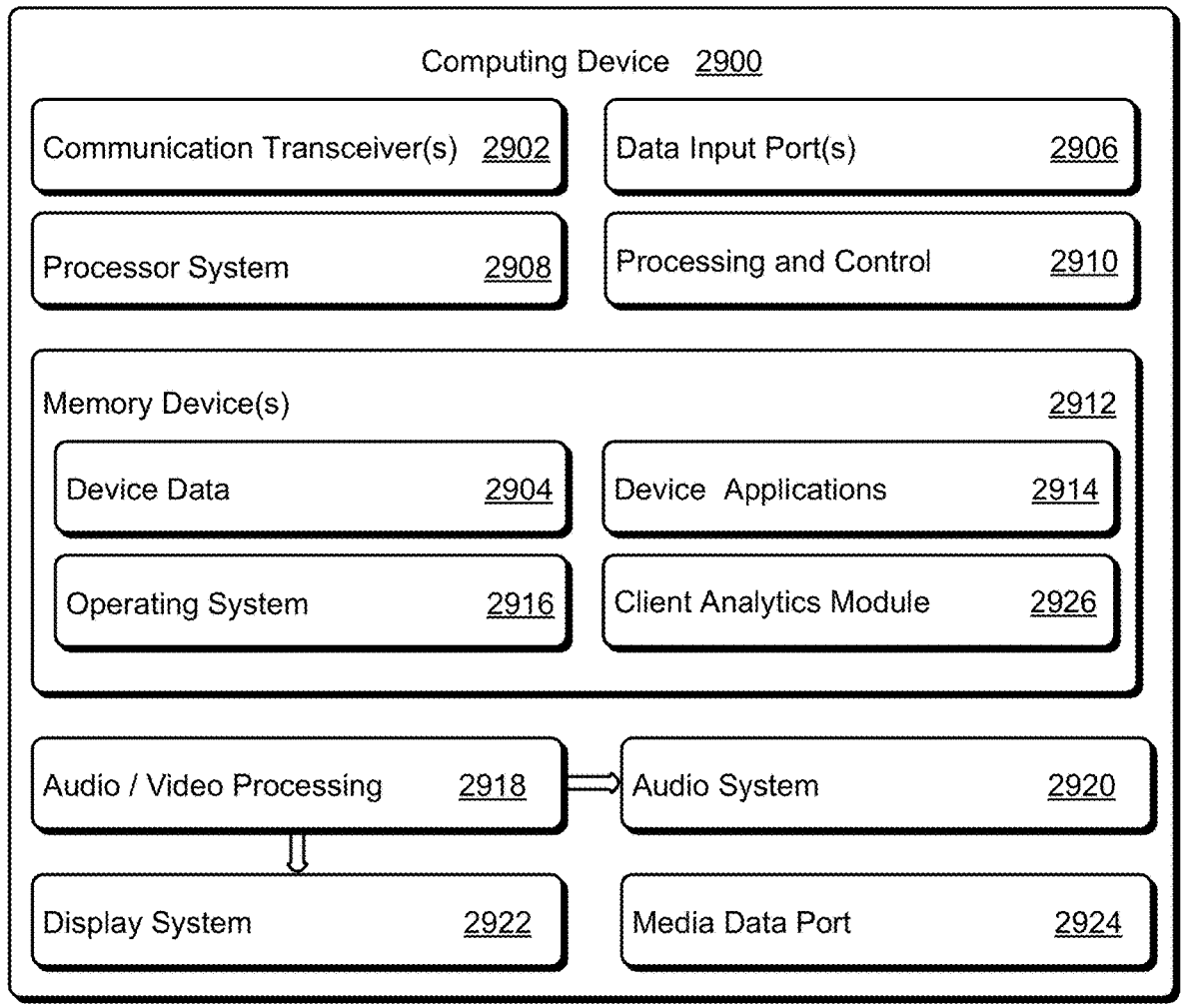
FIG. 29 is an illustration of an example computing device in accordance with one or more implementations.
Figure 30:
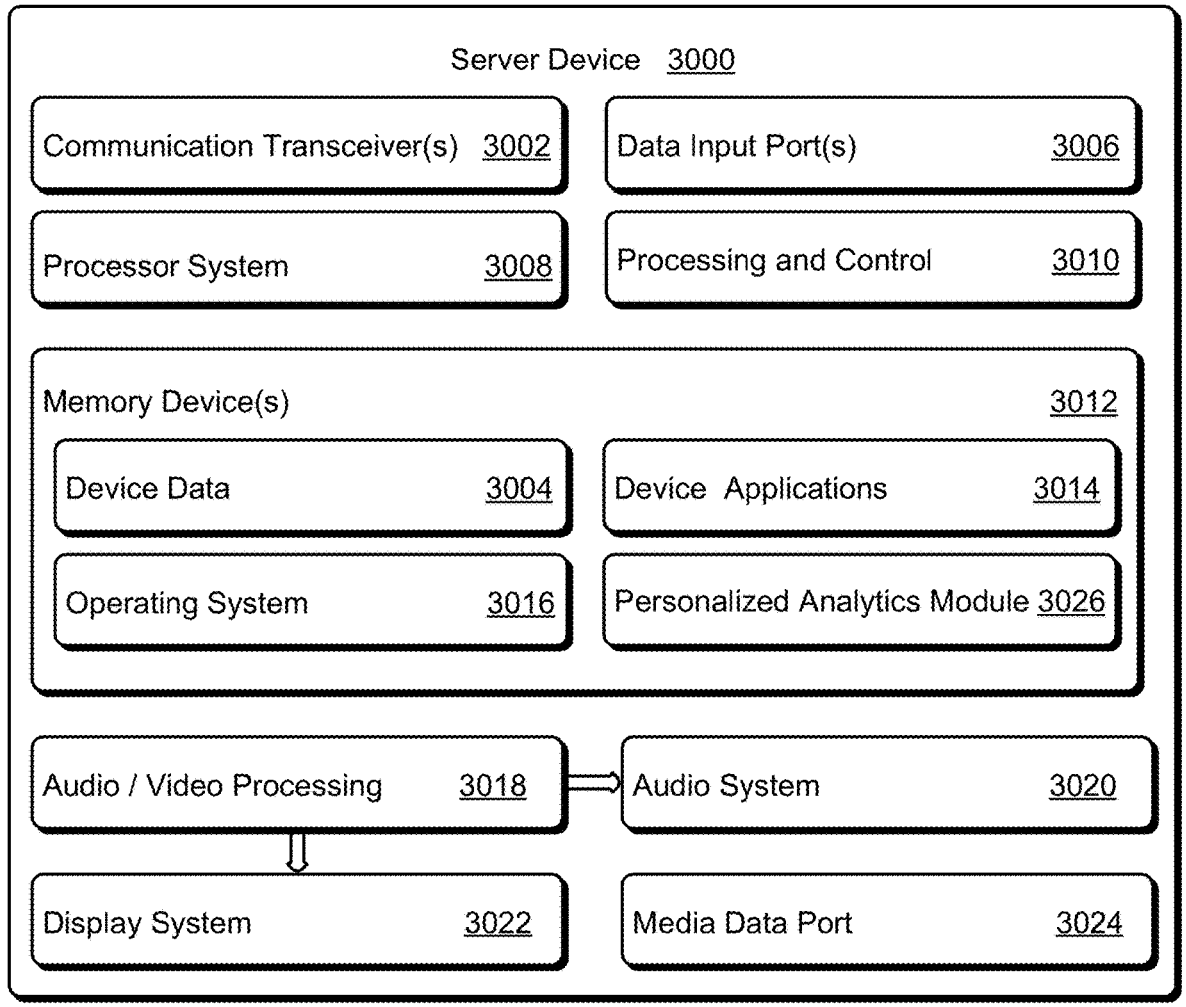
FIG. 30 is an illustration of an example server device in accordance with one or more implementations.

FIG. 29 illustrates various components of an example computing device 2900, such as computing device 104 of FIG. 1, while FIG. 30 illustrates various components of an example server device 3000, such as one of servers 102 of FIG. 1. Accordingly, computing device 2900 and/or server device 3000 can be utilized to implement various aspects of context-based testing as further described herein. In some implementations, computing device 2900 and server device 3000 have at least some similar components. Accordingly, for the purposes of brevity, FIGS. 29 and 30 will be described together. Similar components associated with FIG. 29 will be identified as components having a naming convention of "29XX", and components associated with FIG. 30 will be identified as components having a naming convention of "30XX". Conversely, components distinct to each device will be described separately and after the similar components.

Computing device 2900/server device 3000 includes communication transceivers 2902/communication transceivers 3002 that enable wired or wireless communication of device data 2904/device data 3004, such as received data and transmitted data. While referred to as a transceiver, it is to be appreciated that communication transceivers 2902/communication transceivers 3002 can additionally include separate transmit antennas and receive antennas without departing from the scope of the claimed subject matter. Example communication transceivers include Wireless Personal Area Network (WPAN) radios compliant with various Institute of Electrical and Electronics Engineers (IEEE) 802.15 (Bluetooth™) standards, Wireless Local Area Network (WLAN) radios compliant with any of the various IEEE 802.11 (WiFi™) standards, Wireless Wide Area Network (WWAN) radios for cellular telephony (3GPP-compliant), wireless metropolitan area network radios compliant with various IEEE 802.16 (WiMAX™) standards, and wired Local Area Network (LAN) Ethernet transceivers.

Computing device 2900/server device 3000 may also include one or more data input ports 2906/data input ports 3006 via which any type of data, media content, and inputs can be received, such as user-selectable inputs, messages, music, television content, recorded video content, and any other type of audio, video, or image data received from any content or data source. Data input ports 2906/data input ports 3006 may include Universal Serial Bus (USB) ports, coaxial-cable ports, and other serial or parallel connectors (including internal connectors) for flash memory, Digital Versatile Discs (DVDs), Compact Disks (CDs), and the like. These data-input ports may be used to couple the electronic device to components, peripherals, or accessories such as keyboards, microphones, or cameras.

Computing device 2900/server device 3000 of this example includes processor system 2908/processor system 3008 (e.g., any of application processors, microprocessors, digital-signal processors, controllers, and the like) or a processor and memory system (e.g., implemented in a system-on-chip), which processes computer-executable instructions to control operation of the device. A processing system may be implemented at least partially in hardware, which can include components of an integrated circuit or on-chip system, digital-signal processor, application-specific integrated circuit, field-programmable gate array, a complex programmable logic device, and other implementations in silicon and other hardware. Alternatively, or in addition, the electronic device can be implemented with any one or combination of software, hardware, firmware, or fixed-logic circuitry that is implemented in connection with processing and control circuits, which are generally identified as processing and control 2910/processing and control 3010. Although not shown, computing device 2900/server device 3000 can include a system bus, crossbar, interlink, or data-transfer system that couples the various components within the device. A system bus can include any one or combination of different bus structures, such as a memory bus or memory controller, data protocol/format converter, a peripheral bus, a universal serial bus, a processor bus, or local bus that utilizes any of a variety of bus architectures.

Computing device 2900/server device 3000 also includes one or more memory devices 2912/memory devices 3012 that enable data storage, examples of which include random access memory (RAM), non-volatile memory (e.g., read-only memory (ROM), flash memory, EPROM, EEPROM, etc.), and a disk storage device. Memory devices 2912/memory devices 3012 are implemented at least in part as a physical device that stores information (e.g., digital or analog values) in storage media, which does not include propagating signals or waveforms. The storage media may be implemented as any suitable types of media such as electronic, magnetic, optic, mechanical, quantum, atomic, and so on. Memory devices 2912/memory devices 3012 provide data storage mechanisms to store the device data 2904/device data 3004, other types of information or data, and/or various device applications 2914/device applications 3014 (e.g., software applications). For example, operating system 2916/operating system 3016 can be maintained as software instructions within memory devices 2912/memory devices 3012 and executed by processor system 2908/processor system 3008.

Computing device 2900/server device 3000 optionally includes audio and video processing system 2918/audio and video processing system 3018 that processes audio data and passes through the audio and video data to optional audio system 2920/audio system 3020. Audio system 2920/audio system 3020 and optional display system 2922/display system 3022 may include any modules that process, display, or otherwise render audio, video, display, or image data. Display data and audio signals can be communicated to an audio component and to a display component via a radio-frequency link, S-video link, HDMI, composite-video link, component-video link, digital video interface, analog-audio connection, or other similar communication link, such as optional media data port 2924/media data port 3024. In some implementations, optional audio system 2920/audio system 3020 and optional display system 2922/display system 3022 are external components to computing device 2900/server device 3000. Alternatively, or additionally, optional audio system 2920/audio system 3020 and optional display system 2922/display system 3022 can be an integrated component of the example computing device 2900/server device 3000, such as part of an integrated speaker and/or an integrated display and touch interface.

In some aspects, memory devices 2912 of computing device 2900 includes client analytics module 2926 to provide personalized analytics system features. Client analytics module 2926 can include a web browser accessing a remote server web page, a client application that executes in conjunction with cloud-based services, a stand-alone application, and/or a client application that exchanges data with a server application, to provide personalized analytics as further described herein. Various implementations of client analytics module collect anecdotal data about user interactions with the personalized analytics system, which is then referenced later to aid in curating data and/or generating narrated analytics playlists. While client analytics module 2926 is illustrated here as residing on memory devices 2912, alternate or additional implementations can be implemented in varying combinations of software, and/or firmware.

In some aspects, memory devices 3012 of server device 3000 includes personalized analytics module 3026 to provide personalized analytics to various computing devices. In one or more implementations, personalized analytics module 3026 is implemented to provide cloud-based services to remote devices, such as computing device 2900 of FIG. 29. Personalized analytics module 3026 identifies data sources to scan, curates data from the data sources, and performs query analyses on the curated data. This can include performing multiple variations of the query analysis, and statistically combining the information from the multiple variations as a way to identify insights as further described herein. In some implementations, the personalized analytics system automatically generates a narrated analytics playlist from the insights, where the playlist includes images and narrative audible output. One or more implementations of the personalized analytics module includes a proximity platform to enable the exchange of machine-learning algorithm parameters without exposing data used to train the machine-learning algorithms.

In view of the many possible aspects to which the principles of the present discussion may be applied, it should be recognized that the implementations described herein with respect to the drawing figures are meant to be illustrative only and should not be taken as limiting the scope of the claims. Therefore, the techniques as described herein contemplate all such implementations as may come within the scope of the following recited claims and equivalents thereof.

What is claimed is:

1. A method comprising:
   receiving a plurality of logical queries;
   determining at least one duplicate logical query from the plurality of logical queries by identifying matching characteristics between two or more respective logical queries;
   removing the at least one duplicate logical query from the plurality of logical queries to generate a modified plurality of logical queries;

correlating each logical query of the modified plurality of logical queries to anecdotal information associated with a user to generate a respective correlation value, including for at least one logical query of the plurality of logical queries:
identifying keywords of the logical query;
determining whether each identified keyword of the identified keywords falls within a predefined threshold value associated with a query success rate; and
in response to determining that an identified keyword falls below the predefined threshold value, replacing the identified keyword of the logical query with a replacement keyword that has a higher threshold value than the identified keyword;
ranking the modified plurality of logical queries to generate multiple ranked logical queries based on a respective correlation value for each logical query of the modified plurality of logical queries;
selecting at least a subset of the multiple ranked logical queries;
generating scripting statements for each ranked logical query of the subset; and
selecting at least one optimized scripting statement that satisfies one or more efficiency metrics, wherein the one or more efficiency metrics include at least one of a computation time or data volume metric, and wherein the at least one optimized scripting statement is used to extract information from a database.

2. The method as recited in claim 1, wherein the matching characteristics include at least one of matching primary attributes, matching secondary attributes, matching keywords, or matching time scopes.

3. The method as recited in claim 2, further comprising:
determining a primary attribute for each logical query of the plurality of logical queries; and
determining the at least one duplicate logical query from the plurality of logical queries further by determining that the two or more respective logical queries have a same primary attribute.

4. The method as recited in claim 1, wherein said generating the scripting statements comprises:
evaluating a first set of scripting statements and a second set of scripting statements to generate respective efficiency metrics, wherein the first set of scripting statements and the second set of scripting statements are configured to generate a same result; and
selecting one of the first set of scripting statements and the second set of scripting statements to use as the scripting statements to extract information from the database based, at least in part, on the efficiency metric.

5. The method as recited in claim 1, for at least one logical query of the plurality of logical queries, the method further comprises:
identifying keywords of the logical query;
ranking the identified keywords of the logical query; and
selecting a keyword subset of the identified keywords based on said ranking to generate a modified logical query of the modified plurality of logical queries.

6. The method as recited in claim 1, wherein said removing the duplicate logical queries comprises:
analyzing at least two logical queries of the plurality of logical queries to identify a first logical query and a second logical query that have a same primary attribute and a same scope; and
marking the first logical query and the second logical query as being duplicates of one another.

7. A system comprising:
one or more processors; and
one or more storage devices comprising processor executable instructions that, responsive to execution by the one or more processors, cause the system to perform operations comprising:
receiving a plurality of logical queries;
determining duplicate logical queries from the plurality of logical queries by identifying matching characteristics between two respective logical queries;
removing the duplicate logical queries from the plurality of logical queries to generate a modified plurality of logical queries;
correlating each logical query of the modified plurality of logical queries to anecdotal information associated with a user to generate a respective correlation value, including for at least one logical query of the plurality of logical queries:
identifying keywords of the logical query;
determining whether each identified keyword of the identified keywords falls within a predefined threshold value associated with a query success rate; and
in response to determining that an identified keyword falls below the predefined threshold value, replacing the identified keyword of the logical query with a replacement keyword that has a higher threshold value than the identified keyword;
ranking the modified plurality of logical queries to generate multiple ranked logical queries based on the respective correlation value;
selecting at least a subset of the multiple ranked logical queries;
generating scripting statements for each ranked logical query of the subset; and
selecting at least one optimized scripting statement that satisfies one or more efficiency metrics, wherein the one or more efficiency metrics include at least one of a computation time or data volume metric, and wherein the at least one optimized scripting statement is used to extract information from a database.

8. The system as recited in claim 7, wherein said selecting at least the subset of the multiple ranked logical queries comprises selecting a predetermined number of logical queries based, at least in part, on a playback duration of an associated narrated analytics playlist, each logical query of the multiple ranked logical queries having a corresponding time duration for playback of extracted information from the logical query in the associated narrated analytics playlist.

9. The system as recited in claim 7, the operations further comprising: applying, to each logical query of the subset, a security constraint that indicates a level of authorized data access.

10. The system as recited in claim 7, wherein the anecdotal information associated with the user is learned based on a model trained using machine learning.

11. The system as recited in claim 7, wherein said removing the duplicate logical queries comprises:
analyzing keywords in at least two logical queries of the plurality of logical queries to identify a first logical query and a second logical query that have a threshold value of matching keywords; and
marking the first logical query and the second logical query as being duplicates of one another.

12. A method comprising:
correlating each logical query of a plurality of logical queries to anecdotal information associated with a user to generate a respective correlation value, including for at least one logical query of the plurality of logical queries:

identifying keywords of the logical query;

determining whether each identified keyword of the identified keywords falls within a predefined threshold value associated with a query success rate; and in response to determining that an identified keyword falls below the predefined threshold value, replacing the identified keyword of the logical query with a replacement keyword that has a higher threshold value than the identified keyword;

ranking the plurality of logical queries to generate multiple ranked logical queries based on a respective correlation value for each logical query of the plurality of logical queries; selecting at least a subset of the multiple ranked logical queries;

generating scripting statements for each ranked logical query of the subset; and selecting at least one optimized scripting statement that satisfies one or more efficiency metrics, wherein the one or more efficiency metrics include at least one of a computation time or data volume metric, and wherein the at least one optimized scripting statement is used to extract information from a database.

13. The method as recited in claim 12, further comprising:

determining at least one duplicate logical query from the plurality of logical queries by identifying matching characteristics between two or more respective logical queries; and removing the at least one duplicate logical query from the plurality of logical queries to generate a modified plurality of logical queries.

14. The method as recited in claim 13, wherein the matching characteristics include at least one of matching primary attributes, matching secondary attributes, matching keywords, or matching time scopes.

15. The method as recited in claim 13, wherein said removing the duplicate logical queries comprises:

analyzing at least two logical queries of the plurality of logical queries to identify a first logical query and a second logical query that have a same primary attribute and a same scope; and marking the first logical query and the second logical query as being duplicates of one another.

16. The method as recited in claim 13, further comprising:

determining a primary attribute for each logical query of the plurality of logical queries; and determining the at least one duplicate logical query from the plurality of logical queries further by determining that the two or more respective logical queries have a same primary attribute.

17. The method as recited in claim 12, wherein said generating the scripting statements comprises:

evaluating a first set of scripting statements and a second set of scripting statements to generate respective efficiency metrics, wherein the first set of scripting statements and the second set of scripting statements are configured to generate a same result; and selecting one of the first set of scripting statements and the second set of scripting statements to use as the scripting statements to extract information from the database based, at least in part, on the efficiency metric.

18. The method as recited in claim 12, for at least one logical query of the plurality of logical queries, the method further comprises:

identifying keywords of the logical query;

ranking the identified keywords of the logical query; and selecting a keyword subset of the identified keywords based on said ranking to generate a modified logical query of the modified plurality of logical queries.

19. The method as recited in claim 12, further comprising applying, to each logical query, a security constraint that indicates a level of authorized data access.

20. The method as recited in claim 12, further comprising learning the anecdotal information associated with the user based on a model trained using machine learning.

* * * * *